(12) United States Patent
Ojima et al.

(10) Patent No.: US 7,471,321 B2
(45) Date of Patent: Dec. 30, 2008

(54) PHOTOGRAPHING APPARATUS AND PHOTOGRAPHING METHOD

(75) Inventors: Noriaki Ojima, Tokyo (JP); Kenji Shiraishi, Tokyo (JP); Toshiaki Nakahira, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1029 days.

(21) Appl. No.: 10/354,086

(22) Filed: Jan. 30, 2003

(65) Prior Publication Data

US 2003/0169346 A1 Sep. 11, 2003

(30) Foreign Application Priority Data

| Jan. 30, 2002 | (JP) | ............... 2002-021416 |
| Jan. 30, 2002 | (JP) | ............... 2002-021419 |
| Mar. 20, 2002 | (JP) | ............... 2002-079081 |
| May 2, 2002 | (JP) | ............... 2002-130271 |
| Jun. 4, 2002 | (JP) | ............... 2002-163011 |

(51) Int. Cl.
*H04N 3/14* (2006.01)

(52) U.S. Cl. .................. 348/272; 348/320; 348/312

(58) Field of Classification Search .......... 348/277, 348/280, 231.6, 320, 322
See application file for complete search history.

(56) References Cited

U.S. PATENT DOCUMENTS

| 5,631,458 A | 5/1997 | Nakahira et al. |
| 5,854,949 A | 12/1998 | Furukawa et al. |
| 6,661,451 B1 * | 12/2003 | Kijima et al. ............ 348/220.1 |
| 6,661,452 B1 * | 12/2003 | Nishikawa ............... 348/222.1 |
| 6,999,119 B1 * | 2/2006 | Shibazaki et al. ........... 348/273 |
| 7,079,184 B2 * | 7/2006 | Yanai ....................... 348/319 |
| 7,187,408 B2 * | 3/2007 | Kaku ..................... 348/231.6 |
| 2003/0169346 A1 | 9/2003 | Ojima et al. |

FOREIGN PATENT DOCUMENTS

| EP | 0 840 503 | 5/1998 |
| JP | 63-198486 | 8/1988 |
| JP | 4-57482 | 2/1992 |
| JP | 06-054250 | 2/1994 |
| JP | 10-136244 | 5/1998 |
| JP | 2000-201355 | 7/2000 |
| JP | 2000-286408 | 10/2000 |
| JP | 2000-293145 | 10/2000 |
| JP | 2001-145025 | 5/2001 |

(Continued)

OTHER PUBLICATIONS

U.S. Appl. No. 10/025,803, filed Dec. 26, 2001, Ojima.

(Continued)

*Primary Examiner*—Luong T Nguyen
(74) *Attorney, Agent, or Firm*—Oblon, Spivak, McClelland, Maier & Neustadt, P.C.

(57) ABSTRACT

A photographing device and method of dividing data of electric charges stored in all pixels corresponding to an image focused on an photographing device having a color filter for resolving color into M($\geq$3) fields, transferring the divided data in sequence until data of m($<$M) fields of the M fields are transferred, the transferred data of the m fields including all types of color signals and pixels necessary to prepare a color image and preparing a color image using the transferred data.

22 Claims, 37 Drawing Sheets

FOREIGN PATENT DOCUMENTS

| | | |
|---|---|---|
| JP | 2001-245255 | 9/2001 |
| JP | 2001-285688 | 10/2001 |
| JP | 2003-52049 | 2/2003 |

OTHER PUBLICATIONS

U.S. Appl. No. 10/120,369, filed Apr. 12, 2002, Sannoh et al.
U.S. Appl. No. 10/125,483, filed Apr. 19, 2002, Ojima.
U.S. Appl. No. 10/137,638, filed May 3, 2002, Nakahira et al.
U.S. Appl. No. 10/244,670, filed Sep. 17, 2002, Sannoh et al.
U.S. Appl. No. 10/270,314, filed Oct. 15, 2002, Shinohara et al.
U.S. Appl. No. 10/354,086, filed Jan. 20, 2003, Ojima et al.
U.S. Appl. No. 10/354,086, filed Jan. 30, 2003, Ojima et al.
U.S. Appl. No. 10/636,712, filed Aug. 8, 2003, Shinohara et al.
U.S. Appl. No. 10/637,502, filed Aug. 11, 2003, Shiraishi.
U.S. Appl. No. 10/354,086, filed Jan. 30, 2001, Ojima et al.
U.S. Appl. No. 10/658,549, filed Sep. 10, 2003, Oka et al.
U.S. Appl. No. 10/764,438, filed Jan. 27, 2004, Shiraishi et al.
U.S. Appl. No. 10/764,449, filed Jan. 27, 2004, Ojima et al.
U.S. Appl. No. 10/802,801, filed Mar. 18, 2004, Nakahira.
U.S. Appl. No. 10/914,196, filed Aug. 10, 2004, Shiraishi.
U.S. Appl. No. 10/909,397, filed Aug. 3, 2004, Ojima.
U.S. Appl. No. 11/028,307, filed Jan. 4, 2005, Shiraishi.

* cited by examiner

FIG. 4

COLOR FILTER IN A PRIMARY COLOR SYSTEM

|   | | | | | | | | |
|---|---|---|---|---|---|---|---|---|
| 1 | R | G | R | G | R | G | R | G |
| 2 | G | B | G | B | G | B | G | B |
| 3 | R | G | R | G | R | G | R | G |
| 1 | G | B | G | B | G | B | G | B |
| 2 | R | G | R | G | R | G | R | G |
| 3 | G | B | G | B | G | B | G | B |
| . | R | G | R | G | R | G | R | G |
| . | G | B | G | B | G | B | G | B |

COLOR FILTER FOR A COMPLEMENTARY COLOR SYSTEM

|   | | | | | | | | |
|---|---|---|---|---|---|---|---|---|
| 1 | C | Y | C | Y | C | Y | C | Y |
| 2 | G | M | G | M | G | M | G | M |
| 3 | C | Y | C | Y | C | Y | C | Y |
| 1 | G | M | G | M | G | M | G | M |
| 2 | C | Y | C | Y | C | Y | C | Y |
| 3 | G | M | G | M | G | M | G | M |
| . | C | Y | C | Y | C | Y | C | Y |
| . | G | M | G | M | G | M | G | M |

| SETTING OF RECORDING | |
|---|---|
| FOCUS | AF |
| IMAGE FOR CONFIRMING PHOTOGRAPHING | 1 SEC |
| POINT FOR MEASUREMENT OF LIGHT | AUTO |
| EXPOSURE OVER A LONG PERIOD OF TIME | OFF |
| RESOLUTION OF RECORDED IMAGE | MIDDLE |
| DETERMINATION: ENTER | |

OFF / 1 SEC / 3 SEC

HIGH / MIDDLE / LOW

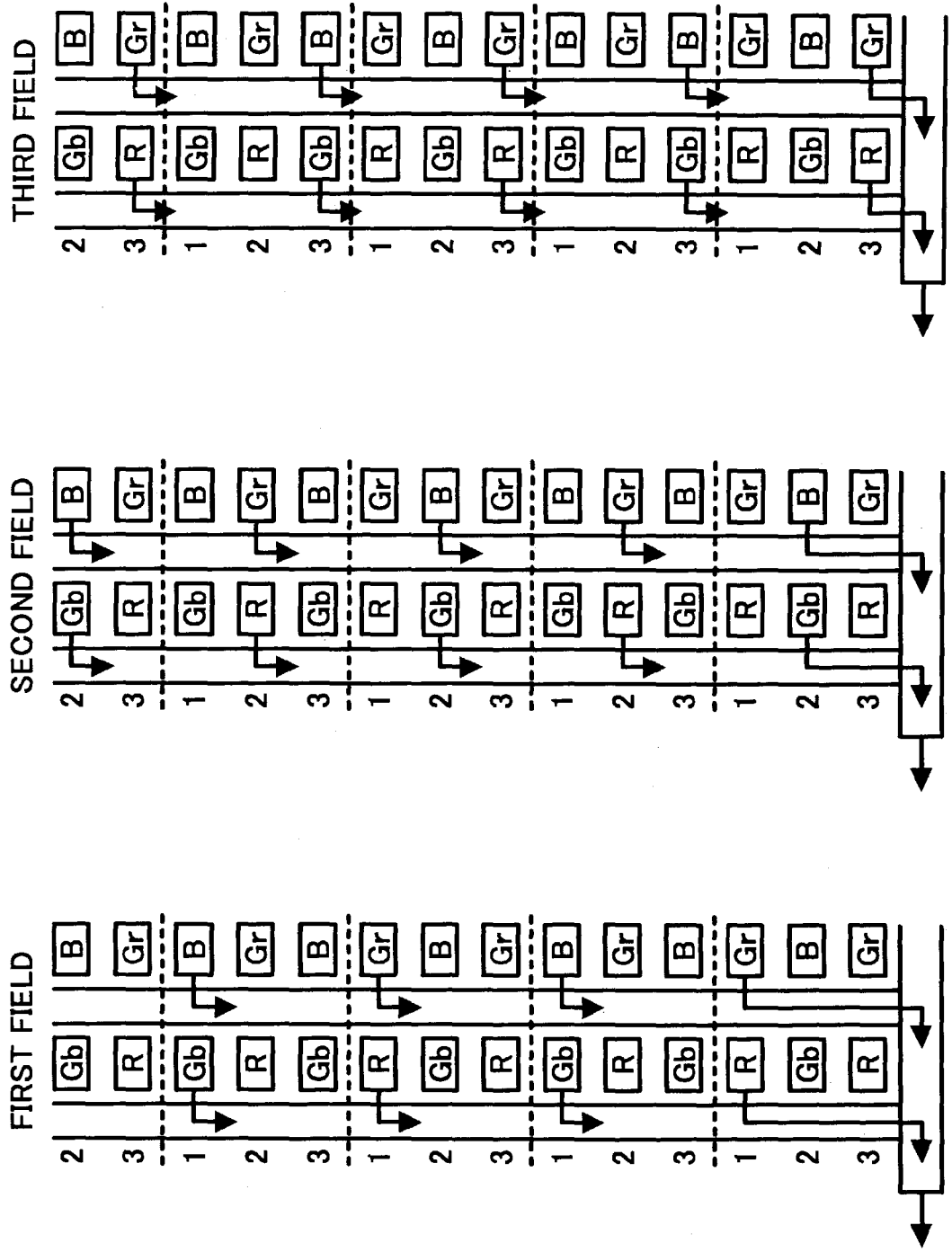

FIG. 11

COLOR FILTER IN A PRIMARY COLOR SYSTEM

|   |   |   |   |   |   |   |   |   |
|---|---|---|---|---|---|---|---|---|
| 1 | R | G | R | G | R | G | R | G |
| 2 | G | B | G | B | G | B | G | B |
| 3 | R | G | R | G | R | G | R | G |
| 1 | G | B | G | B | G | B | G | B |
| 2 | R | G | R | G | R | G | R | G |
| 3 | G | B | G | B | G | B | G | B |
| . | R | G | R | G | R | G | R | G |
| . | G | B | G | B | G | B | G | B |

.

COLOR FILTER FOR A COMPLEMENTARY COLOR SYSTEM

|   |   |   |   |   |   |   |   |   |
|---|---|---|---|---|---|---|---|---|
| 1 | C | Y | C | Y | C | Y | C | Y |
| 2 | G | M | G | M | G | M | G | M |
| 3 | C | Y | C | Y | C | Y | C | Y |
| 1 | G | M | G | M | G | M | G | M |
| 2 | C | Y | C | Y | C | Y | C | Y |
| 3 | G | M | G | M | G | M | G | M |
| . | C | Y | C | Y | C | Y | C | Y |
| . | G | M | G | M | G | M | G | M |

.

1 FRAME WITH 2 FIELDS

1 FRAME WITH 3 FIELDS

FIG. 18A

|   |   | 1 | 2 | 3 | 4 | 5 | 6 | 7 | 8 | 9 COLUMN |
|---|---|---|---|---|---|---|---|---|---|---|
| A | 1 | R | Gr | R | Gr | R | Gr | R | Gr | R |
| C | 2 | Gb | B | Gb | B | Gb | B | Gb | B | Gb |
| B | 3 | R | Gr | R | Gr | R | Gr | R | Gr | R |
| A | 4 | Gb | B | Gb | B | Gb | B | Gb | B | Gb |
| C | 5 | R | Gr | R | Gr | R | Gr | R | Gr | R |
| B | 6 | Gb | B | Gb | B | Gb | B | Gb | B | Gb |
| A | 7 | R | Gr | R | Gr | R | Gr | R | Gr | R |
| C | 8 | Gb | B | Gb | B | Gb | B | Gb | B | Gb |
| B | 9 | R | Gr | R | Gr | R | Gr | R | Gr | R |

ROW

FIG. 18B

|   |   | 1 | 2 | 3 | 4 | 5 | 6 | 7 | 8 | 9 |
|---|---|---|---|---|---|---|---|---|---|---|
| A | 1 | R | Gr | R | Gr | R | Gr | R | Gr | R |
| A | 4 | Gb | B | Gb | B | Gb | B | Gb | B | Gb |
| A | 7 | R | Gr | R | Gr | R | Gr | R | Gr | R |

A FIELD

FIG. 18C

|   |   | 1 | 2 | 3 | 4 | 5 | 6 | 7 | 8 | 9 |
|---|---|---|---|---|---|---|---|---|---|---|
| B | 3 | R | Gr | R | Gr | R | Gr | R | Gr | R |
| B | 6 | Gb | B | Gb | B | Gb | B | Gb | B | Gb |
| B | 9 | R | Gr | R | Gr | R | Gr | R | Gr | R |

B FIELD

FIG. 18D

|   |   | 1 | 2 | 3 | 4 | 5 | 6 | 7 | 8 | 9 |
|---|---|---|---|---|---|---|---|---|---|---|
| C | 2 | Gb | B | Gb | B | Gb | B | Gb | B | Gb |
| C | 5 | R | Gr | R | Gr | R | Gr | R | Gr | R |
| C | 8 | Gb | B | Gb | B | Gb | B | Gb | B | Gb |

C FIELD

WHEN THERE IS ANY WHITE TEMPERATURE FLAW ON RED IN THE A FIELD

|   |   |   |   |   |   |   |   |   |
|---|---|---|---|---|---|---|---|---|
| 1 | R | G | R | G | R | G | R | G |
| 2 | G | B | G | B | G | B | G | B |
| 3 | R | G | R | G | R | G | R | G |
| 1 | G | B | G | B | G | B | G | B |
| 2 | R | G | R | G | R | G | R | G |
| 3 | G | B | G | B | G | B | G | B |
| . | R | G | R | G | R | G | R | G |
| . | G | B | G | B | G | B | G | B |
| . |   |   |   |   |   |   |   |   |

FIG. 33B

|   |   |   |   |   |   |   |   |   |
|---|---|---|---|---|---|---|---|---|
| 1 | C | Y | C | Y | C | Y | C | Y |
| 2 | G | M | G | M | G | M | G | M |
| 3 | C | Y | C | Y | C | Y | C | Y |
| 1 | G | M | G | M | G | M | G | M |
| 2 | C | Y | C | Y | C | Y | C | Y |
| 3 | G | M | G | M | G | M | G | M |
| . | C | Y | C | Y | C | Y | C | Y |
| . | G | M | G | M | G | M | G | M |
| . |   |   |   |   |   |   |   |   |

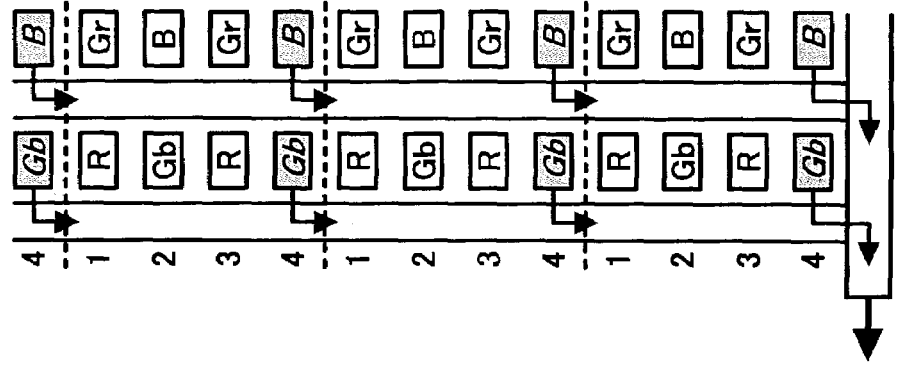
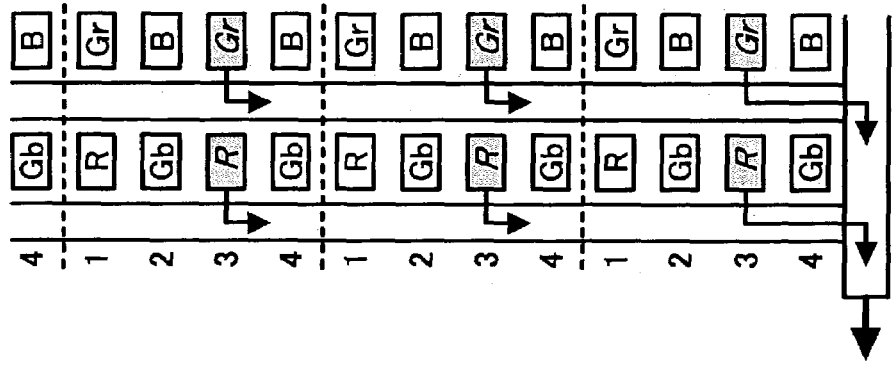
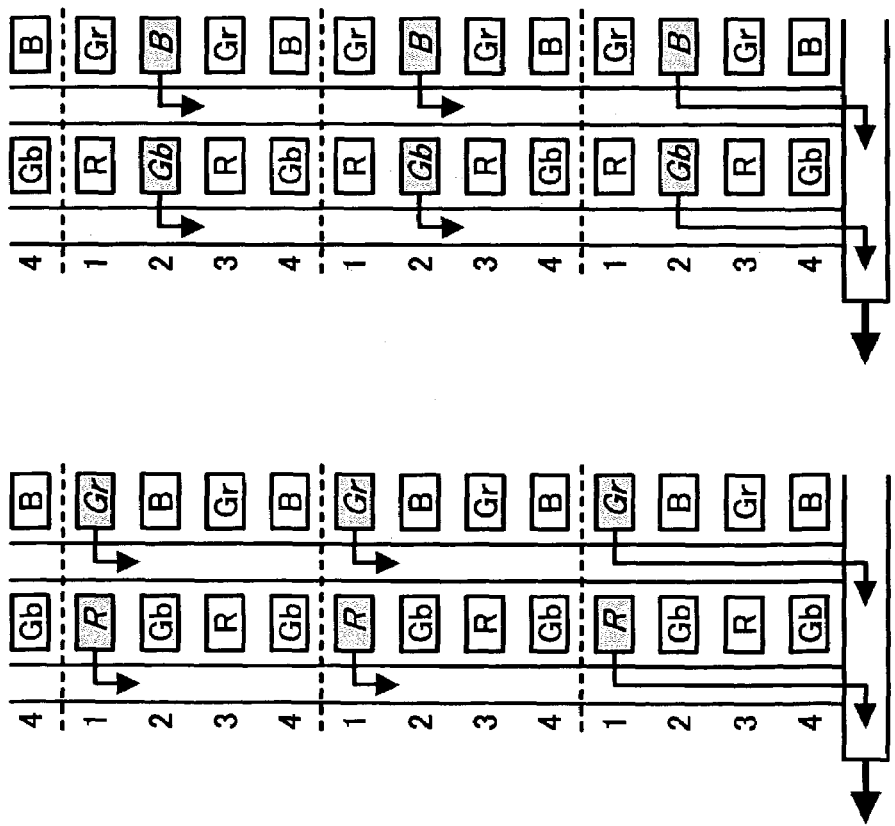

PHOTOGRAPHING APPARATUS AND PHOTOGRAPHING METHOD

BACKGROUND OF THE INVENTION

1. Field of the Invention

The present invention relates to a photographing apparatus such as a digital still camera and a photographing method using a photographing device in an interlacing transfer system where upon transferring electric charges stored in a photographing device the total pixels are divided into a plurality of fields, and a color signal comprising at least RGB or YeCyMgG is involved in transfer data in each field.

Incidentally, the present invention further relates to a dynamical defect involved in a digital still camera constructed with a solid pick-up device such as a CCD and furthermore relates to an image information processing apparatus.

2. Description of the Prior Art

In a digital still camera where CCDs are employed as pick-up devices, a cell constituting each pixel of the CCD generates electric charges in response to the rate of received light. The amount of electric charges in each cell are read out as the value of pixels, which value of pixels is outputted subsequently from the CCD as image data for a photograph per 1 frame.

In a photographing apparatus used for a prior art digital camera, there are known transfer of electric charges from a photographing device in conformity with an interlacing system where reading is performed twice or a progressive system where readout is performed once.

These systems have merits and demerits. For example, a digital camera disclosed in Japanese Laid-Open Patent Publication No. 2001-285688 operates in both systems of interlace transfer and progressive transfer. The interlacing transfer system in the above disclosure provides a high quality image by making use of a single shot mode with a shutter although long processing time is required, while the progressive transfer system ensures high speed by making use of a continuous photographing mode where a signal of a one pixel train is transferred to a plurality of pixel trains without the use of a shutter, although smear might happen.

Further, in accordance with a video camera, a measurement of light, and a detection method for focusing disclosed in Japanese Laid-Open Patent Publication No. Hei 6-54250, preliminary photographing is performed to adjust the rate of exposure to light by making use of the divided one field in an interlace transfer system, and then to adjust a focused position.

However, in a photographing apparatus using pick-up devices in an interlacing transfer system with such a construction, upon electric charges stored in a pick-up device being transferred, the signal is classified into R, Gr signals and B, Gb signals in the case of color filters in a primary color system or into Ye, Cy signals and Mg, G signals in the case of color filters in a complementary color system, which are transferred in two fields of first and second fields as illustrated in FIG. 7. In this transfer system, data required for an image processing for the RGB signal or the YeCyMgG signal can not be obtained until the transfer of the two field fractions of the first and second fields to result in much time for the image processing. Further, even in preparations of an image for checking photographing and of a thumbnail image similar processing are performed while requiring some time.

In general, a CCD for use in a photographing apparatus includes as illustrated in FIG. 38 a pixel S arranged in a matrix, a vertical transfer register VR provided for each vertical line along a horizontal one side of each pixel S, and a horizontal transfer register HR provided on the side of a final end of each vertical transfer register VR. In this CCD, any one among three primary filters of R (red), G (green), and B (blue) is disposed on each pixel S. The pixel S on which the R filter is disposed converts the light of R and outputs an R signal, and a pixel S on which a G filter is disposed converts the light of B and outputs a G signal, and a pixel S on which a B filter is disposed converts the light of B and outputs a B signal.

In the foregoing three primary color filters, regions from which the respective signals are outputted are arranged horizontally in the order of R, G, R, G . . . or G, B, G, B, and a horizontal line (hereinafter referred to as an RG line)of the arrangement of the color filters of R, G, R, G . . . and a horizontal line (hereinafter referred to as a GB line) of the arrangement of the color filters of G, B, G, B . . . are alternately provided. It is noticed that in order to discriminate the G signal from the RG line and the G signal from the GB line the G signal from the RG line is described as a Gr signal and the G signal from the GB line as a Gb signal in the figure.

In the prior art interlacing transfer method, upon transferring electric charges stored in the CCD constructed as described above the regions are divided into the field constructed from the GB line (refer to FIG. 4(a).) and the field constructed from the RG line (refer to FIG. 4(b).) for transfer with two fields.

In the prior art transfer system, however, the field constructed from the GB line contains only the Gb signal and the B signal, while the field constructed from the RG line contains only the R signal and the Gr signal. More specifically, since all kinds of RGB signals are transferred only after the transfer of the two fields is finished, data required for the image processing of ROB cannot be obtained until the transfer of all fields is finished.

It is accordingly impossible to prepare image characteristic data in the whole of an image up to the completion of the transfer of the image, and hence it is impossible to start image processing thereafter. There is therefore problems that much time is required until the image processing is completed and too much time is required until the next photographing since the photographing.

Further, in such a digital camera which employs a CCD as a photographing device a cell of the CCD constructing each pixel generates electric charges in response to the quantity of received light. The quantity of the electric charges in each cell is read as the value of pixels, which value is in turn outputted in succession from the CCD as image data for a photographic image of 1 frame. The digital still camera is improved in its miniaturization and in high resolution. This however causes a severe problem of a pixel defect occurring on part of each cell constructing a pixel as the number of such pixels is increased.

The pixel defect of this kind includes defects called a white defect, a white defect, an in-bright white defect, and a temperature white defect. The black defect originates from dust and the like deposited on a light incident surface of a pixel, and the in-bright white defect originates a defect on a color filter or a micro-lens disposed on the light incident surface.

Any of these black defect and in-bright white defect is a static defect happening irrespective of an operation temperature environment of a CCD, which is being improved as a technique of the manufacture of a semiconductor for use in the manufacturing process of a CCD.

In contrast, the temperature white defect is also called a dark current defect, which is a dynamical one influenced by a change in a dark current and accumulation of electric charges, i.e., a change in the temperature of a CCD and a change in exposure time to light.

For correcting the temperature white defect being a dynamical defect, Japanese Laid-Open Patent Publication No. 2000-10192 or No. 2000-224487 proposes a technique wherein an address of a pixel where the temperature white defect of a CCD occurs is previously stored in a memory, and the value of a defective pixel is corrected on the basis of an address stored in the memory upon photographing with a digital still camera.

However, the temperature white defect changes owing to temperature and exposure time to light, so that for obtaining the address of a pixel on which the temperature white defect occurs it is necessary to take temperature and exposure time to light as parameters, and investigate on which pixel a temperature white defect of a level causing a problem under the conditions of those parameters, and prepare an address table thereof.

Such an investigation is required for every combination of the parameters, so that much labor is required for the preparation of an address table for the defective pixels, and hence it is not practical. Further, even if all address data about the temperature white defect can be prepared with a linear interpolation method from part of address data, there are required a temperature sensor for measuring operation temperature being one of the parameters and a memory for storing an address table in which addresses of defective pixels are listed. This causes a difficulty that the cost of the camera is increased.

A photographing apparatus is known as an electronic still camera in which electric charges of all pixels accumulated in response to an image focused with imaging means are transferred to a photographing device equipped with color filters for color decomposition, and predetermined image processing is executed to form an image, and which is being assembled as part of functions of a portable information terminal such as a cellular phone and a computer apparatus.

Further, for the photographing apparatus, there is being generalized "a photographing device in an interlacing transfer system in which upon electric charges of all stored pixels being transferred data transfer of the electric charges is executed, divided into a plurality of fields" to deal with an increase of the number of pixels and a requirement of making the device compact.

For example, when in a color electronic still camera for use in a photographic device in such an interlacing transfer system color filters for color decomposition are of a primary color system of red (R), green (G), and blue (B), information involved in one field is red (R)-green (G) information or blue (B)-green (G) information, and hence necessary information for preparing a color image is not obtained only with the one field.

In prior art, in such an electronic still camera there is a problem that until the transfer of all fields is finished, in other words until transfer of all electric charges accumulated on a photographic device is finished, no image processing is executed, for example "the time required for displaying a conformation image of photographing" is increased.

Further, in the aforementioned electronic still camera information of all electric charges is an object of the image processing, so that the image processing time requires a predetermined time irrespective of set resolution and a compression rate, which causes a problem of "inconvenience" where even when an object originally requiring less image information such as "images for low resolution and for high compression rate", much time is required until the next photographing is enabled.

It is, therefore, an object of the present invention to provide a photographing device and a photographing method capable of solving the aforementioned problems.

To accomplish the above object, according to the present invention a photographing apparatus of interlace transferring type is provided. In one embodiment, it comprises:

a photographing device which carries out transfer of electrification of all pixels stored in the photographing device by dividing into a plurality of fields when transferring the electrification and which has a plurality of color filters and which includes a color signal of at least RGB or YeCyMgG in said transfer data of each field for transferring said electrification; extraction means for extracting characteristic data of image from transferred data before processing for image is started;

generating means for generating control value carrying out correction of image based on said extracted characteristic data; and photographing processing means for processing image by use of control value formed by said characteristic data.

In the other embodiment, a photographing apparatus of interlace transferring type comprises:

a photographing device which carries out transfer of electrification of all pixels stored in the photographing device by dividing into a plurality of fields when transferring the electrification and which has a plurality of color filters and which includes a color signal of at least RGB or YeCyMgG in said transfer data of each field for transferring said electrification;

extraction means for extracting characteristic data of image from transferred data before processing for image is started; generating means for generating control value carrying out correction of image based on said extracted characteristic data;

photographing processing means for processing image by use of control value formed by said characteristic data; and selection means for selecting either a first mode for processing and recording the transfer data of all pixels accumulated in said photographing device or a second mode for processing and recording transfer data of pixels less than said all pixels, wherein in said second mode selected by said selection means, later transferred data is processed and recorded by the control value generated by said characteristic data extracted from the previously transferred data with division of the plurality of fields.

The color filter provided in the photographing device is composed of original color of RGB.

The color filter provided in the photographing device is composed of complementary color of YeCyMgG.

The apparatus has an interlace (or interlacing) transfer in which transfers of 3 times carried out by dividing the plurality of fields are achieved and each field is thinned perpendicularly into ⅓.

The characteristic data of image is color distribution for control of white balance and control value for white balance is generated based on said characteristic. The characteristic data of image is also data in which edge component within a screen is extracted and a control value for enhancing the edge is generated based on the characteristic data. The characteristic data of image is data in which a color information within a screen is extracted and a control value of color converting coefficient is generated based on said characteristic data. The characteristic data of image is data in which distribution of brightness within a screen is extracted and a control value of contrast correction is generated based on said characteristic data.

The photographing apparatus generates processes image of digitalization and said characteristic data of image is data in which distribution of brightness within a screen is extracted and threshold of digitalized processing based on said characteristic data is generated as a control value.

According to the present invention, an photographing method of interlace transferring type is provided. The method comprises the steps of:

dividing data transfer of electrification of all pixels stored in an photographing device of interlace transferring type into a plurality of fields when transferring the electrification; providing a plurality of color filters in said photographing device; receiving transfer data from said image element which transfers data including a color signal of at least RGB or YeCyMgG to each field; extracting characteristic data of image from the transferred data; and generating a control value of effecting correction of image based on the extracted characteristic data to make image processing using said control value.

The present invention provides an photographing method of interlace transferring type comprising the steps of:

dividing data transfer of electrification of all pixels stored in an photographing device of interlace transferring type into a plurality of fields when transferring the electrification; providing a plurality of color filters in said photographing device;

receiving transfer data from said image element which transfers data including a color signal of at least RGB or YeCyMgG to each field;

extracting characteristic data of image from the transferred data;

generating a control value of effecting correction of image based on the extracted characteristic data to make image processing using said control value; and processing and recording later transferred data by the control value generated by said characteristic data extracted from the previously transferred data with the division in the plurality of fields.

Transfers of 3 times of electrification are carried out by dividing into the plurality of fields and thinning perpendicularly each field into $1/3$.

The photographing apparatus includes a solid photographing device which has a plurality of pixels compartmentalized in every predetermined regions and in which a pixel for detecting a pixel value of each color of three original colors through a color filter of said plurality of pixels is arranged in said regions. The photographing device is determined so that a defecting pixel for generating a white scratch of temperature which changes according to temperature is one or less in each region, each pixel value of all the pixels in the solid photographing device being read out with division of fields of three or more to form an image of one frame based on the read out pixel value.

The apparatus comprises:

means for obtaining a difference about the pixel value among the pixels at arranged positions corresponding to first and second fields detected through color filters of the mutually same color arrangement every said regions; and means for judging that when a difference between two pixels exceed a predetermined threshold, one pixel of the two is the defecting pixel and for amending a pixel value of the one pixel based on a pixel value of the other pixel of the two.

The pixel value of said one pixel is rewritten by the pixel value of the other pixel.

The apparatus further comprises means for obtaining a difference between a predicated value predicated by a pixel value of each pixel of a third field from each pixel of the first and second fields and a pixel value obtained from each pixel of the third field, and means for judging that when the difference obtained by the said means for obtaining the difference exceeds said predetermined threshold, the pixel of the third field is said defective pixel and for rewriting the pixel value of the defective pixel by said predicated value.

When a photographing mode of indicating elimination of the number of pixels is selected, a field having a less defective pixel is selected about all three original colors, and an image of one frame is formed from a pixel value of pixel of the field. The photographing mode is a continuous taking-out mode.

A correcting device for defect of ordinary temperature is provided at prior to said correcting device for white defect of temperature. The correcting device for defect of ordinary temperature amending a defect of ordinary temperature which does not depend on temperature of said pixel previously to effect amendment of the pixel value of the defective pixel by said correcting device for white defect.

Further, a photographing method is provided, in one embodiment, it comprises the steps of:

preparing a solid photographing device which has a plurality of pixels compartmentalized in every predetermined regions and in which a pixel for detecting a pixel value of each color of three original colors through a color filter of said plurality of pixels is arranged in said regions, said photographing device being determined so that a defecting pixel for generating a white scratch of temperature which changes according to temperature is one or less in each region, each pixel value of all the pixels in the solid photographing device being read out with division of fields of three or more to form an image of one frame based on the read out pixel value;

obtaining a difference about the pixel value among the pixels at arranged positions corresponding to first and second fields detected through color filters of the mutually same color arrangement every said regions; and judging that when a difference between two pixels exceed a predetermined threshold, one pixel of the two is the defecting pixel and for amending a pixel value of the one pixel based on a pixel value of the other pixel of the two.

In the other embodiment, a photographing method comprises the steps of:

dividing data transfer of electrification of all pixels stored corresponding to an image focused on an photographing device having a color filter for resolving color by means of a focused means into M($\geq$3) fields; and carrying out image processing including at least YUV conversion by use of transfer data of m (<M) fields in which all color signals and necessary number of pixel are get.

In one embodiment, number of fields: M is odd number of 3 or more, m=1.

In the other embodiment, number of fields: M is even number of 4 or more, m=2.

When the transfer data of m field is get, image processing including at least YUV conversion is immediately carried out.

An image for confirming photographing is made by image processing including YUV conversion.

A thumbnail image is made by image processing including YUV conversion.

Condition of an image to be formed is set and image processing is carried out by use of transfer data of n (m$\leq$n$\leq$M) field to make said image to be formed.

Condition of an image to be formed is resolution of image and n is number of field in which number of pixel necessary to make an image of the set resolution is get.

As an example, M=3, an image of low resolution is prepared with respect to number of field: n=1, an image of middle resolution is prepared with respect to number of field: n=2, and an image of high resolution is prepared with respect to number of field: n=M.

In one example, M=4, an image of low resolution is prepared with respect to n=2, images of middle and/or high resolutions are prepared with respect to number of field; n=M.

In one example, M=6, an image of high resolution is prepared with respect to n=M, an image of low resolution is prepared with respect to number of field: n=2 or an image of middle resolution or low resolution is prepared with respect to number of field; n=4.

Condition of an image to be formed is compressibility of image, and n is number of field in which number of pixel necessary to make the image of the set compressibility is get.

In one example, M=3, processing of compressing the image is carried out on format of JPEG with respect to number of field: n=1.

In the other example, M=4 or 6, processing of compressing the image is carried out on format of JPEG with respect to number of field; n=2.

Further, an photographing apparatus is provided comprising;

a photographing device having a color filter for resolving color;

photographing means for focusing an image to be photographed on said photographing device;

a photographing processing part for converting to digital signal electrification stored in said photographing device and transferred; and means for carrying out image processing including at least YUV conversion by use of transfer data transferred through said imaging processing part, wherein said photographing device is interlace transferring type and divides data transfer of electrification of stored all pixels into M($\geq$3) fields.

The color filter of the photographing device is composed of original colors of red (R), green (G) and blue (B).

The color filter of the photographing device is composed of complementary color of yellow (Y), cyan (C), magenta (M) and green (G).

In one example, M is 3 in the photographing device of interlace transferring type, and said apparatus embodies said photographing method as recited in claim 17 or 22.

In one example, M is 4 or 6 in the photographing device of interlace transferring type, and said apparatus embodies said photographing method as recited in claim 18, 19 or 22.

The apparatus can embodies the photographing method and has a displaying part for displaying an image for confirming pick up and/or an image of thumbnail.

The apparatus has also a removable exterior memory for storing the formed image.

The apparatus has an image holding section for storing the formed image.

An information processing apparatus of image comprising said photographing apparatus is also provided.

BRIEF DESCRIPTION OF THE DRAWINGS

FIG. 4 is a view illustrating color filters each for R, Gr signals in a primary color system, and for Ye, Cy signals and Mg, G signals in a complementary system;

FIG. 9 is a schematic view illustrating the transfer of data in a photographing device (CCD) in a 3:1 interlacing transfer system in which a transfer passage for electric charges stored in a CCD in the embodiment of the present invention is divided into 3 fields, including all RGB signals in each field;

FIG. 11 is a view illustrating color filters for R, Gr signals in a primary color system and for Ye, Cy signals and Mg, G signals in a complementary color system;

FIG. 18 is (*a*) a view illustrating the exemplary arranged of color filters in one region of an image on the CCD illustrated in FIG. 15, and (*b*) to (*d*) are views each illustrating an example of a color arranged for each field in the one region.

FIG. 21 is such a view as in the same fashion illustrated in FIG. 20 about one region where a temperature defect is existent on a red color in the first field;

FIG. 22 is a similar view to that illustrated in FIG. 20 with respect to one region where a temperature defect is existent on a red color in the first field;

FIG. 23 is a similar view to that illustrated in FIG. 20 with respect to one region where a temperature defect is existent on a blue color in the second field;

FIG. 24 is a similar view to that illustrated in FIG. 20 with respect to one region where any temperature defect is existent on a green color in the second field;

FIG. 25 is a similar view to that illustrated in FIG. 20 with respect to one region where any temperature defect is existent on a red color in the second field;

FIG. 28 is an identical view in FIG. 20 with respect to one region where any temperature defect is existent on a red color in the third field;

FIG. 33 is views illustrating a color filter for color decomposition included in a photographing device, (a) one in a primary color system and (b) one in a complementary system;

FIG. 37 is a view illustrating the interlacing transfer system in the case of M=4.

DETAILED DESCRIPTION OF THE PREFERRED EMBODIMENTS

In what follows, there will be described the preferred embodiments of the present invention with reference to the accompanying drawings.

Figure 1:
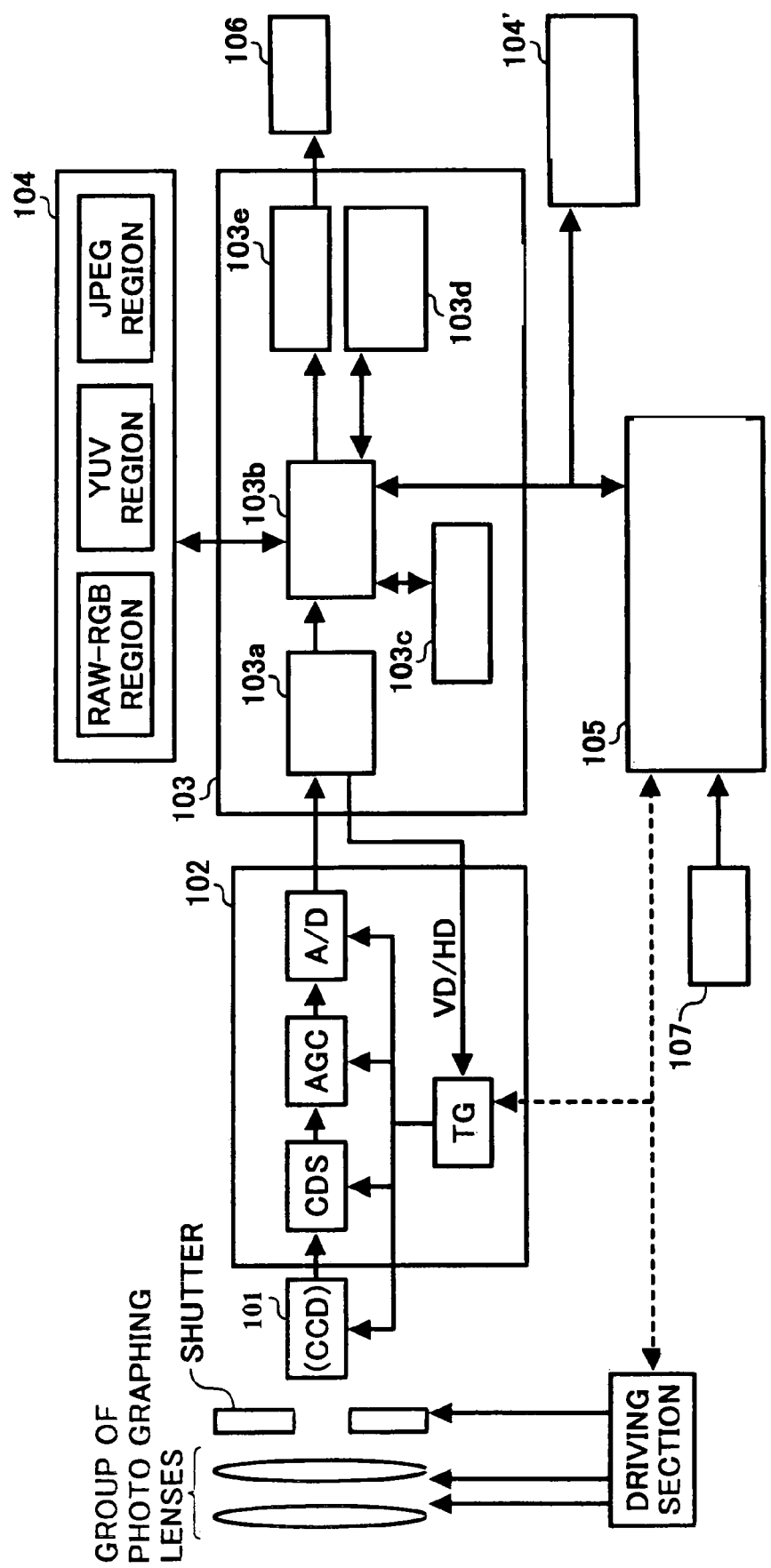
FIG. 1 is a block diagram substantially illustrating the construction of a digital camera including a photographing apparatus in a first preferred embodiment of the present invention.

Referring to FIG. 1, a block diagram illustrating the construction of a digital camera including a photographing apparatus in a preferred embodiment of the first invention is provided. The preferred embodiment exhibits as an example a photographing apparatus employing a photographing device in a 3:1 interlacing transfer system containing all RGB signals in each field by dividing electric charges stored in the photographing device to 3 fields upon transferring the electric charges.

In FIG. 1, designated at 101 is a photographing device (referred hereinafter to as a CCD.) which includes a primary color system RGB color filter and transfers electric charges by dividing them to 3 fields, 102 is a photographing/processing section (including CSD: Correlated Double Sampling Circuit, AGC (Automatic Gain Control Circuit), A/D (Analog/Digital Converter Circuit), TG (Timing Generation Circuit, etc.), which takes out an image focused on a CCD surface after entering the same surface through a group of photographing lenses and a shutter as an analog image signal and converts it to a digital image signal, 103 is a signal processing section for executing a processing such as storing a digital image signal in a memory section (SDRAM) 104 through the CCD-I/F 103a, and a memory controller 103b, 105 is a control section (CPU) for controlling each section, 106 is a display section for displaying an image for confirming photographing and a thumb-nail image, and 107 is an operation section for inputting each setting for the digital camera.

Figure 2:
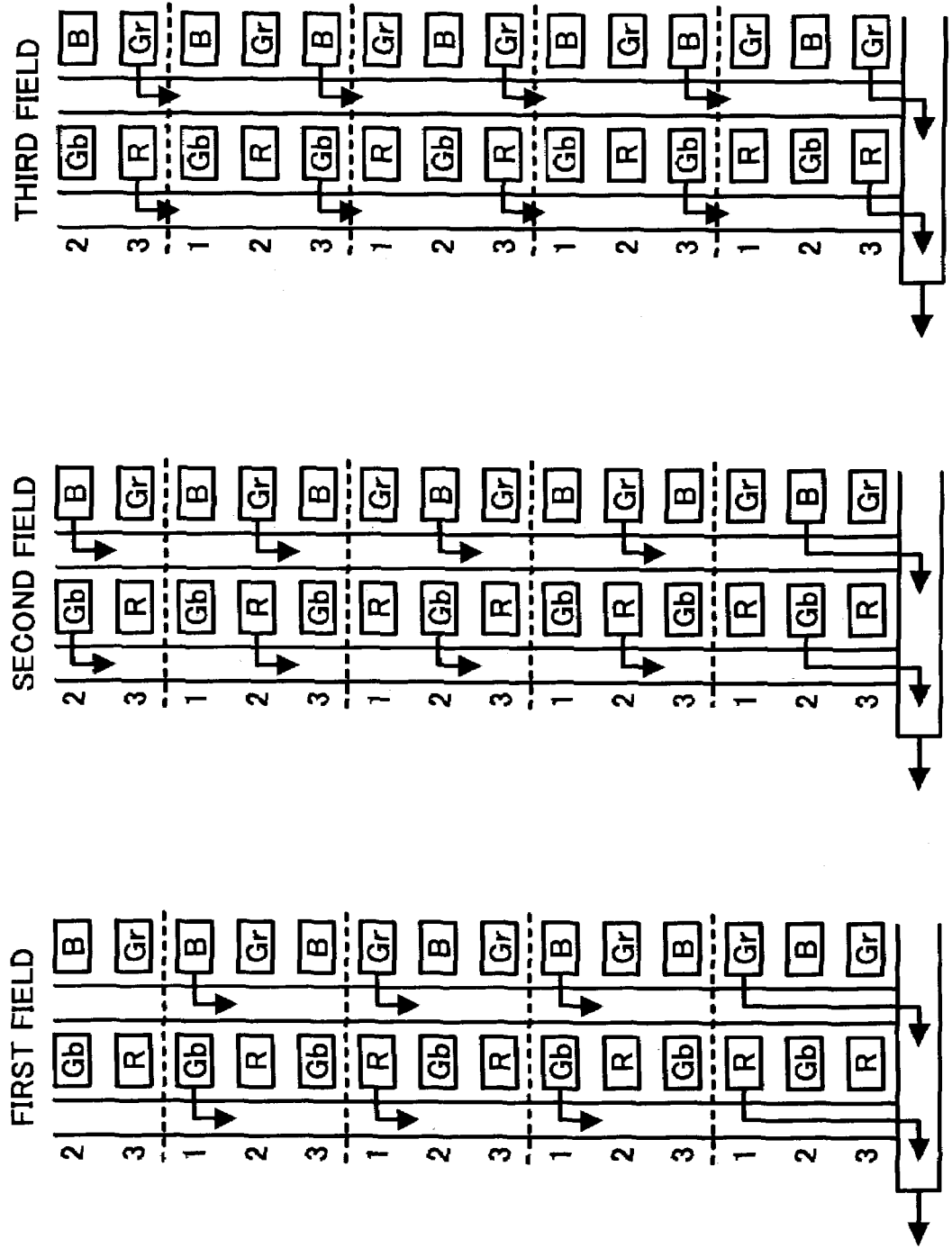
FIG. 2 is a schematic view illustrating the transfer of data on a photographing device (CCD: Charge Coupled Device) in a 3:1 interlacing transfer system containing all RGB signals in each field by dividing a transfer medium into 3 fields for transferring electric charges stored in the CCD in the first embodiment of the present invention.

Referring further to FIG. 2, a schematic is provided illustrating the transfer of data in CCD, on which there are provided color filters of a primary color system in a 3:1 interlacing transfer system containing all RGB signals in each field obtained by dividing electric charges stored in the CCD in the present embodiment into 3 fields upon the transfer of those electric charges.

Figure 3A:
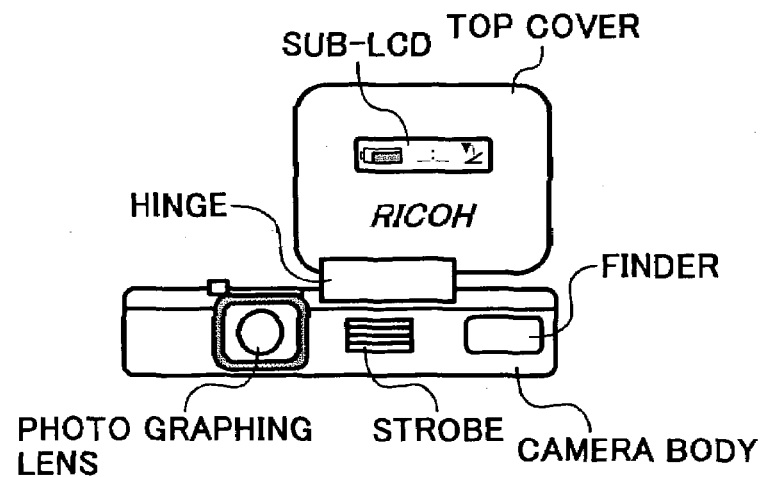
FIG. 3 is (*a*) a front view, (*b*) a side view, and (*c*) an upper view respectively illustrating an external appearance of a digital camera including the photographing apparatus in the embodiment of the present invention.
Figure 3B:
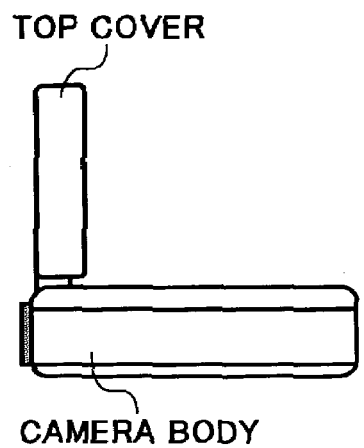
Figure 3C:
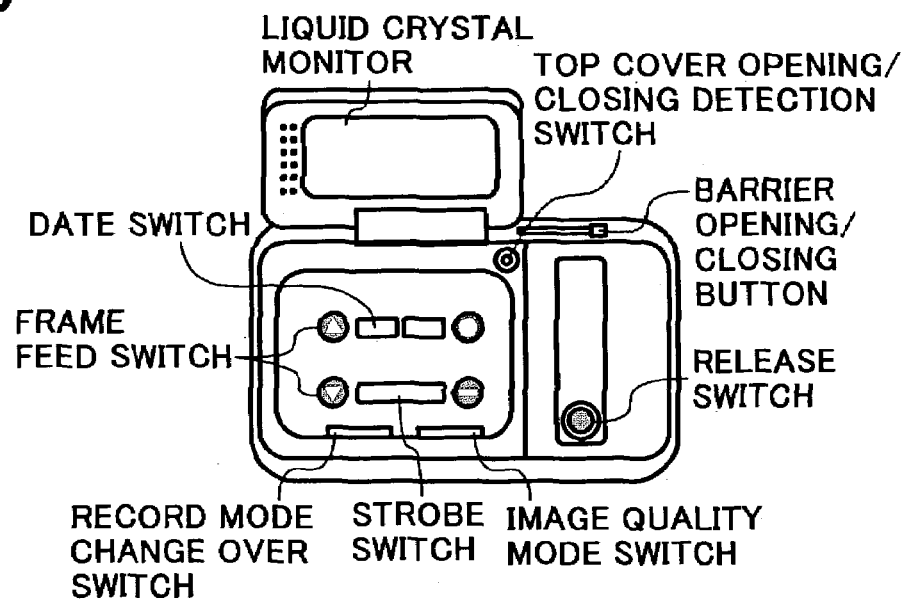

Referring further to FIG. 3(a), a front view is provided illustrating an external appearance of the digital camera including the photographing apparatus in the present embodiment, with FIG. 3(b) a side view of the same and FIG. 3(c) an upper surface view of the same.

In a frame for executing transfer while assuming vertical 3 lines as 1 group, data is transferred assuming the line on which a numeral "1" is written as the first field, as illustrated in FIG. 2. The first field contains all components in the RGB signals. The image data is obtained on the basis of the transfer data containing all the RGB signals after the transfer of the first field has been completed.

After the transfer of the first field has been completed, the second and third fields are transferred respectively. R, Gr signals and B, Gb signals in the primary system illustrated in FIG. 2 may be replaced by Ye, Cy signals and Mg, G signals in the complementary color system (Refer to FIG. 4.).

Figure 5:
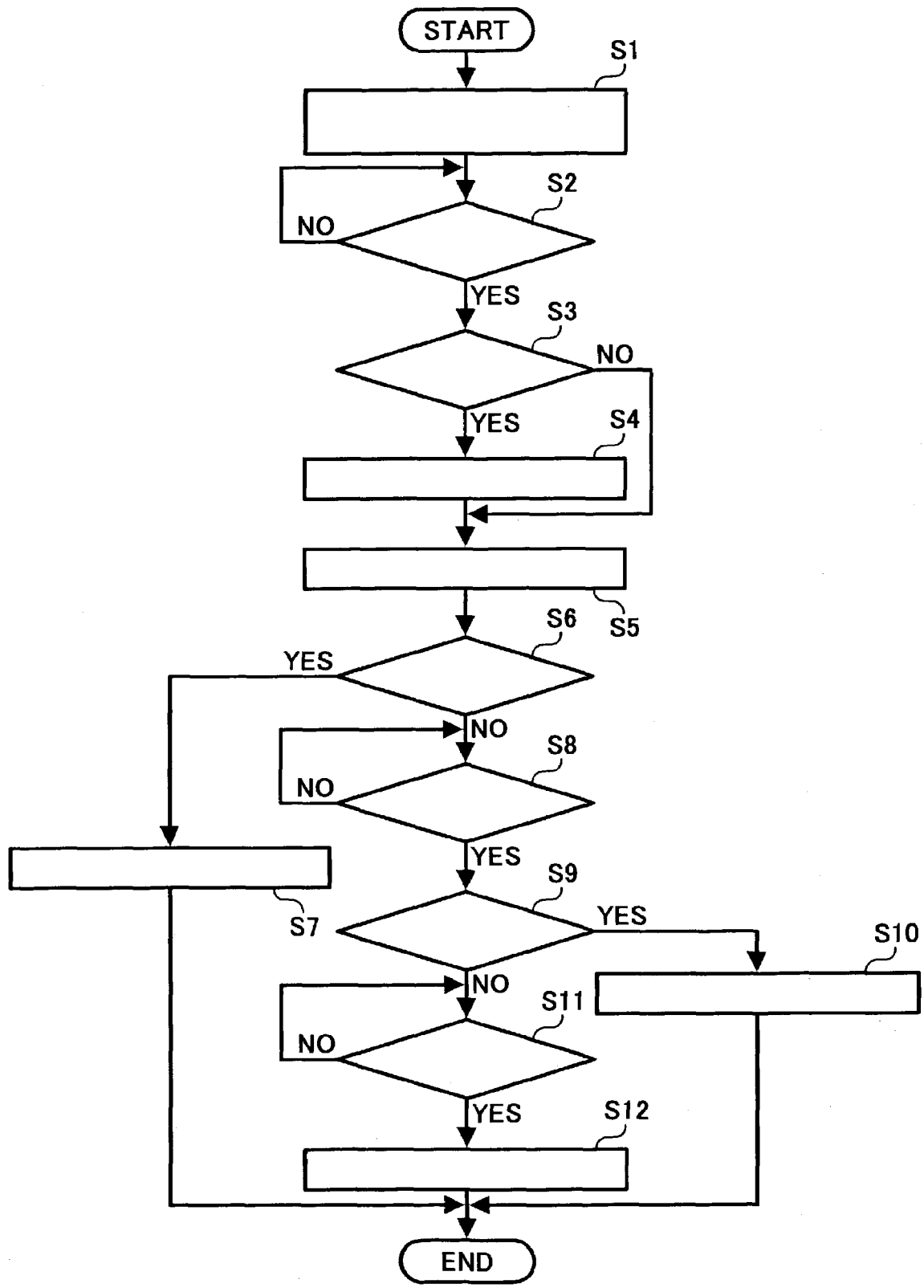
FIG. 5 is a flow chart illustrating the operation of the foregoing embodiment of the present invention.

In the following, the operation of the present embodiment will be described with reference to a flow chart in FIG. 5 and FIG. 1. First, data corresponding to the first field among the 3 fields as data of electric charges stored in the CCD 1in response to an image being a photographing object is transferred, and the transferred data are stored in the memory section 104 after mediating the photographing processing section 102 and then the CCD-I/F 103a in the signal processing section 3 and the memory controller 103b in step S1. It is confirmed that the transfer of the data in the first field has been completed in step S2, and at the time the data transfer has been completed (Yes in S2) it is confirmed whether or not setting for displaying an image for confirming the photographing is existent in step S3. Since all the data of the RGB signals of a pixel are contained in the data transferred from the first field, the image processing can be executed at the time the transfer has been completed.

When the operation is setting for displaying of the image for confirming the photographing in the processing S3 (Yes in S3), there is executed an image processing to prepare the image for confirming the photographing on the basis of the transfer data in the first field in step S4.

Further, when the operation is not setting for displaying of the image for confirming the photographing in the processing S3 (No in step S3), or after the finishing of the processing S4, an image processing for preparing a thumb-nail image is executed in step S5. Further, it is confirmed whether or not a resolution of an image to be prepared is set to be "low" in step S6, and when the setting is the "low" resolution (Yes in S6), the image processing is executed using the transfer data in the first field in step S7.

When the setting is not the "low" resolution (No in step S6), it is confirmed in step S6 whether or not the transfer of data in the second field has been completed, and further it is confirmed whether or not the resolution of an image to be prepared is set to "middle" in step S9. When the setting of the resolution is "middle" (Yes in step S9), the image processing is executed using the transfer data in the first and second fields in step S10.

Further, when the setting is not the "middle" resolution in S9 (No in S9), it is confirmed in step S11 that data transfer for the third field has been completed, and an image processing providing a high resolution is executed using the transfer data in the first, second, and third fields in step S12.

As described above, the transfer data from the CCD 101 are stored in the memory section 104 (RAW-RGB region) mediating the photographing processing section 102 and the CCDI/F 103a in the signal processing section 103 and the memory controller 103b.

For the transfer data in each field, as described previously in FIG. 5, the data of the RGB signal stored in the memory section 104 (RAWRGB region) through the memory controller 103b owing to the detection of the completion of the transfer of each field in response to the setting of the photographing confirmation image, and "low", "middle", and "high" of the resolution by a user are converted to the data of the YUV signal by the YUV (brightness color difference signal) conversion section 3c and is again stored in the memory section 104 (YUV region).

For example, the photographing confirmation image and the thumb-nail image prepared on the basis of the transfer data in the first field are displayed on the display section 106 through the display section I/F 103e. Further, upon the setting of the resolution "low" the data of the YUV signal is read from the memory section 104, and is subjected to a compression processing into a JPEG format, and is stored in the memory section 104 (JPEG region). Further, upon the date being stored in the memory section 104 (JPEG region) header data and the like are added to the data subjected to the JPEG compression, and are stored in the external memory section 104' by the control section 105 as the JPEG image data.

Further, upon the setting of the resolution "middle" the image processing is achieved using the transfer data in the first and second fields based upon the detection of the completion of the data transfer in the second field, and upon the setting of the resolution "high" the image processing is achieved using the transfer data in the first, second, and third fields based upon the detection of the completion of the data transfer in the third field.

To be concrete, when the CCD with 3 million pixels of horizontal 2048 pixels and vertical 1536 pixels is used, in the interlacing transfer system where divided transfer by 3 times is executed, data with horizontal 2048 pixels and vertical 512 pixels is transferred by the one time transfer. For this, when the size of horizontal 640 pixels and vertical 480 pixels (VGA) is recorded, an image can be formed on the basis of the number of transfer pixels in the first field. Further, data with horizontal 2048 pixels and vertical 1024 pixels is provided using the number of transfer pixels in the first and second fields (corresponding to 2 times) to form an image with the size of horizontal 1024 pixels and vertical 768 pixels (XGA) and with the size of horizontal 1280 pixels and perpendicular 1024 pixels.

Although when use is made of the transfer data in the first, second, and third fields, an image is extended horizontally with a different aspect ratio between horizontal pixels and vertical pixels, the aspect ratio can be adjusted by executing a processing such as reading with thinning from the memory section upon the conversion processing in the YUV conversion section.

Herein, provided that it is purposed to obtain the recording of an image with the size of VGA like the photographing confirmation image and the thumb-nail image, a photographed image can be satisfactorily processed with the transfer data in the first field, so that the processing of the data transfer in the first and second fields can be interrupted, and the processing jumps to the next photographing to speed up the processing. More specifically, use is made of transfer data in a field required for an image processing in response to the setting of a resolution, and the next photographing is started without executing data transfer in an unnecessary field.

Further, it is also possible to select transfer data in the first, second, and third fields transferred from the CCD for image processing in response to the setting of a compression ratio. For example, when an image is desired to be recorded and transmitted quickly, a choice is frequently made of a high compression ratio. So, when a high compression ratio is set, image processing is executed using transfer data in the first field, and in a middle compression ratio transfer data in the first and second fields are used and in a low compression ratio transfer data in the first, second, and third fields are used.

Figures 6, 7:
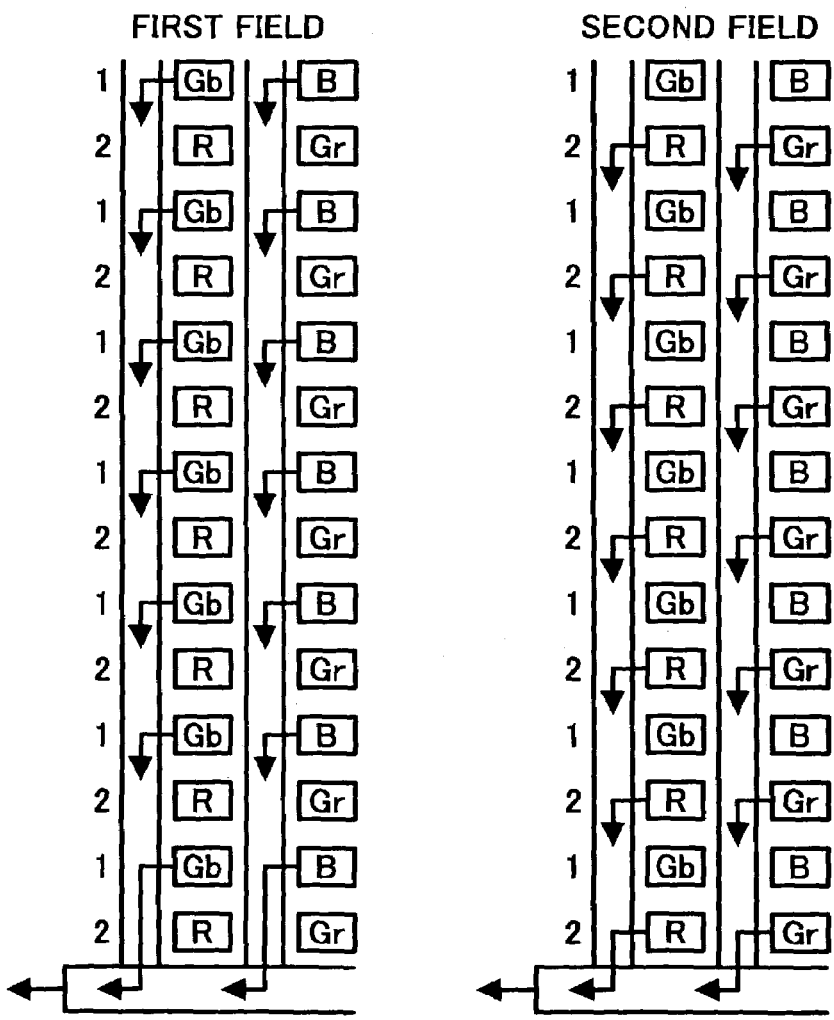
FIG. 6 is a view exemplarily illustrating a display on a set screen for recording in a digital camera in the embodiment of the present invention.
FIG. 7 is a schematic view illustrating the transfer of data in a prior art photographing device in an interlacing transfer system.

Referring to FIG. 6, there is provided a view exemplarily illustrating a select screen for setting a resolution on a liquid crystal monitor that is a display section of a digital camera. As illustrated in FIG. 6, at items of photographing confirmation image in the recording/setting screen a display "off" or display time "1 sec", "3 sec" are set, and at the item of a recorded image resolution "high", "middle", and "low" are inputted and set from an operation section. Further, also in the image compression ratio identical display is achieved and set with the choice of a user.

Although in the aforementioned description the data transfer divided into the three fields was taken as an example, provided that the number of pixels on the photographing device is increased with the transfer time of the number of all pixels being increased from now on, and further the VGA size is obtained from the number of transfer pixels in the divided 1 field, it is also considered that the number of divided fields is increased as in the case where pixels are divided into 5 fields for data transfer.

As described above, a high speed image processing is achieved by selecting an optimum processing in response to the setting of an image output previously set by a user.

In accordance with the present invention, as described above, upon transferring electric charges stored in a photographing device use is made of a photographing device in an interlacing transfer system where all color signals are contained in one field, and once data transfer in one field is finished, image data can be formed, and confirmation of a photographed image, shortening of processing time until the next photographing is started, and further an improvement of convenience of a user are achieved.

In the following, there will be described in detail a preferred embodiment of the second invention with reference to accompanying drawings.

Figure 8:
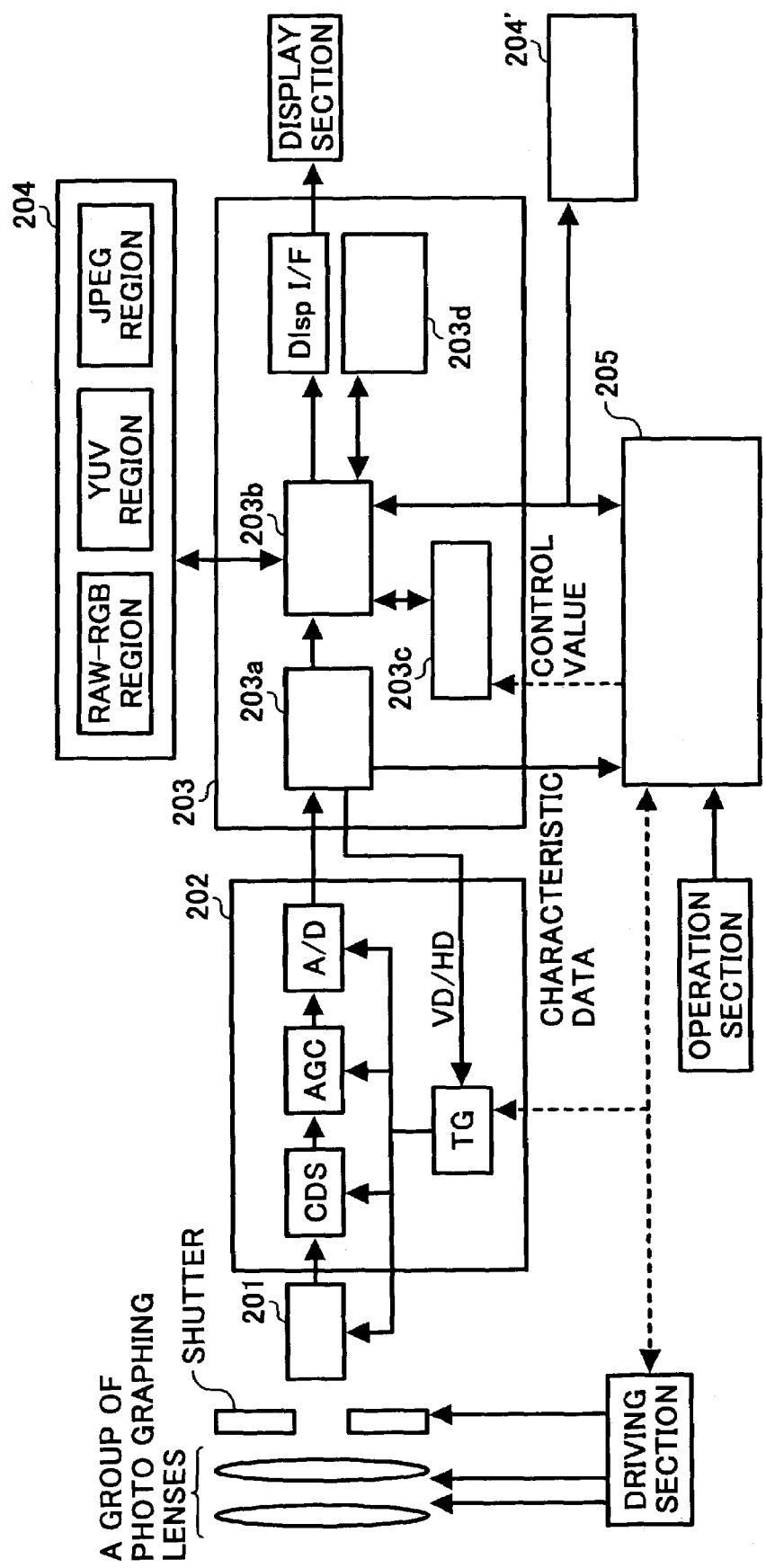
FIG. 8 is a block diagram substantially illustrating the construction of a digital camera including a photographing apparatus in a preferred embodiment of the present invention.

Referring to FIG. 8, there is provided a block diagram substantially illustrating the construction of a digital camera including a photographing apparatus in the preferred embodiment of the second invention. In the present embodiment, there is exemplarily taken a photographing apparatus using a photographing device in a 3:1 interlacing transfer system containing all RGB signals in each field by dividing the electric charges into three fields upon the electric charges stored in the photographing device being transferred.

In FIG. 8, designated at 201 is a photographing device (hereinafter, simply referred to as a CCD.) in which RGB color filters in a primary color system are provided for transferring electric charges while dividing the transfer 3 times; 202 is a photographing/processing apparatus for taking out as an analog image signal an image incident and focused on a CCD surface through a group of photographing lenses and a shutter, and converting it to a digital image signal (including a CSD (Correlated Double Sampling Circuit), an AGC (Automatic Gain Control Circuit), an A/D (Analog/Digital Conversion Circuit), and a TG (Timing Generation Circuit), etc.); 203 is a signal processing section for storing a digital image signal in a memory section (SDRAM) 204 through a CCD-I/F 203a and executing processing such as extracting characteristic data in an image; and 206 is a control section (CPU) for generating a control value for use in image correction based upon the extracted characteristic data, and controlling the respective sections.

Figure 10A:
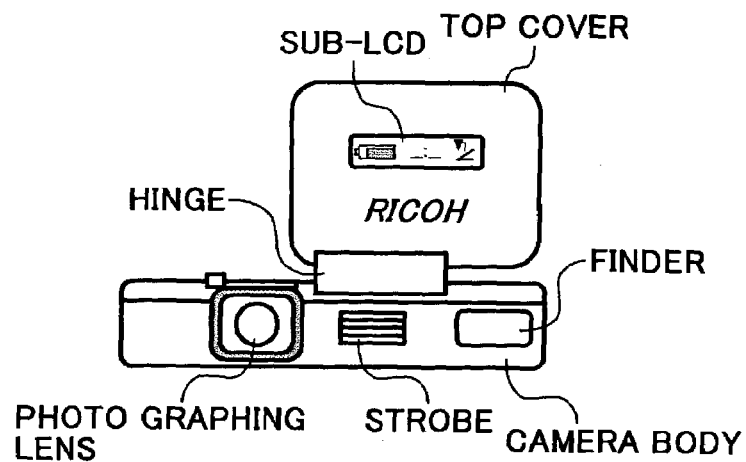
FIG. 10 is (*a*) front view, (*b*) a side view, and (*c*) an upper view illustrating an external appearance of the digital camera including the photographing device in the embodiment in FIG. 9.
Figure 10B:
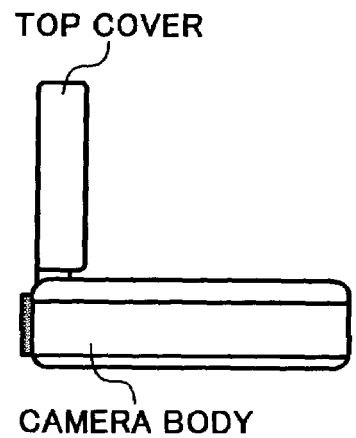
Figure 10C:
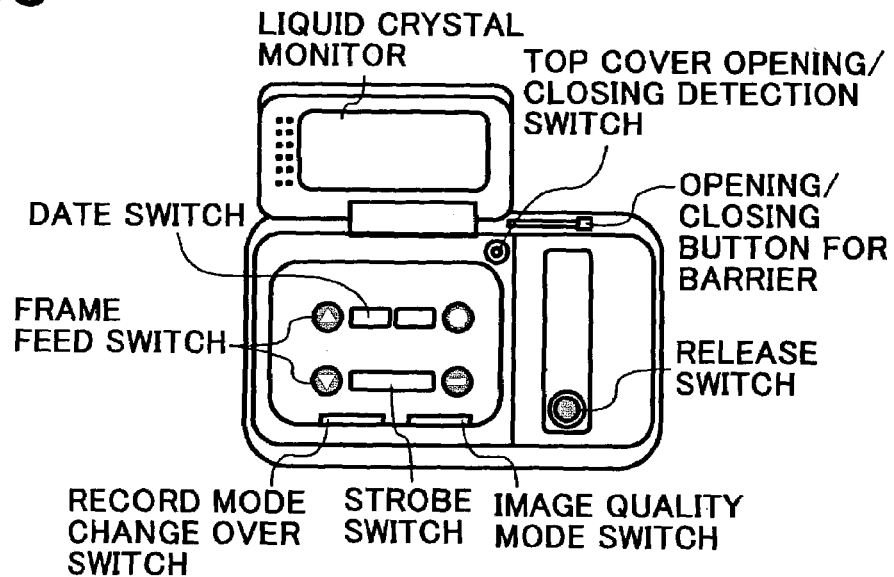

Referring further to FIG. 9, there is provided a schematic view illustrating the data transfer in the CCD on which there are provided color filters in a primary color system in a 3:1 interlacing transfer system where upon transferring electric charges stored in the CCD the transfer is divided into 3 fields and all RGB signals are contained in each field, with FIG. 10(a) being a front view illustrating an external appearance of the digital camera including the photographing apparatus in the present embodiment, with FIG. 10(b) a side view, and with FIG. 10(c) an upper view of the same.

As illustrated in FIG. 9, in a frame where 3 vertical lines are assumed as 1 group for transfer of data transfer is first executed assuming a line indicated by a numeral "1" a first field. The first field contains all components of the RGB signals. The characteristic data of an image formed by transfer data containing all the RGB signals can be obtained after the first field has been transferred.

After the transfer of the first field has been completed, the second and third fields are transferred, respectively. Further, it is possible to replace R, Gr signals and B, Gb signals in a primary color system illustrated in FIG. 9 by Ye, Cy signals and Mg, G signals in a complementary color system (see FIG. 11.).

Figure 12:
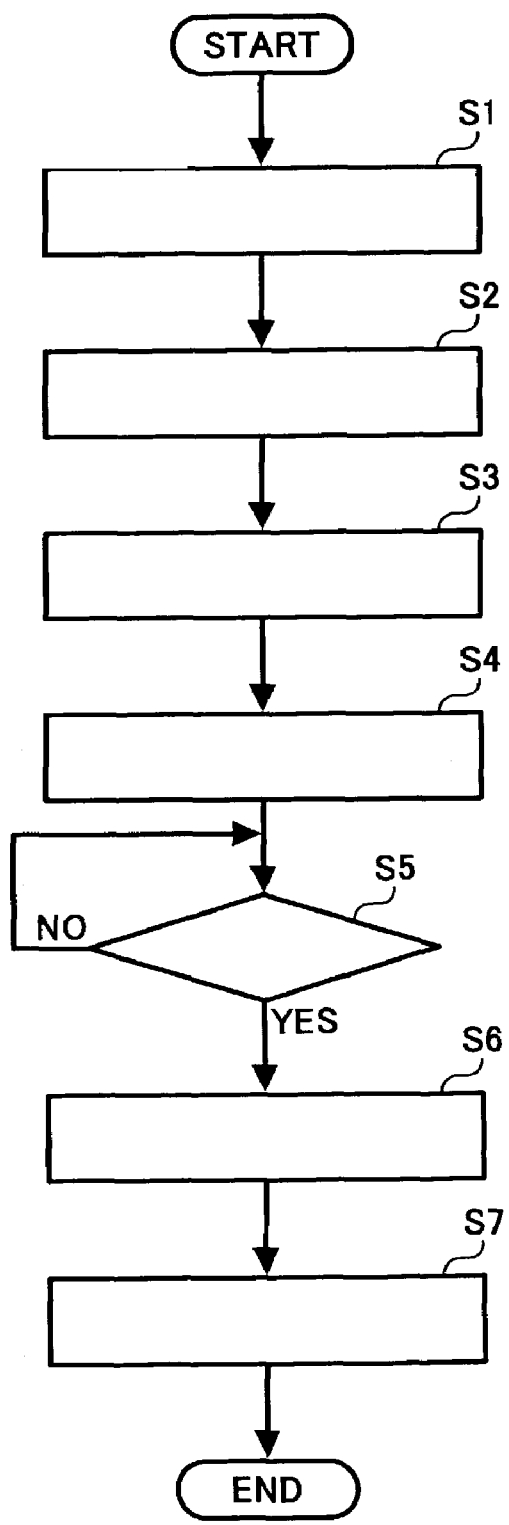
FIG. 12 is a flow chart illustrating the operation of a preferred embodiment of the present invention

In the following, the operation of the present embodiment will be described on the basis of a flow chart illustrated in FIG. 12. In the first place, as data of electric charges in the CCD 201 stored in response to a photographing object image data transfer corresponding to the first field among the divided three fields is executed in step S1.

The characteristic data of an image is extracted with the CCD-I/F 203a of the signal processing section 203 through the photographing/processing section 202 and is stored in the memory section 204 in step S2.

At the time the data transfer in the first field is completed all data of the RGB signals of a pixel are transferred, so that the characteristic data of the image can be obtained at the time the transfer of data in the first field has been completed. Hereby, a control value can be calculated from the characteristic data just since the data transfer in the second fields is started in step S3. More specifically, even in the course of the transfer of data in the second and third fields calculation of a control value for use in the next image processing can be started.

Further, after the data in the second field is transferred, the data in the third field is transferred in step S4, and after the transfer of all the data in the first to third fields has been finally completed in step S5, the data of the RGB signals stored in the memory section 204 (RAW-RGB region) through the memory controller 203b is converted to the data of the YUV signal through the YUV (brightness color difference signal) conversion section 203c, and is again stored in the memory section 204 (YUV region). In the time of the conversion use is made of a control value generated in the control section 205 on the basis of the previously extracted characteristic data in step S6.

Further, the data of the YUV signal is again read from the memory section 204, and is subjected to a compression processing into a JPEG format for example with the compression processing section 203d and is stored ion the memory section 204. Further, upon the data being stored in the memory section 204 (JPEG region) header data, etc., are tagged to the JPEG compressed data into JPEG image data, and is stored in the external memory section 204' with the control section 205 in step S7.

Although in the aforementioned example, after the transfer of the processing of the data of all pixels in the 3 fields had been transferred, the processing of the YUV conversion was started, even in the course of the transfer of data in the third field part of the data, the transfer of which has been already completed, contains the data of all the RGB signals, so that it is possible to start the image processing, and according to the method the YUV conversion can be finished more rapidly.

As the characteristic data for generating a control value for use in the YUV conversion where the image processing is concretely executed there are employed color distribution data for control which calculates the gain of white balancing, brightness data of a plurality of areas obtained by dividing a screen for use in setting of a contrast where a brightness distribution is made uniform, output data of the image data from a high pass filter for calculating an image edge emphasizing coefficient corresponding to the size of an output signal emphasizing the edge of an image, and further color information of the respective is obtained by dividing a screen into a plurality of the areas. For example, when it is recognized from the color distribution that a person is photographed, a color conversion coefficient where the tone of a skin color is reproduced to a more preferable one is calculated, and an image processing is executed where the YUV conversion using the present color conversion is executed.

Figure 13:
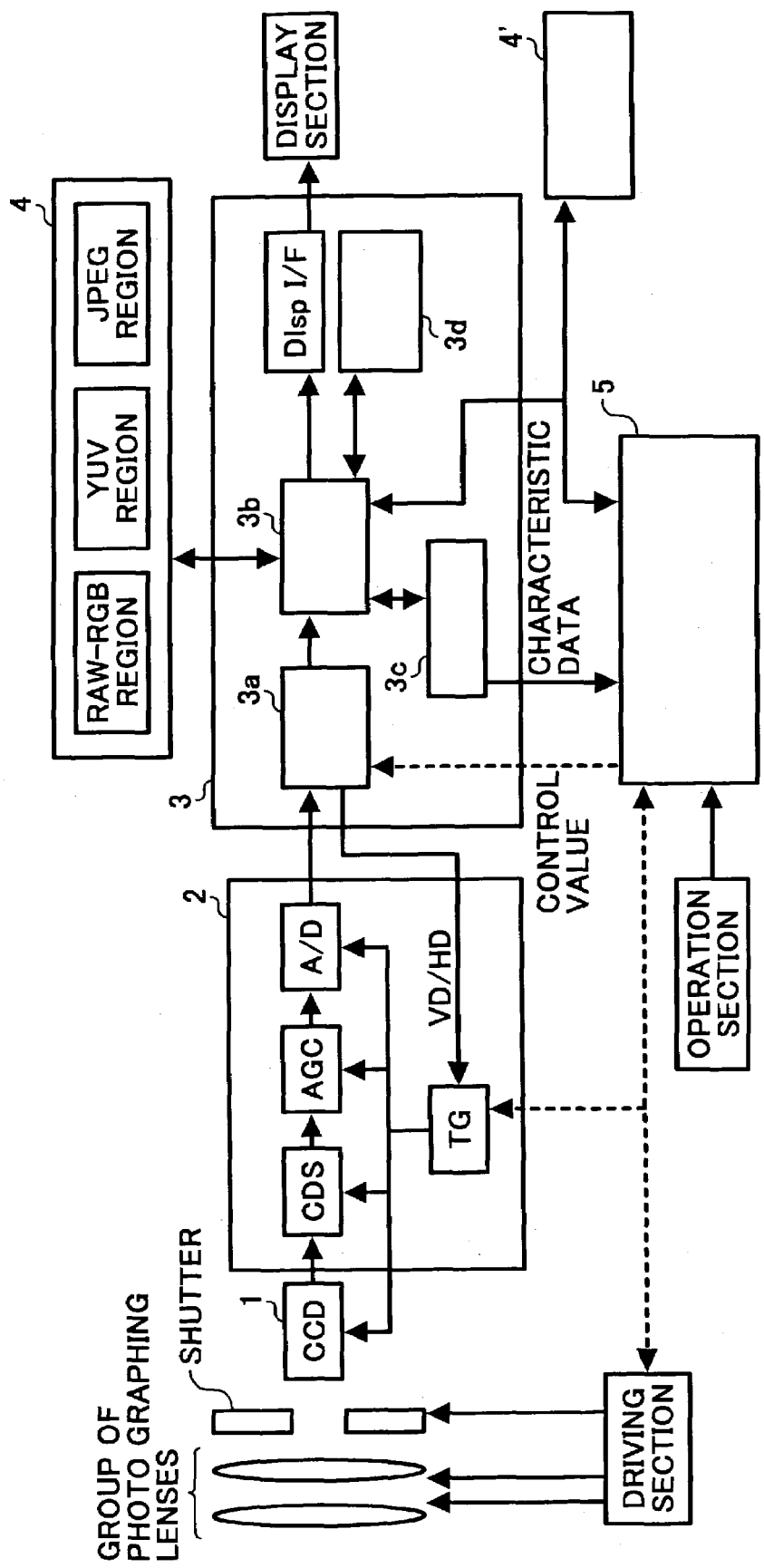
FIG. 13 is a block diagram illustrating the substantial construction of a digital camera including a photographing apparatus in another preferred embodiment of the present invention.
Figure 14:
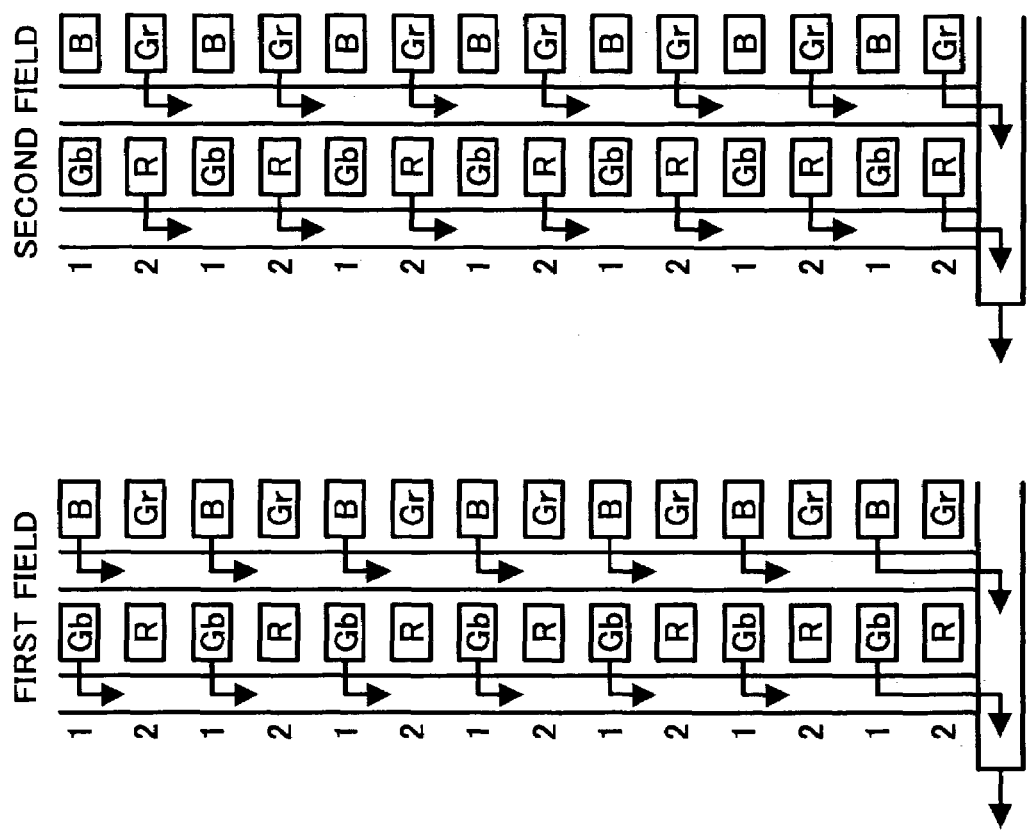
FIG. 14 is a schematic view illustrating the transfer of data from a photographing device (CCD) in a prior art interlacing transfer system.

Referring here to FIG. 13, a block diagram illustrating the substantial construction of a digital camera including the photographing apparatus in the above described embodiment of the present invention is provided. Identical symbols shall be applied to those having identical functions corresponding to constituent members in the embodiment illustrated in FIG. 8.

Also in the present embodiment, in the same fashion as in the aforementioned embodiment, a photographing apparatus is provided, which employs a photographing device in a 3:1 interlacing transfer system in which upon transferring electric charges stored in the photographing device the transfer is divided into three fields, each of which fields contains all the RGB signals.

As illustrated in FIG. 13, a CCD 1 is that following a 3:1 interlacing transfer system in which RGB signals in a primary color system are contained and the transfer is divided into three times. In the present embodiment, there are set to the CCD-I/F 203a the foregoing white balance gain adjustment for an image, a contrast set value, an edge emphasizing coefficient, and a color conversion coefficient. More specifically, in the construction where the control value is set in the initial stage of the image processing section 203 the use of the control value prepared from the obtained characteristic data resolves a problem that such a processing as reflecting the prepared control value for the image obtaining the characteristic data is impossible, and assures the processing.

Herein, there will be described a photographing apparatus for extracting the characteristic data of an image with the data transfer in the first field, and calculating and setting control values based upon the characteristic data in the course of the data transfer in the second field when image formation is executed on the basis of the data transfer in one field without the use of all pixels corresponding to one frame, for example the image formation is executed using only the third field.

When use is made of a CCD of 3 million pixels of horizontal 2048 pixels and vertical 1536 pixels, in an interlacing transfer system where 3 times division transfer is executed, data of the horizontal 2048 pixels and of the vertical 512 pixels are transferred with only one time transfer. For this, when the size of the horizontal 640 pixels and the vertical 480 pixels (VGA) is recorded, an image is formed with the number of transfer pixels corresponding to one time transfer (1 field).

Electric charges of an image focused on the surface of the CCD 201 are taken out with the CCD 201 as an analog image signal. The analog image signal is converted to a digital signal with the photographing/processing section 202 (CDS, AGC, A/D), and is stored in the memory section 204b through the CCD-I/F 203a of the signal processing section 203, and at the time the data transfer through the first field is completed, the YUV conversion is executed for the transfer data through the first field, and further image characteristic data generated upon the conversion is read out by the control section 205.

The processing is processed in the course of the data transfer through the second field, and a control value is calculated from image characteristic data read in the control section 2905 and is set in the CCD-I/F 203a. Upon the data transfer through the third field the control value becomes effective for all the pixels of the transfer data, whereby the control value using image characteristic data of a photographed data can be reflected on a screen for photography.

Further, as in the same fashion as in the previous embodiment, the data of the RGB signal through the third field are read out from the memory section (SDRAM) 204, and are YUV-converted in the YUV conversion section 203c, and are JPEG-compressed by the compression processing section 203d, and are stored in the external memory section (memory card) 204' as a JPEG image file.

In the foregoing processing, and although in the same fashion as in the previous embodiment, aspect ratios of horizontal and vertical sizes are not coincident with each other, but the aspect ratio can be adjusted by executing reading with thinning from the memory section (SDRAM) 204 upon the transfer to the YUV conversion section 203 for the YUV conversion for example.

Although in the construction illustrated in FIG. 13 the characteristic data is extracted in the YUV conversion section 3c, the characteristic data may be extracted in the CCD-I/F 3a in the same fashion as in the first embodiment, and it is also possible to obtain the characteristic data in the first field, prepare a control value upon the data transfer through the second field and set it to the CCD-I/F 3a, and reflect the control value on the data transfer through the third field.

In the same fashion, when a binary processing is executed in a photographing apparatus capable of processing a binary image, a threshold for discriminating a bright portion and a dark portion is previously determined to judge them with the image characteristic data from the transfer data corresponding to the 1 fields.

In other words, in an apparatus for frequent use under photographing conditions not limited to those where the entire surface of an object is always illuminated with the same illumination as in a digital camera, a screen is divided into small areas, brightness distribution on which area is detected, and a threshold in each area must be determined.

For detecting the brightness distribution, in a primary color system photographing device, all data of the RGB signals are required over the entire surface of a screen, so that the threshold of each area can be calculated before the data transfers in the second and third frames are finished on the basis of the data of the RGB signals written in the memory section (SDRAM) 204 in the data transfer through the first field, and when the data transfer has been finished, the binary processing can be started using the calculated threshold. It is also possible to calculate the threshold using the brightness distribution being the image characteristic data in the first field.

From the above description, the characteristic data of an image is obtained on the basis of the transfer data in the first field, and before incorporation of the transfer data in the remaining fields is finished, the calculation of the control value for use in the image processing is started to speed up the image processing.

As described above, in accordance with the present invention, the transfer of stored electric charges is divided into three fields, and all color signal components can be obtained with the data transfer in the first field by making used of the photographing device in the 3:1 interlacing transfer system including all color signals in each field, so that characteristic data of an image over the entire surface of a screen is obtained on the basis of the transfer data, and by starting the calculation of the control value for use in the image processing thereafter, with respect to a range where incorporation of the transfer data in each field is completed the processing can be started before incorporation of the transfer data in the remaining field is completed, to speed up the image processing.

Figure 15:
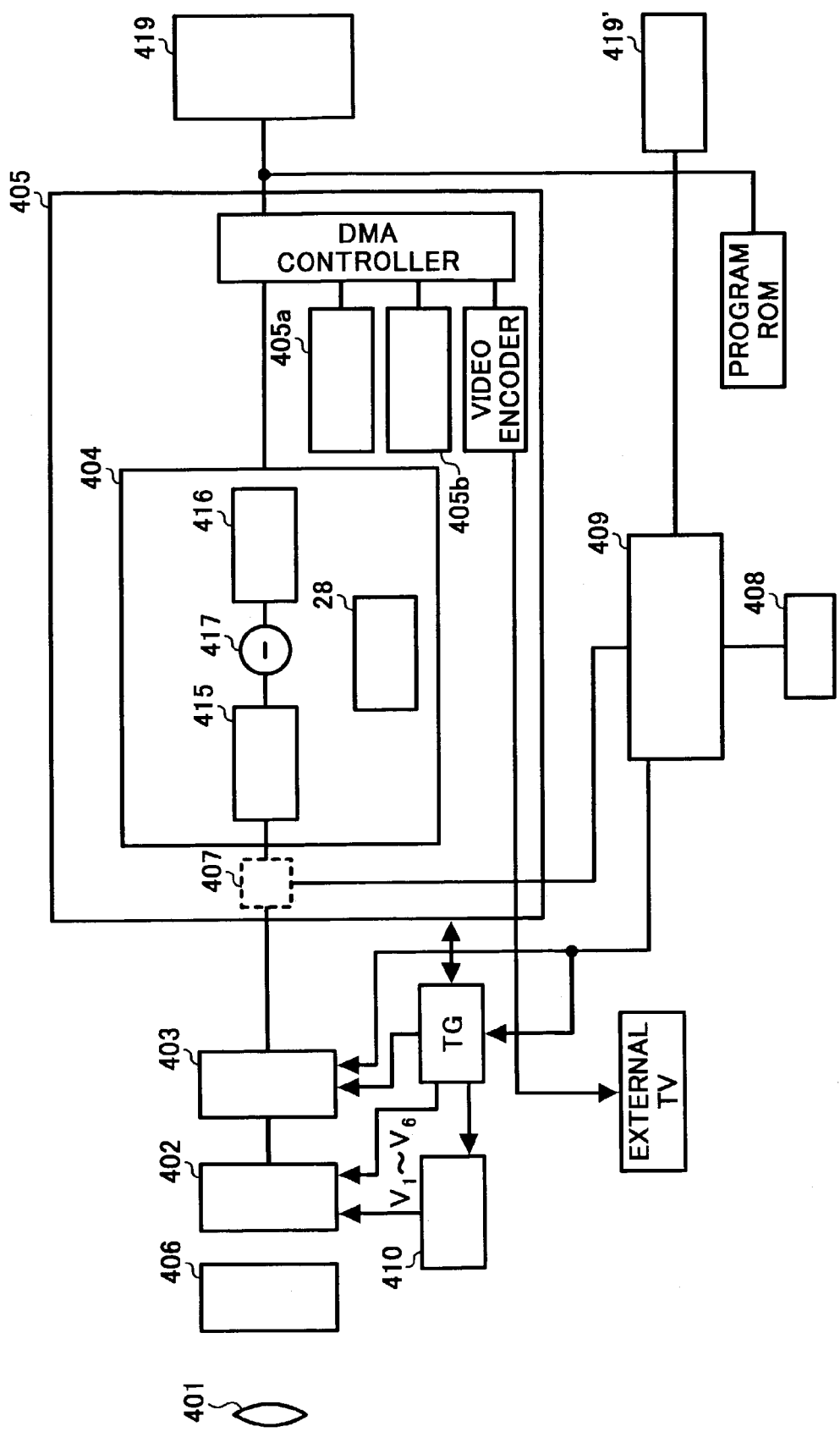
FIG. 15 is a block diagram substantially illustrating camera according to the present invention.

The digital camera associated with the present invention comprises as illustrated in FIG. 15, a CCD 402 for converting an optical image of an object to be photographed obtained through a photographing lens 401 to an analog electric signal, a CD (&RUUHODWHG' RXEOH 6DPSOLQJ-correlation double sampling)-A/D circuit 403 including an analog/digital converter, for subjecting an analog image signal outputted from the CCD 402 to sample holding and analog/digital conversion successively, a digital signal processing circuit (DSP) 406 including a temperature white defect correction apparatus 404 for correcting any temperature white defect that is one of image defects in the CCD for a digital image signal converted by the CDS-A/D circuit 403 and a signal processing circuit 405a for applying a predetermined image processing to the corrected digital image signal corrected by the temperature white defect correction apparatus 404, and the like, and an SDRAM 419 for temporarily storing image data.

The CCD 402 being a solid photographing device includes therein color filters as described later. Between the photographing lens 401 and the CCD 402 a mechanical shutter 406 is inserted, which shutter ensures the photographing for a still image in the interlacing type CCS 402. Operations of these constituent sections 402-406 are controlled with a control section 409 composed of a microcomputer (MPU). A timing generator TG alters the operation modes with the operation of a release 408 provided on the operation section of the digital still camera.

Figure 16A:
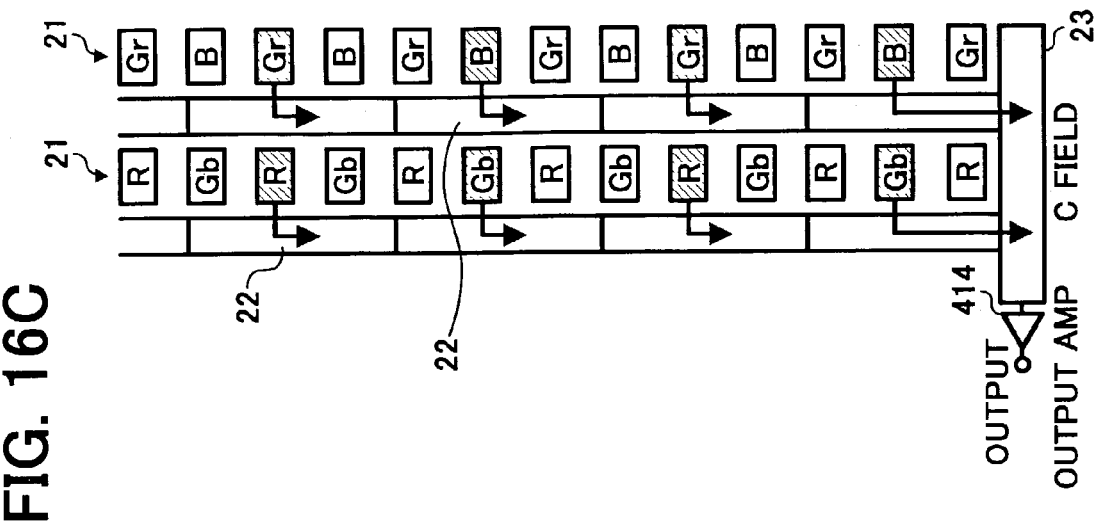
FIG. 16 is views (*a*), (*b*), and (*c*) of the operations exemplarily illustrating the read operations in the respective fields for all pixels in a 3 field read type CCD illustrated in FIG. 15.
Figure 16B:
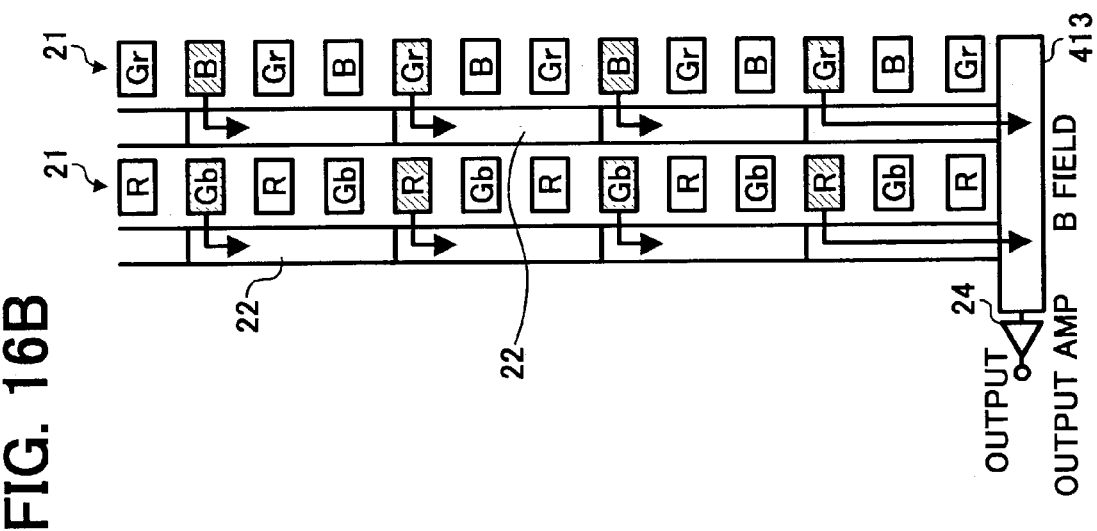
Figure 16C:
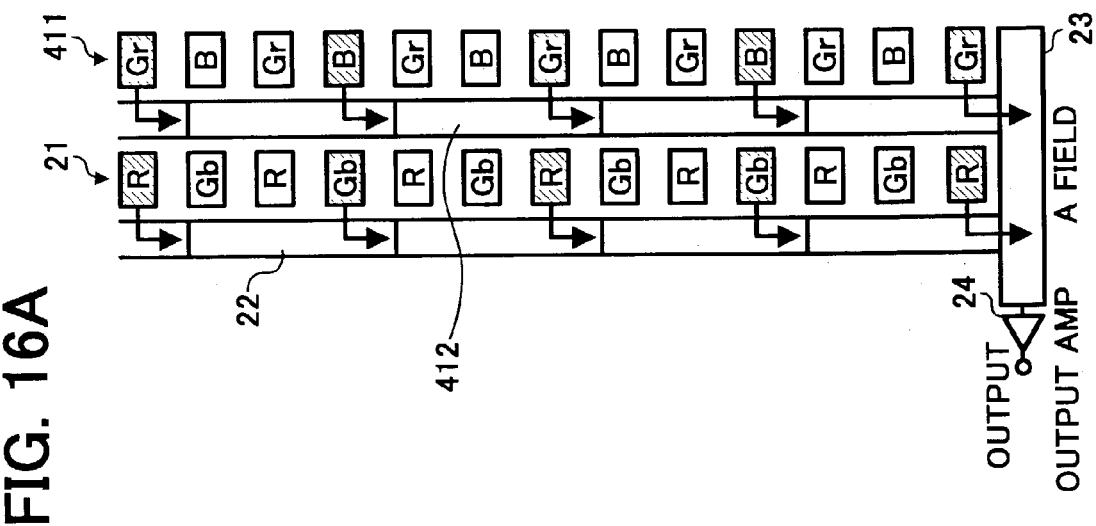

In examples illustrated in FIGS. 16(a) to 16(c), for a reading system from the optical detection cells 411 constituting respective pixels of the CCD 402 an interline transfer system using vertical transfer registers 412 arranged among vertical lines of the optical detection cells 411 is adopted. Accordingly, electric charges stored in each optical detection cell 412 in an exposure process are amplified in an output amplifier 24 provided on the horizontal transfer register 413 after passage through the vertical transfer register 412 composed of the CCD and through the horizontal transfer register 413 composed of the CCD, and are outputted to the CDS-AD circuit 403 as an analog image signal.

Figure 17A:
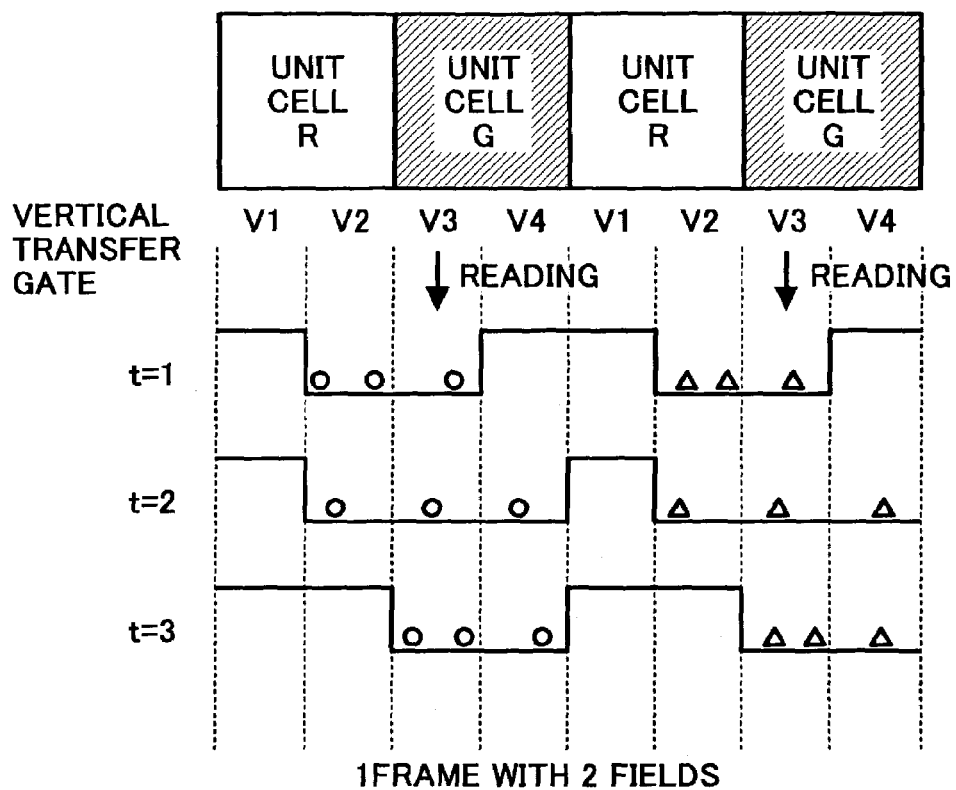
FIG. 17 is (*a*) a view illustrating a transfer system for electric changes in a 2 field read type CCD, and (*b*) a view illustrating a transfer system for electric changes in a 3 field read type (*c*) in the digital camera illustrated in FIGS. 15 and 16.
Figure 17B:
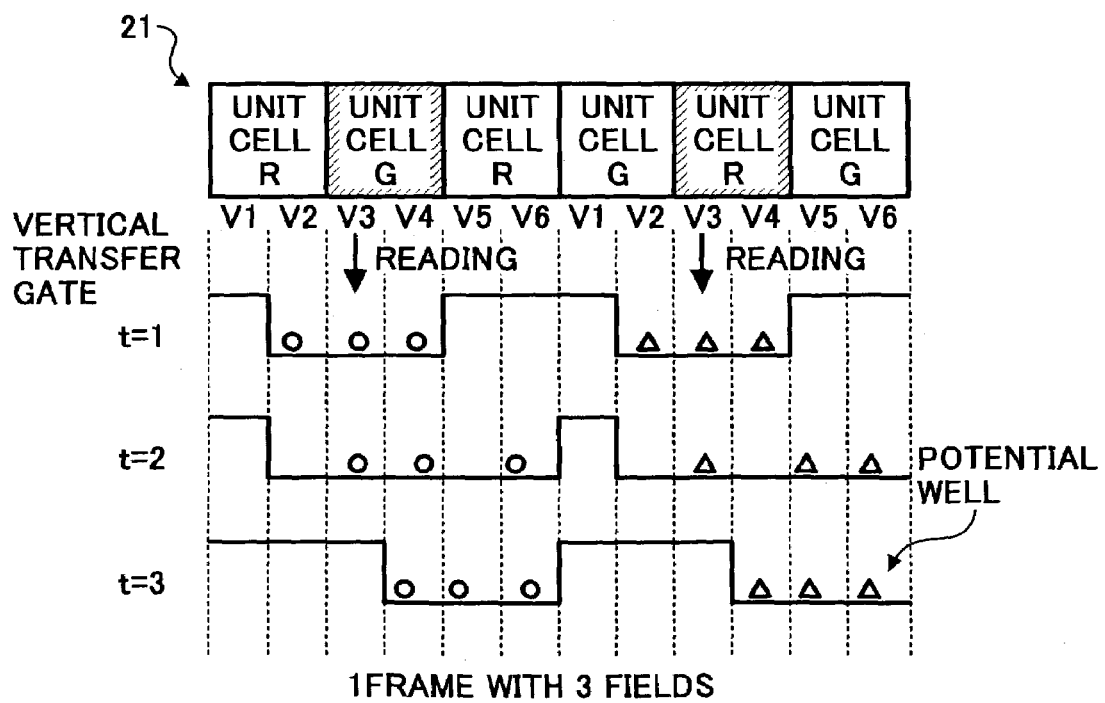

In order to read electric charges stored in the CCD, in a general interlacing CCD all the optical detection cells of the CCD, i.e., all pixels (Part of there of is illustrated in the figure.) are classified into two fields, as illustrated in FIG. 17(a). The one field is constituted with a group of pixels of any one for each set composed or two pixels adjoining vertically and alternately arranged, while the other field is constituted with the other group of pixels for each set. The stored electric charges from the optical detection cells are read to the vertical transfer register for each field with the aid of 4 phase vertical transfer gate signals V1 to V4, and are transferred to the horizontal register following the movement of a potential well constituted with the vertical transfer register. Against this, in the CCD 402 associated with the present invention, as illustrated in FIG. 17(b), all pixels, i.e., all the optical detection cell 411 (partly illustrated in the figure.) are divided into three fields composed of the group of the pixels of the 3 sets disposed periodically vertically, and fundamentally an image of one frame is constructed with these three fields.

Although in the CCD 402 of the 3 field read type the size of the optical detection cell 411 is more reduced than that of each optical detection cell of the CCD of the 2 field read type illustrated in FIG. 17(a), identical reading of electric charges in the 2 field read type is ensured.

Referring further to FIG. 16, in 16(a) an example of reading from the pixels 411 in the A field being the first field is partly illustrated, and in 16(b) an example of reading from the pixels 411 in the B field being the second field is partly illustrated, and further in FIG. 16(c) an example of reading from the pixels 411 in the C field being the third field is partly illustrated. Since in the examples in FIG. 16 there are contained R, G, B in a primary color system for every field, there is ensured a color processing by the value of the pixel in any one field.

In order to obtain such a color arrangement, there can be used a filter in an RGB primary color system having such a color arrangement of a zig-zag pattern as illustrated in FIG. 18 for example, which is conventionally well known. The color arrangement of the filters in the RGB primary color system illustrated in FIG. 18(a) includes a color filter corresponding to pixels 411 of 9×9 for example obtained when all the pixels 21 of the CCD 402 are defined in a predetermined region.

A region of the color filter designated at R is a red filter region which arrests transmission of light other than red light, with a region designated at B is a blue filter region which arrests the transmission of light other than blue light. Gr and Gb indicate a green filter region which arrests the transmission of light other than green light, where the former is a green filter region disposed on a row on which the red filter region is arranged, and the latter is a green filter region disposed on a row on which the blue filter region is arranged.

The CCD 402 including therein such color filters is manufactured while being subjected to quality control so as to satisfy a prescription that a defective pixel which provides any temperature white defect which might being caused by a dark current of a specified value or more less than 1 in a predetermined region, for example in each region for every 9×9 pixels for example, and ones satisfying the specification are available as general commodities. Accordingly, in such a CCD 402 only the existence of only one temperature white defect may be allowed in each the foregoing predetermined region.

In FIGS. 18(b) to 18(d) the color arrangement of pixels in each field is extracted, and color arrangements in the A field in FIG. 18(b) and the B field in FIG. 18(c) are coincident with each other.

In the present process of exposure to light with the operation of the release 408 the mechanical shutter 406 is kept in an open state, and henceforth stored electric charges in response to an optical image of an object to be photographed obtained through the photographing lens 401 are stored in each pixel comprising the optical detection cell 411 of the CCD 402 owing to the present exposure to light.

Figure 29:
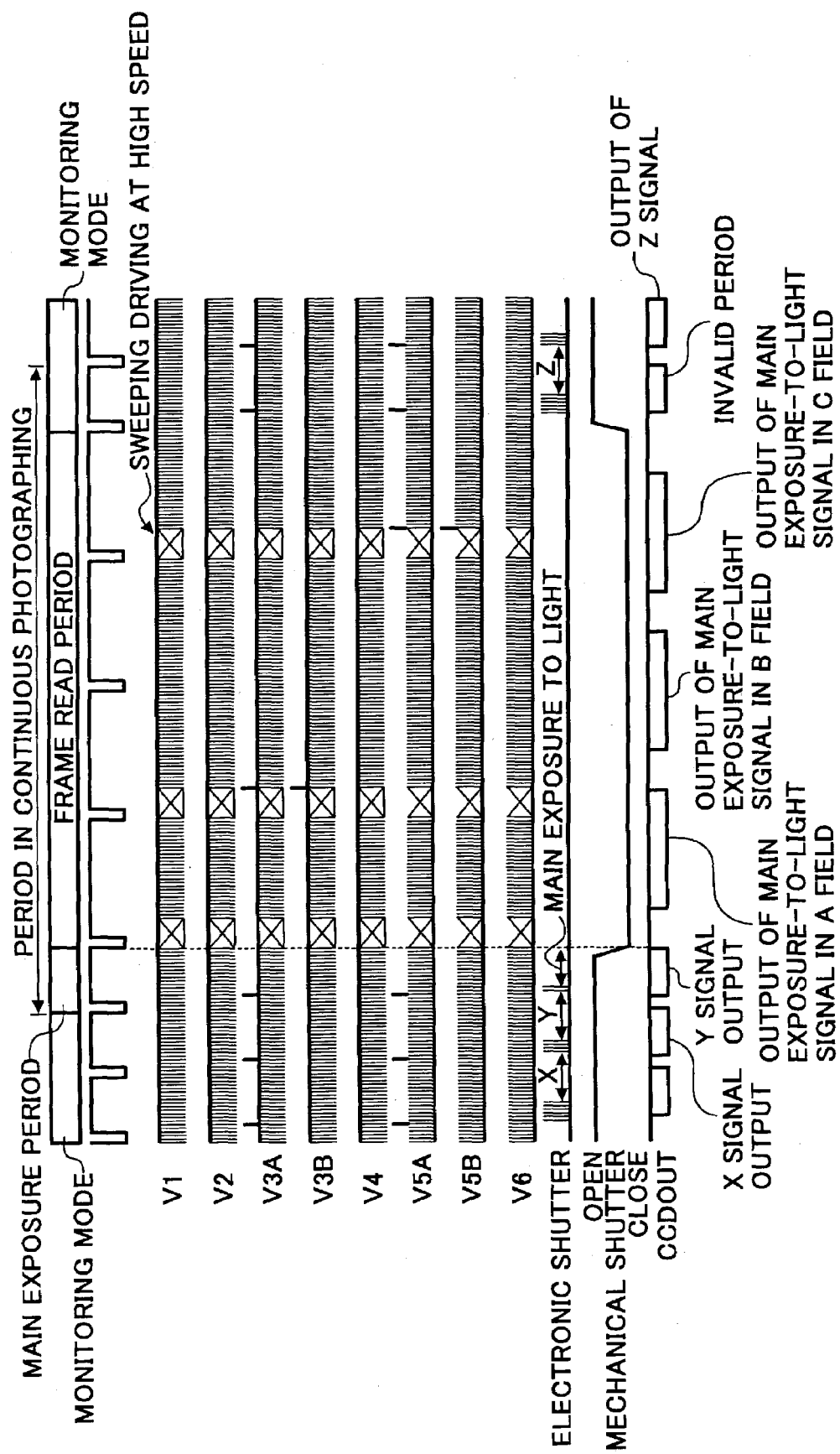
FIG. 29 is a timing chart illustrating the operation of reading for 3fields in the digital camera illustrated in FIG. 1.

When the stored electric charges reach a predetermined quantity, the mechanical shutter 406 is closed. The stored electric charges are read on the vertical transfer passage 412 (see FIG. 16) in response to a combination of outputs of V1, V3A, B, V5A, B followed by a read pulse as illustrated in FIG. 29 among V1 to V6 being an output of the V driver 410 in a frame read process where the mechanical shutter 406 is in a closed state of the mechanical shutter 406, and a pixel signal corresponding to FIGS. 18 (b) to 18(d) for each field. The outputted image signal undergoes sampling hold-A/D conversion in the CDS-A/D circuit 403, and is sent to the temperature white defect correction apparatus 404 as a digital image value.

The temperature white defect correction apparatus 404 associated with the present invention comprises first and second frame memories 415, 416 each having a memory capacity required for storing a digital pixel value in each field constructed with the pixels 411 of ⅓ of all the pixels 411 of the CCD 402, a subtraction circuit 417, a color interpolation circuit 418, and a control section 419.

Figure 19A:
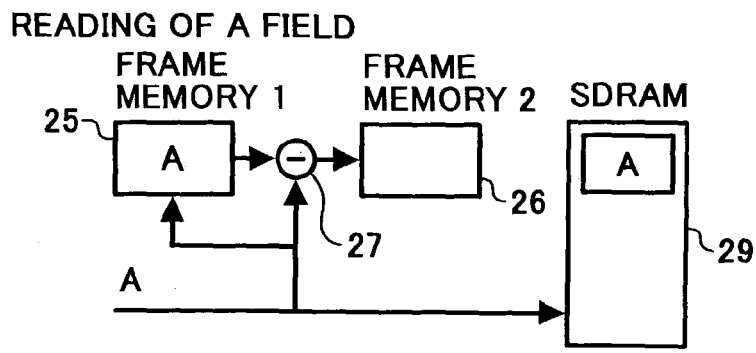
FIG. 19 is views each illustrating a change of stored data in each memory frame in the operation of the digital camera illustrated in FIG. 15, (*a*) a read example of the first field, (*b*) a read example of the second field, (*c*) a calculation example for a predicted value of the third field, and (*d*) a read example of the third field.
Figure 19B:
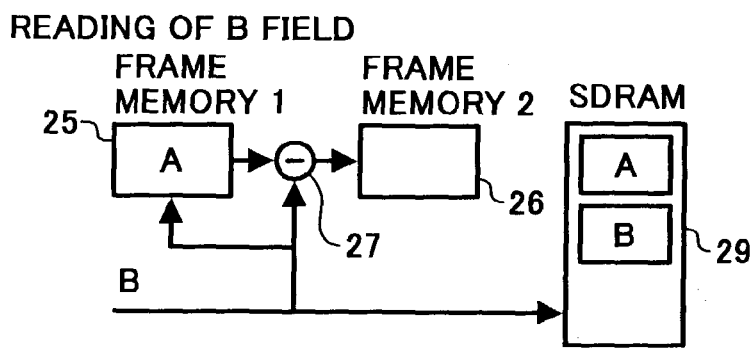

The frame memories 415, 416, the subtraction circuit 417, and the interpolation circuit 418 are controlled by the control section 419. Once a digital value of each pixel in the B field from the sampling hold circuit 403 is outputted with reading of the value of each pixel in the B field on 419. Once the value of each pixel in the A field outputted from the CCD 402 by reading of the value of each pixel in the A field is outputted as a digital value from the CCD 402, the control section 409 stores without correcting an RGB Image value in an external SDRAM 419 and stores in a first frame memory 415, as illustrated in FIG. 19(b). Further, the subtraction circuit 417 subtracts the value (B) of each pixel in the B field from each pixel value in the (A) field stored in the first frame memory 415 with the control of the control section 419 successively. The reduction result (A-B) is written in the second frame memory 416 with the control section 409.

The subtraction between the value of each pixel in the A field and the value of each pixel in the B field by the subtraction circuit 417 is executed for each predetermined region illustrated in FIG. 18(a). In each the foregoing region, as illustrated in FIGS. 18(b), (c) both fields A and B are disposed in the color arrangement where their color arrangements are coincident with each other, so that the subtraction is executed between pixels with the same color corresponding to the order of the arrangements.

More specifically, an R value (B field) at third row first column is subtracted from an R value (A field) at first row first column illustrated in FIG. 18(a), and the result is written in the second frame memory 416, and thereafter respective differences of a Gr value (B field) at 3 rd row 2 nd column from a Gr value (A field) at 1 st row 2 nd column . . . an R value (B field) at 9 th row 9 th column from an R value (A field) at 7 th row 9 th column are written in the second frame memory 416.

The control section 409, when the respective subtraction results are compared with a predetermined threshold region, and fall within the threshold region, judges that no temperature white defect occurs on pixels of one set providing the subtraction result. In contrast, when the subtraction result exceeds the predetermined threshold range, it judges that any temperature white defect occurs on any one among a set of pixels providing the subtraction result. Such judgment is executed for every the foregoing region.

The judgment on the temperature white defect is ensured for every the foregoing region by properly setting the foregoing threshold range. The reason is that the subtraction is executed between pixels located in the vicinity to each other and having the same color, and even if a relatively large difference happens between the values of both pixels with the same color adjoining to each other, the difference is not so large that the temperature white defect occurs, and the existence of only one temperature white defect is allowed in the foregoing region as described previously on the basis of a general manufacturing rule of the CCD 402.

When the control section 409 judges that the temperature white defect happens on any one among a set of pixels providing the subtraction result, the control section 409 further judges whether the subtraction result is positive or negative. A positive symbol means that any temperature white defect happens on the pixels in the A field that is the number to be subtracted. Further, a negative symbol means that any temperature white defect happens on the pixel in the B field that is the number of subtracting.

The reason is that the value of a pixel provided by the temperature white defect indicates a value sharply exceeding the value of a normal pixel. For this, provided that an influence by the temperature white defect is involved in the minuend, the number subtracted is enough larger than the subtracter, while oppositely to this provided that an influence by the temperature white defect is involved in the subtracter, the minuend indicates an enough larger value than the subtracter.

The control section 409, once judging, by subtraction between a set of pixels where both fields are existent, that the temperature white defect is existent on a pixel in the one field for example, rewrites the value of a defective pixel in the one field to a value equal to the value of pixels with the same color most adjoining to each other existent in the other field. For example, when a result when the value of R at 3 rd row 1 st column in the B field illustrated in FIG. 18(b) is subtracted from the value of R at 1 st row 1 st column in the A field illustrated in FIG. 18(b) for example is a value which is positive and exceeds a threshold range, the value of R of a pixel at 1 st row 1 st column in the A field is rewritten by the value of R at 3 rd row 1 st column in the corresponding B field. In this writing the value of a corresponding defective pixel in the A field stored in the external SDRAM 419 on the basis of memory addresses of the defective image and a corresponding pixel.

Accordingly, even if the value of any pixel with the temperature white defect is included in the value of each pixel in the A field and the B field read directly into the external SDRAM 419, the value of the defective pixel is corrected as the value of a pixel, and in the external SDRAM 419 there are stored the values of pixels in the A field and B field not containing the temperature white defect. After the correction is finished, the control section 419 erases data in both frame memories 415, 416, whereby the correction process for the temperature white defect about the A field and the B field is finished.

Figure 19C:
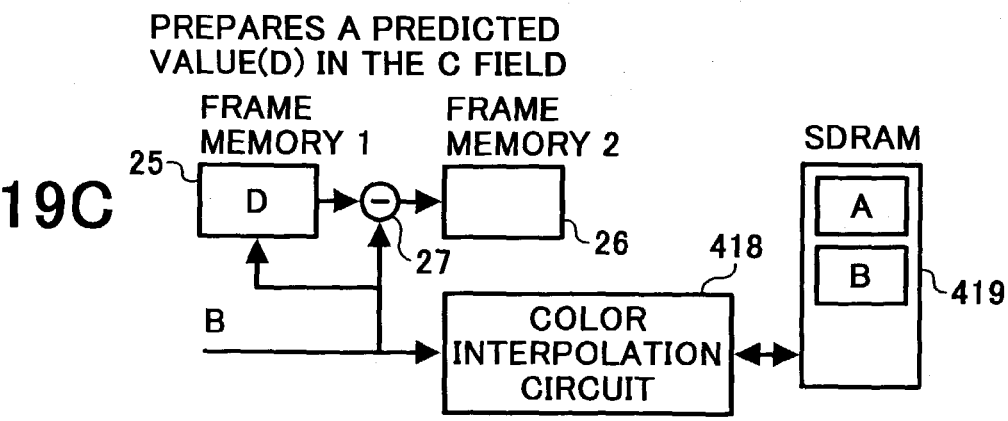

After the correction process for temperature white defect is finished, as illustrated in FIG. 19c, the color interpolation circuit 418 calculates a predicted value D of the value of each pixel in the C field being the third field using the values of pixels in the A field and in the B field not involving the temperature white defect in the external SDRAM 29, and writes in succession the predicted value (D) of each pixel in the first frame memory 415.

As an interpolation value by the color interpolation circuit 418, as well known in the prior art for example, the weighted mean of the values of pixels with the same color as that of pixels located around a pixel to be interpolated or predicted can be adopted.

When the predicted value (D) of each pixel in the C field is written in the frame memory 415, the control section 409 stores as illustrated in FIG. 23(d) the read value (C) of each pixel in the C field outputted from the sampling hold circuit 403 in the external SDRAM 419 in succession. Simultaneously, the control section 409 supplies subsequently the read value (D) of each pixel in the C field to the subtraction circuit 417.

The subtraction circuit 417, once receiving the supply of the read value (C) of each pixel in the C field, subtracts the read value (C) of each pixel from a predicted value in the frame memory 415. The subtraction processing is executed in succession between each pixel of the predicted value D in the read value of each pixel corresponding to the foregoing pixel in the same fashion in the subtraction processing between the A field and the B field. The subtraction result (D–C) is written into the second frame memory 416 in succession.

The predicted value D is considered a value not involving the temperature white defect because it is a value after the correction. Accordingly, provided the temperature white defect is involved in the subtraction result (D–C), it is the case where it is involved in the C field, and in that situation the subtraction result indicates a negative value, and its absolute value exceeds a predetermined threshold. In contrast, provided the temperature white defect is not involved in the C field, the absolute value of the subtraction result (D–C) is not so increased than the case where the temperature white defect is involved in the C field.

From this, the control section 409 once the absolute value of the calculation result (D–C) exceeds the threshold for every read value (C) of a pixel, judges that the temperature white defect is involved in the value (C) of that pixel as a defective pixel. On the basis of memory addresses of the defective pixel c and the pixel (D) corresponding to the former the value of the defective pixel corresponding to the C field stored in the external SDRAM 419 is rewritten by a predicted value (D) of a corresponding pixel.

With the finishing of the correction about the C field data of the values of pixels corresponding to all the three fields (A, B, C) where the temperature white defect is corrected are collected in the external SDRAM 419.

The data of the value of any pixel undergoes at need by the signal processing circuit 405 a color interpolation processing for improving the resolution of any image, an aperture emphasizing processing for emphasizing the contour of an image, and an RGB-YUV processing for conversion of a color space. Thereafter, the data of the value of any pixel is transferred again to the external SDRAM 419, and properly undergoes the JPEG compression processing with the JPEG compression circuit 405b, and is then stored in a desired recording medium 419'.

The data of the value of a pixel stored in the external SDRAM 419 forms images of 1 frame using the date of the values of pixels corresponding to all the 3 fields (A, B, C).

Referring to FIGS. 20 to 28, a view is provided, which exemplarily illustrates a correction processing in the conditions where one temperature white defect is existent for each color of R, G, B for every field (A, B, C) of first to third.

For convenience, as a concrete example of the value of a pixel having no temperature white defect, there will be described a pattern example indicated by "5" for R thereof, "15" for G(Gr, Gb), and "10" for B.

Figure 20:
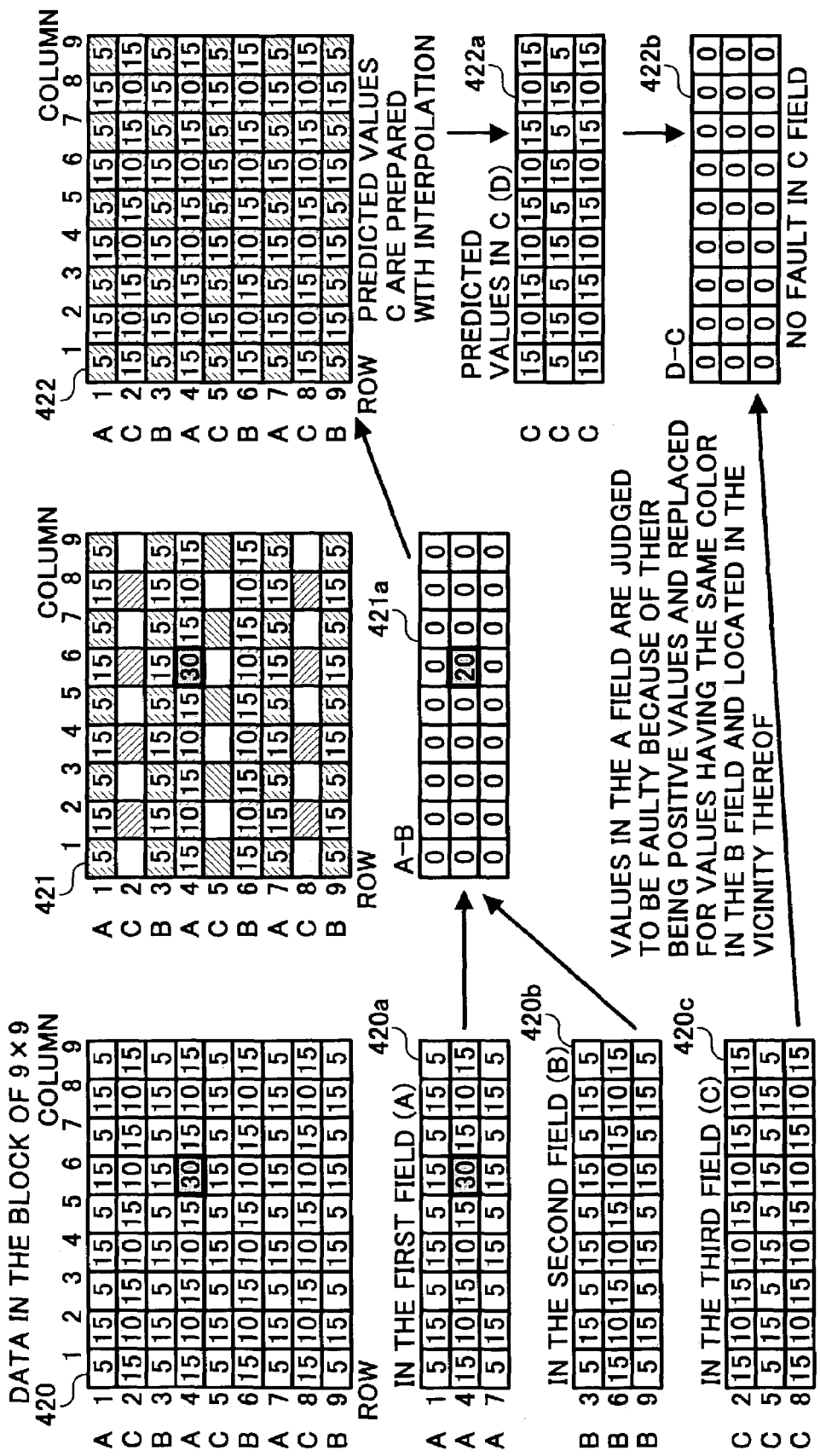
FIG. 20 is a view illustrating a calculation processing example of pixel data in one region where there is a blue defect on a blue color in the first field.

Referring to FIG. 20 illustrates a case where temperature white defect ids existent on blue in the A field being the first field. In FIG. 20, there is illustrated an example of the data 420 of the value of a pixel in a color disposition in one region illustrated in FIG. 18(a). In the example 420 of the data of the value of a pixel there is found the value "30" of a pixel located at fourth row 6 th column. The value of the pixel is understood to be one concerning blue from the arranged of pixels in FIG. 18(a).

In FIG. 20, corresponding to FIGS. 24(b) to FIG. 20(d), there are illustrated arranged tables 30a, 30b, and 30-c for the values of pixels extracted from the data 420 of the values of pixels for every field. In the data table 421 in FIG. 20 pixels becoming objects of a subtraction processing by the subtraction circuit 417 concerning then first field (A) and the second field (B) are extracted and listed. In the data table 421a the calculatioresult (A–B) for each pixel calculated by the subtraction circuit 417 is listed. Each value in the data table 421a is a difference between the values of pixels at positions in the arranged corresponding to those on the arranged table 420a and 420b. In the data table 421a they are indicated with "0" excepting one subtractioresult indicating the value of "20".

On the other hand, the operation result of value [20] means that as explained referring to FIG. 19(b), there is a defect of a temperature white defect in a pixel for imparting a number to be subtracted, that is, pixel value data 420, a B (blue) pixel of A field positioned on line 4 row 6 of a data table 421.

Therefore, a pixel value [30] of the defective pixel is rewritten by a pixel corresponding to the defective pixel, that is, a pixel value [10] of a B pixel positioned on line 6 row 6 to which is imparted a subtraction number of the operation processing, as shown in Data Table 422.

Further, predication data 422a which is a prediction value D with respect to C field is obtained from each pixel value of A field and B field of Data Table 422 by a color interpolation in a color interpolation circuit 418.

Figure 19D:
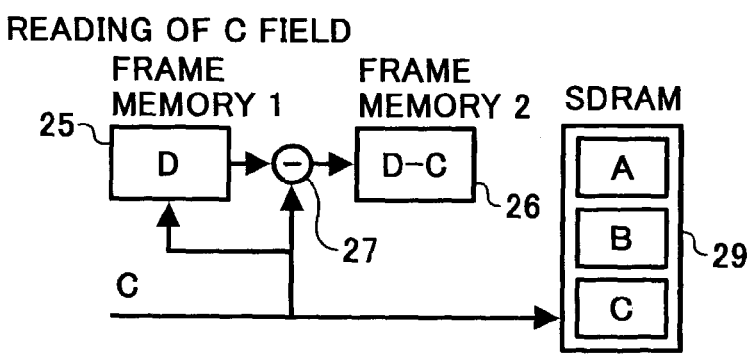

As explained referring to FIG. 19(d), the subtraction circuit 417 carries out a subtraction with each value of Arrangement Table 420c which is a measured value of C field as a subtraction number, and with each value of the predication data 422a as a number to be subtracted to obtain the subtraction result shown in Data Table 422b. In this example, since all values in Data Table 422b are [0], which therefore means that a temperature white defect is not present in C field. This does not violate the condition, since the present of a temperature white defect has been already found in one B pixel of A field, that the temperature white defect of CCD 402 is not more than one every predetermined area.

Pixel values of Arrangement Table 420a have been written, when reading C field, in an area of C field of Data Table 422 in FIG. 20, but since the temperature white defect is not contained in each value of C field, the pixel values in C field are not subjected to correction.

Accordingly, finally, the pixel values in Data Table 422 not containing the temperature white defect are to be stored in external SDRAM 19.

Figure 21:
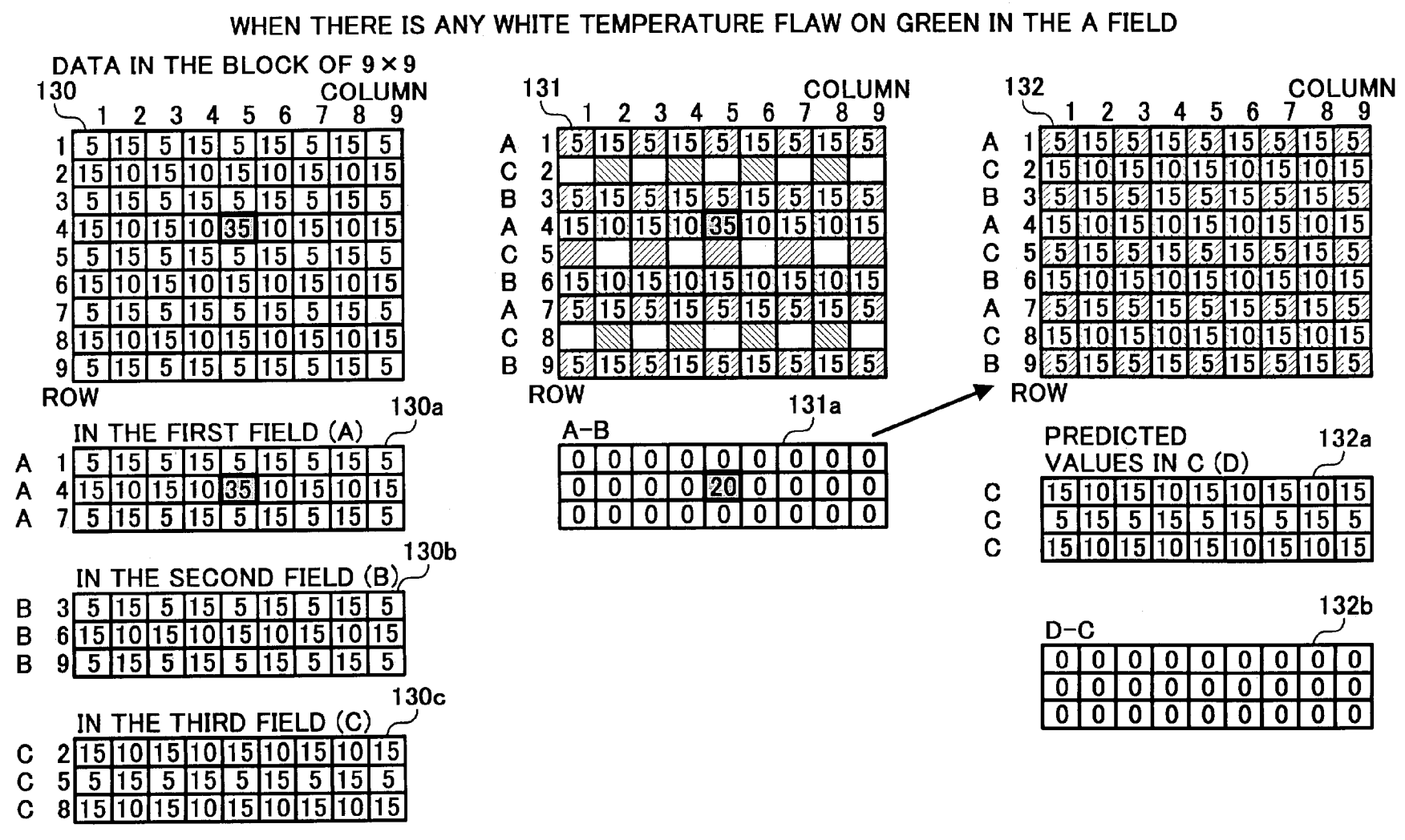

FIG. 21 shows the case where there is a temperature white defect in green of A field. In a pixel value data example 130, a pixel value [35] is seen in a Gb pixel on line 4 row 5. Therefore, in Data Table 131a showing the operation result (A–B) of Arrangement Tables 130a, 130b is shown a pixel value [20] showing the presence of one temperature while defect. Since this pixel value [20] is positive, it is judged that a temperature while defect is present in a Gb pixel of A field on line 4 row 5 to be a number to be subtracted, and it is rewritten by a pixel value [15] of a Gb pixel in B field position on line 6 row 5 to which is imparted a subtraction number of the operation processing, and Data Table 132 after correction similar to that previously mentioned is obtain within an external SDRRAM 419.

Figure 22:
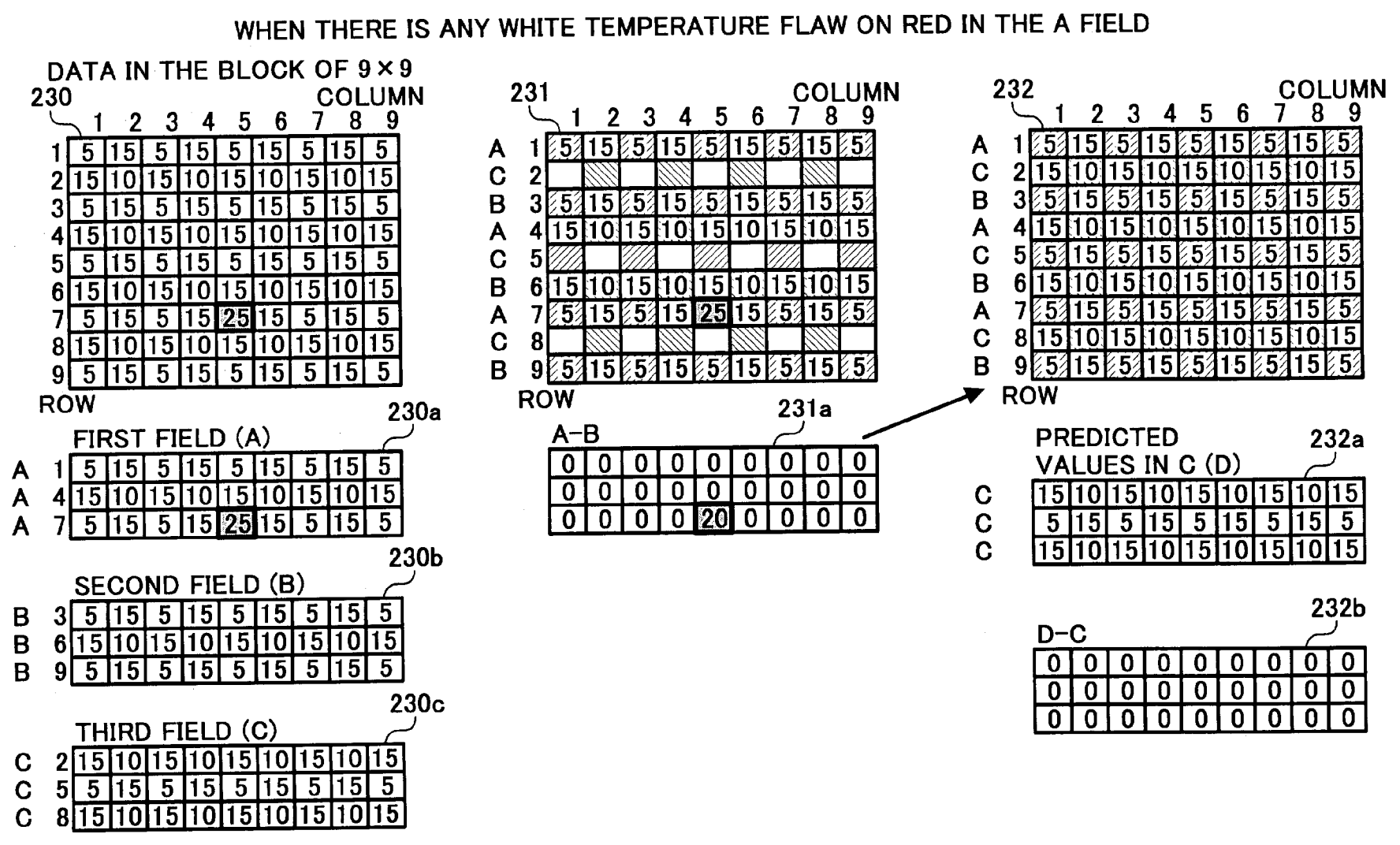

FIG. 22 shows the case where a temperature white defect is present in red of A field. In an example of pixel value data 230, a pixel value [25] is obtained in a R pixel on line 7 row 5. The pixel value of the R pixel on line 7 row 5 is corrected to [5] by the process similar to that mentioned previously, and Data Table 232 after corrected is obtained in an external SDRAM 419.

Figure 23:
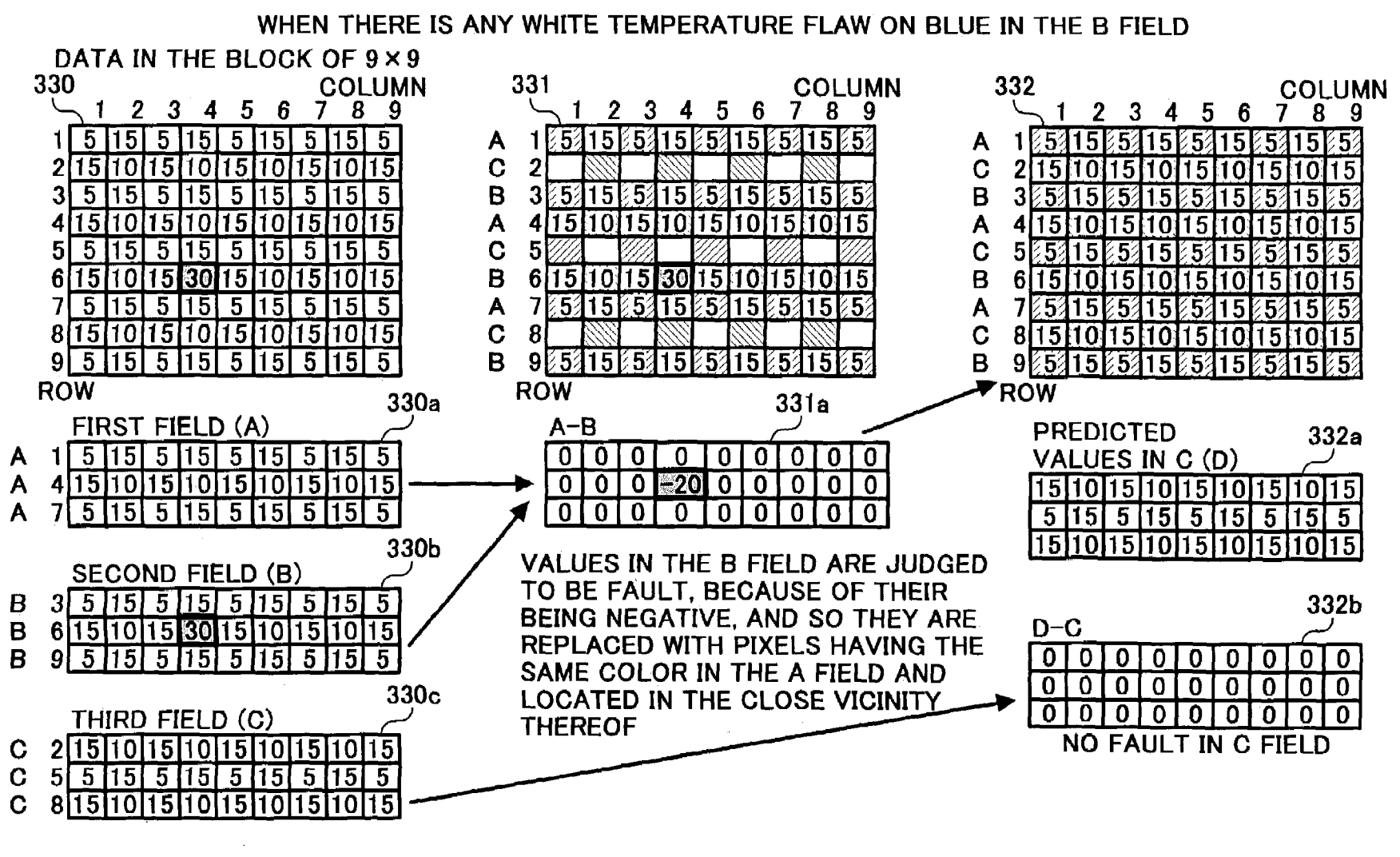
Figure 24:
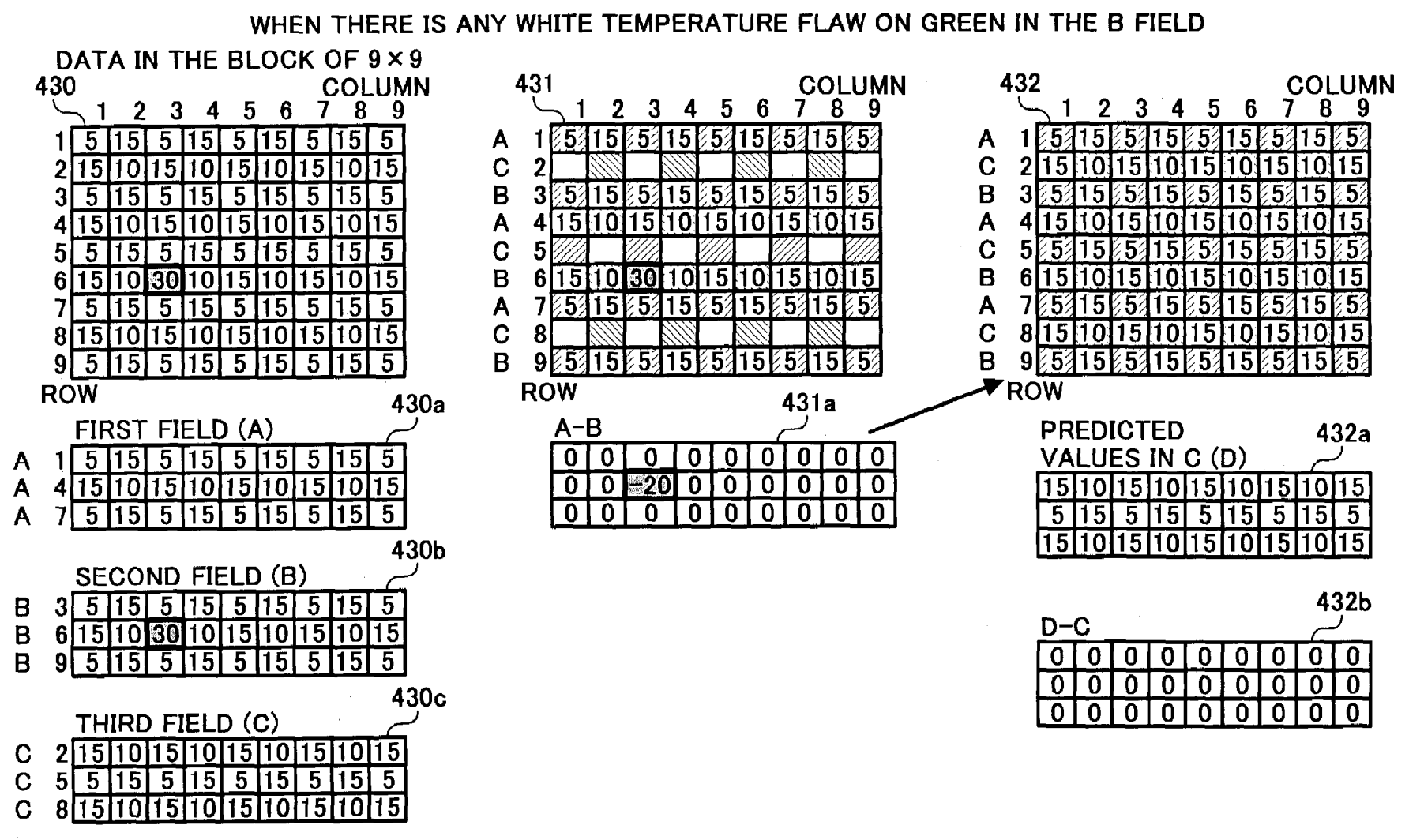
Figure 25:
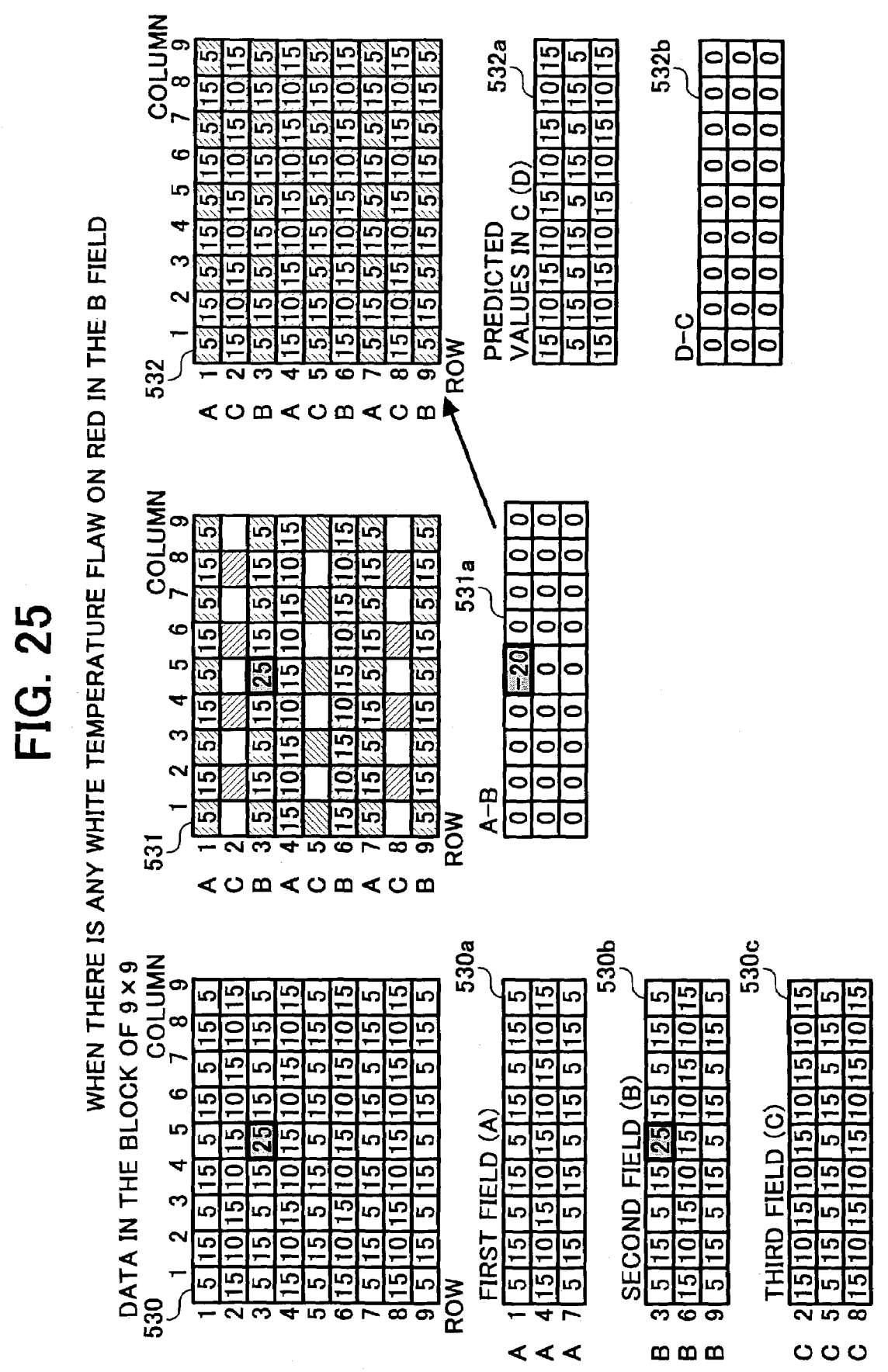

FIGS. 23 to 25 show a treating example where a temperature while defect is present in blue, green and red of B field. In an example of pixel value data 330 of FIG. 23, a pixel value [30] is seen in a B pixel on line 6 row 4. In this case, in Data Table 331a showing the subtraction result (A–B) of Arrangement Tables 330a, 330b is shown a pixel value [–20] showing the presence of one temperature white defect. Since the pixel value [–20] is negative, it is determined that a temperature white defect is present in a B pixel on line 6 row 4 of B field to be a subtraction number, and it is rewritten by a pixel value [10] of a B pixel of A field positioned on line 4 row 4 to which imparted a number to be subtracted in the operation processing, and a Data Table 332 after correction similar to that described above within an external SDRAM 419 is obtained.

In an example of pixel value data 480 of FIG. 24, a pixel value [30] is seen in a Gb pixel on line 6 row 3. In Data Table 431a showing the subtraction result (A–B) of Arrangement Tables 430a, 430b is shown a pixel value [–20] showing the presence of one temperature white defect.

Accordingly, the pixel value of the defect pixel is rewritten by a pixel value [15] of a Gb pixel of A field on line 4 row 3 to which a number to be subtracted is imparted in the subtraction process to obtain a Data Table 432 after correction.

The pixel value data example of FIG. 25 is an example in which a pixel value [25] is seen in a R pixel on line 3 row 6, the pixel value of the defective pixel is rewritten by a pixel value [5] of a R pixel of A field on line 1 row 5 to which is imparted a number to be subtracted in the operation processing by the processing similar to that explained with reference to FIGS. 23 and 24 to obtain a Data Table 532 after correction.

Figure 26:
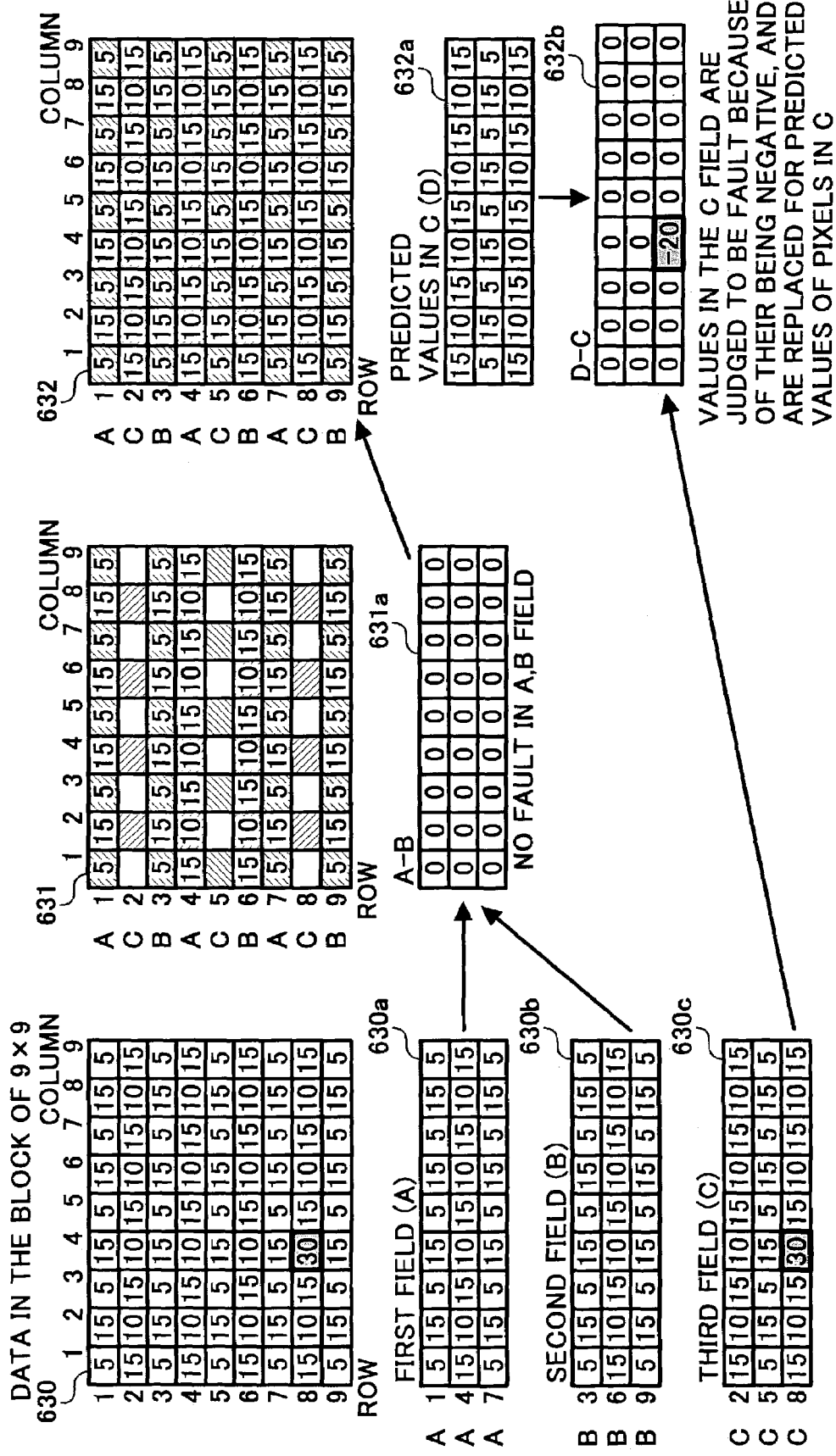
FIG. 26 is a similar view to that illustrated in FIG. 20 with respect to one region where any temperature defect is existent on a blue color in the third field.
Figure 27:
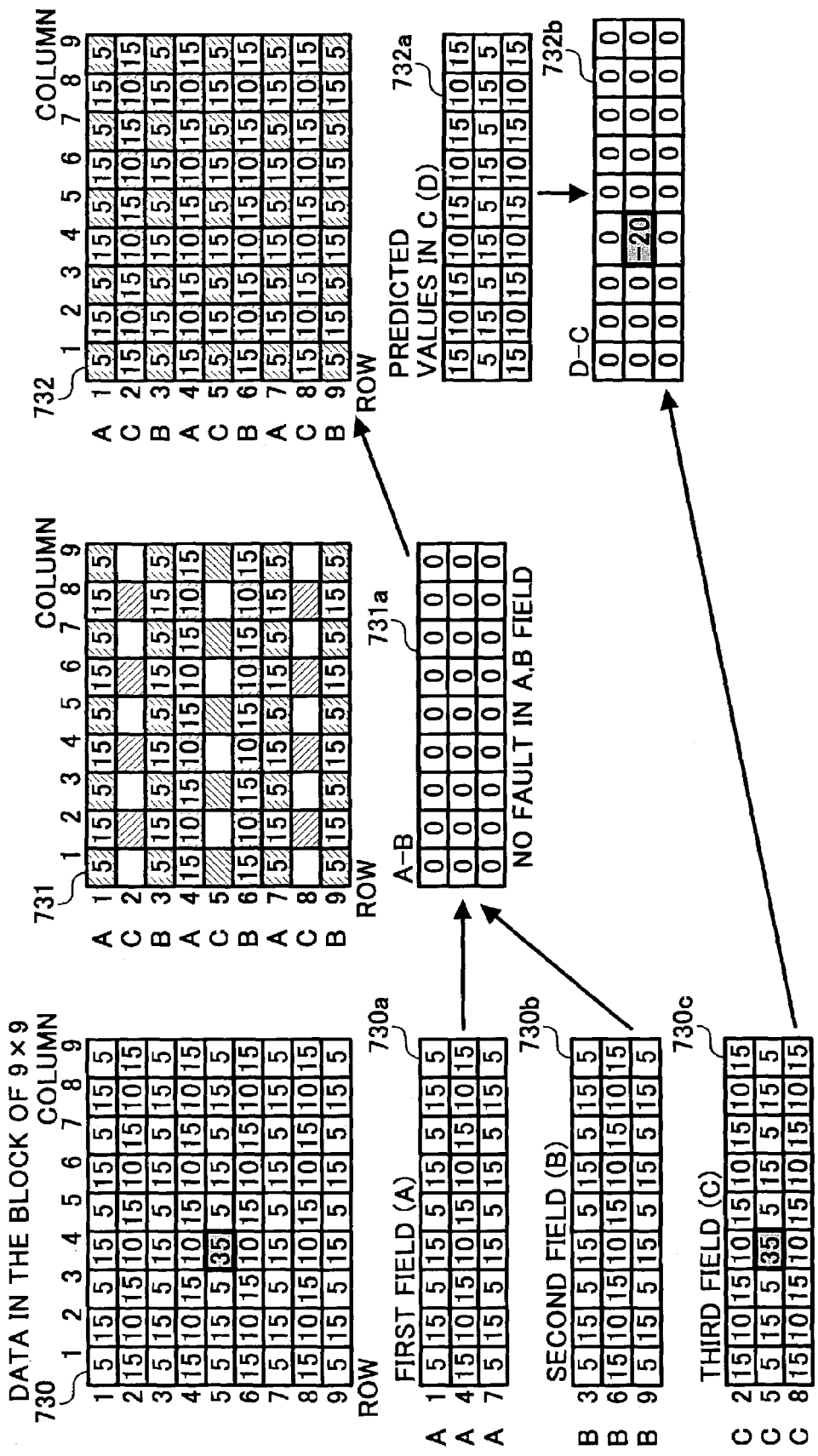
FIG. 27 is an identical view in FIG. 20 with respect to one region where a temperature defect is existent on a green color in the third field.
Figure 28:
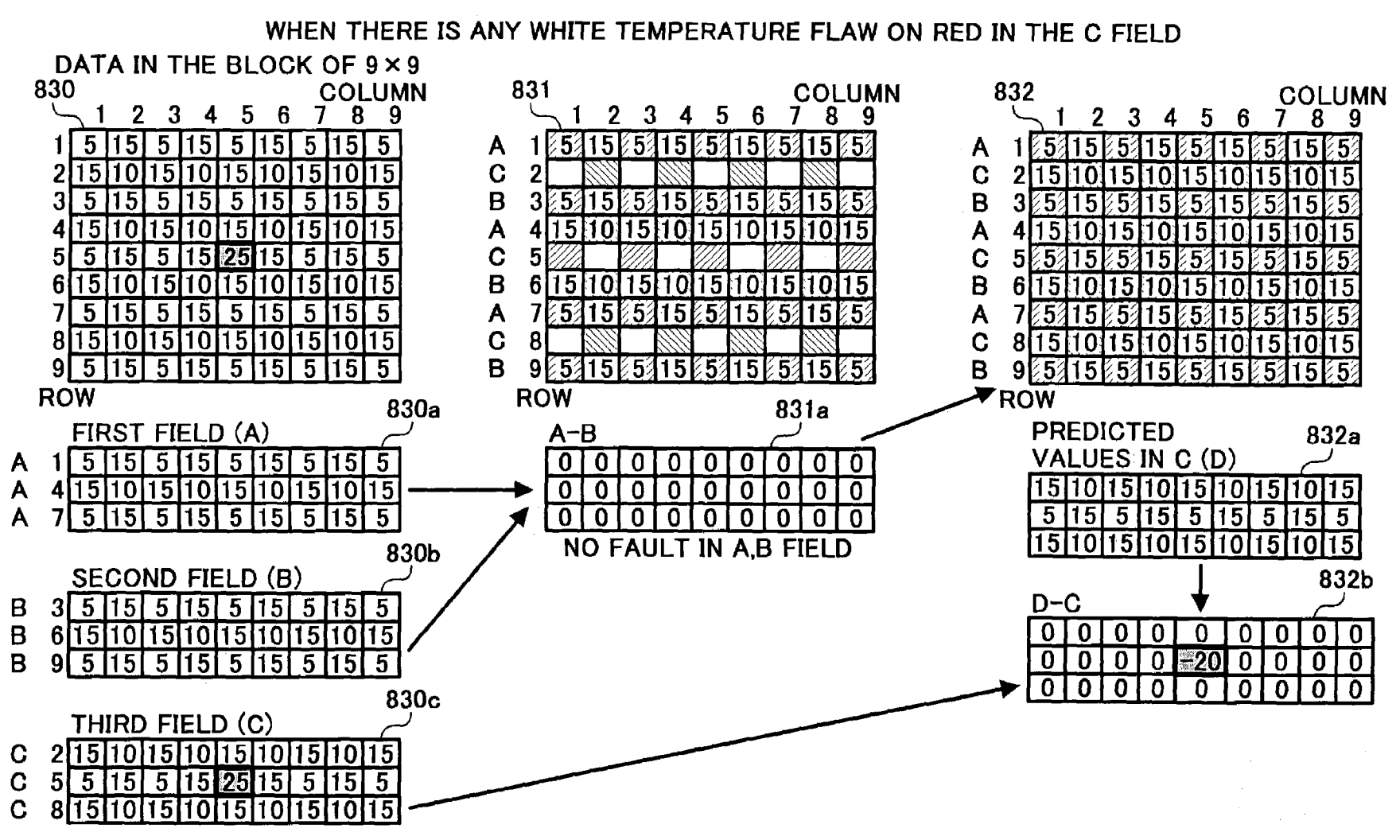

FIGS. 26 to 28 show an example in which a temperature white defect is present in a pixel of C field which is a third field. In an example of pixel value data 630 of FIG. 26, a pixel value [30] is seen in a B pixel on line 8 row 4. In this case, values of Data Table 631a showing the subtraction result (A–B) of Arrangement Tables 630a, 630b are [0] which represents that a temperature white defect is not present in A field and B field.

Therefore, values of Data Table 631 formed by extracting A field and B field are written in Data Table 632. Further, prediction data 632a which is a prediction value D of C field is obtained from values of these A field and B field by a color interpolation circuit 418.

When the prediction data 632a is obtained, a subtraction circuit 417 carries out an operation processing (D–C) for subtracting corresponding each value of Arrangement Table 630c relative to C field from each value of the prediction data 632a. As a result of this subtraction, Data Table 632b is obtained. In Data Table 632b is obtained [0] except one operation result showing a value of [–20]. The operation result means that a temperature white defect is not created as described previously.

On the other hand, in a pixel to which is imparted a subtraction number in the operation from which is obtained the operation result [−20], that ism in the example shown in FIG. 26, it is found that a defect of a temperature white defect is present in a B pixel of C field positioned on line 8 row 4 of Data Table 630.

The pixel value [−20] of the defective pixel is rewritten by a prediction value D to which is imparted a number to be subtracted of the above-mentioned operation, that is, a value [10] at an arrangement position of prediction data 632a corresponding to the arranging position of [−20] of Data Table 632b. As a result, Data Table 632 in which a temperature white defect is corrected is obtained.

In an example of pixel value data 730 of FIG. 27, a pixel value [35] is seen in a Cr pixel on line 6 row 4. In this case, a pixel value shown by a value [−20] of Data Table 732b showing the result of the operation processing (D−C) is rewritten by a value [15] at a corresponding position of Data Table 732a to obtain Data Table 732 in which a temperature white defect is corrected.

In an example of pixel value data 830 of FIG. 28, a pixel value [25] is seen in a R pixel on line 5 row 5 is seen. In this case, a pixel value shown by a value [−20] of Data Table 832b showing the result of operation processing (D−C) is rewritten by a value [5] at a corresponding position of Data Table 732a to obtain Data Table 832 in which a temperature white defect is corrected.

For simplifying the explanation, FIGS. 20 to 28 showed a pattern in which a differential when a temperature white defect is not created is [0]. Actually, the probability in which a pattern where such a differential is [0] is present is low, and an unevenness occurs also in a pixel value between pixels of the same color free from a temperature white defect. However, that differential is an extremely small value as compared with the case of a temperature white defect as described above, and the aforementioned threshold value range is adequately set to thereby enable determination similar to that explained with reference to FUS, 20 to 28.

FIG. 29 shows a timing chart of a digital still camera according to the present invention. According to this digital still camera, as shown in FIG. 33, pixel values of A field, B field and C field obtained after the exposure are subjected to operation processing by a temperature white defect correction device 14, whereby the temperature white defect can be corrected adequately and quickly without necessitating a temperature sensor for detecting a temperature white defect of CCD 402 or address data for a temperature white defect. Accordingly, a good image of one frame without being affected by a temperature white defect can be formed from the corrected pixel values of the three fields within the external SDRAM 419

As shown in FIG. 15, a normal temperature defect correction device 407 shown by imaginary lines for correcting a black defect or an in-bright white defect not depending upon the temperature of CCD 402 can be inserted between a sampling signal processing circuit 403 and a temperature white defect correction device 404.

In this case, since a normal temperature defect not depending upon the temperature of CCD 402 is corrected by the normal temperature defect correction device 407 and a temperature white defect is corrected by a temperature white defect correction device 14, both image defects which are dynamic and static in connection with temperatures can be corrected, whereby images of higher quality can be obtained.

The normal temperature defect correction device 407 can be also inserted into the rear stage of the temperature white defect correction device 404, but since the influence of the normal temperature defect can be eliminated by correction by means of the temperature white defect correction device 404, it is desirable that the normal temperature defect correction device 407 is inserted into the front stage of the temperature white defect correction device 404.

Figure 30:
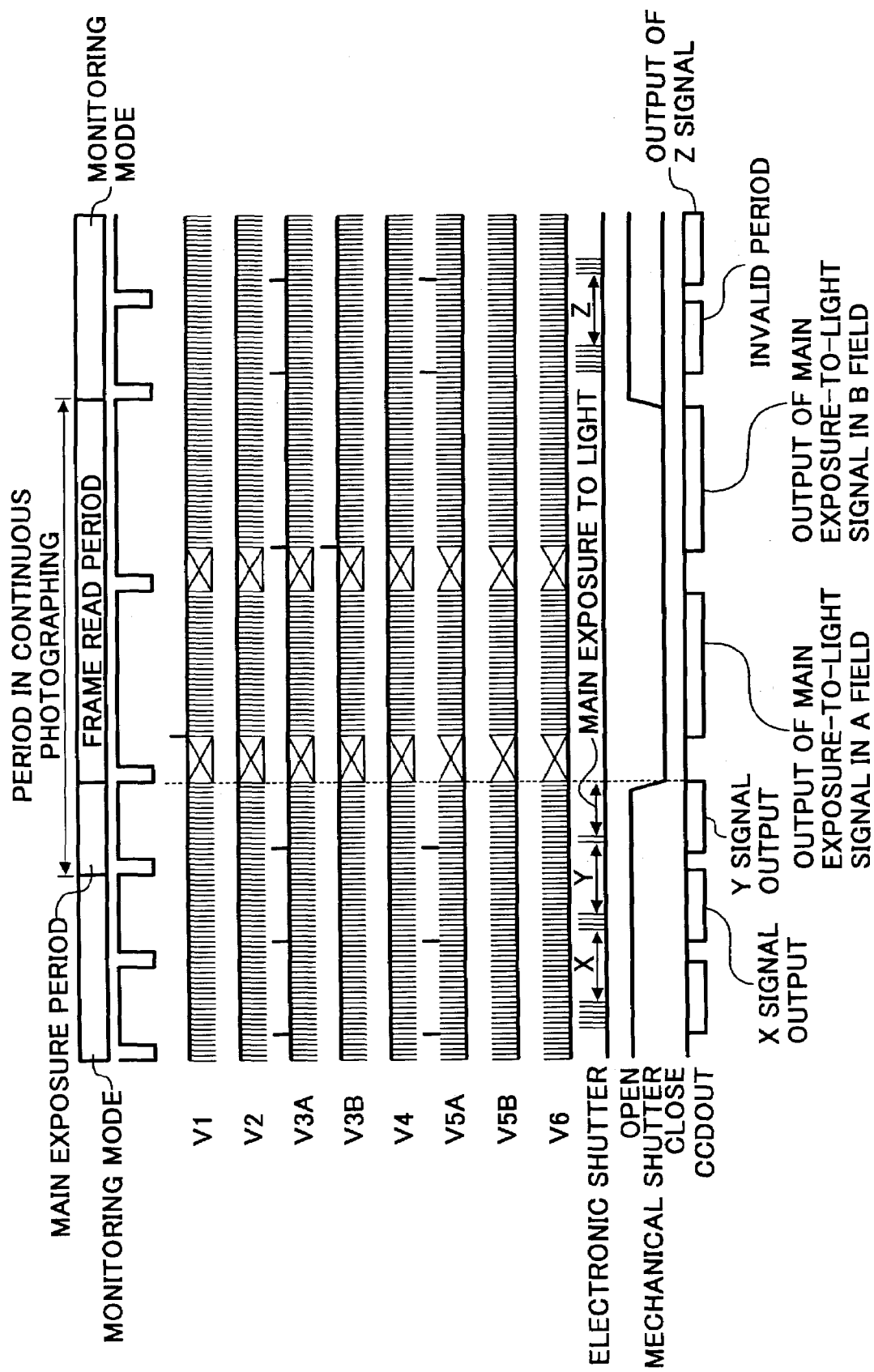
FIG. 30 is a timing chart illustrating the read operation in 2 fields in the digital camera illustrated in FIG. 1.

FIG. 30 shows a timing chart where an image is formed using a part of pixel values of all pixels of CCD 402. FIG. 30 shows an example in which a digital sill came is operated in a serial mode, showing a record mode in pixel number one ninth of all pixels of CCD 402. In the serial mode, pixel values of A field and B field are subjected to subtraction processing (AB) as explained with reference to FIG. 19(b) and FIG. 19(a) and the pixel values of both the field are subjected to correction of a temperature white defect. An image in the serial mode is formed using the pixel value of either one of both the fields in which a temperature white defect is corrected.

At this time, the above-described operation processing (A−B) between both the fields is carried out every area, and a pixel representative of a temperature white defect of both the fields can be corrected in any field. However, since a pixel value of one field (A or B) which is small in number of temperature white defects is used as a result of the subtraction processing in the whole area for the purpose of enabling quicker image processing, it is desirable that a temperature white defect in the above one field is corrected, and correction is not carried out in the other field but the pixel value of the one field in which correction is made is used to record an image.

In the illustration, there is shown an example in which one frame is divided into three fields, but it may be divided into four or more fields as necessary.

The aforementioned photographing apparatus comprises a photographing device, an imaging means, a photographing processing portion, and an image processing means.

The photographing device has a color filter for color decomposition.

The photographing device is means for forming an image to be photographed. The imaging means generally has an imaging optical system (a lens system, an imaging mirror system or, a composite system of a lens system and a mirror system or the like), a shutter for passing imaging luminous fluxes through the photographing device or interrupting the same, and a drive portion for driving opening and closing of the shutter.

The photographing processing portion caries out the photographing processing for forming a charge accumulated and transferred to the photographing device into a digital signal.

The image processing means carries out the image processing including at least YUV conversion using transfer data transferred through the photographing processing portion.

And, the photographing device is an interlacing transfer system, and in transferring charges of all pixels accumulated, the data transfer of charges is carried out dividing it into M ($\geq 3$) fields.

A color filter of the photographing device of the photographing apparatus may be of a primary color system of red (R), green (G) and blue (B), or may be of a complementary color system of yellow (Y), cyan (C), magenta (M) and green (G).

In an example of the pixel value data 630 of FIG. 26, a pixel value [30] is seen in a B pixel on line 8 row 4. In this case, values of Data Table 631a showing the subtraction results (A−B) of Arrangement Tables 630a, 630b are [0], indicating that a temperature white defect is not present in A field and B field.

Figure 31:
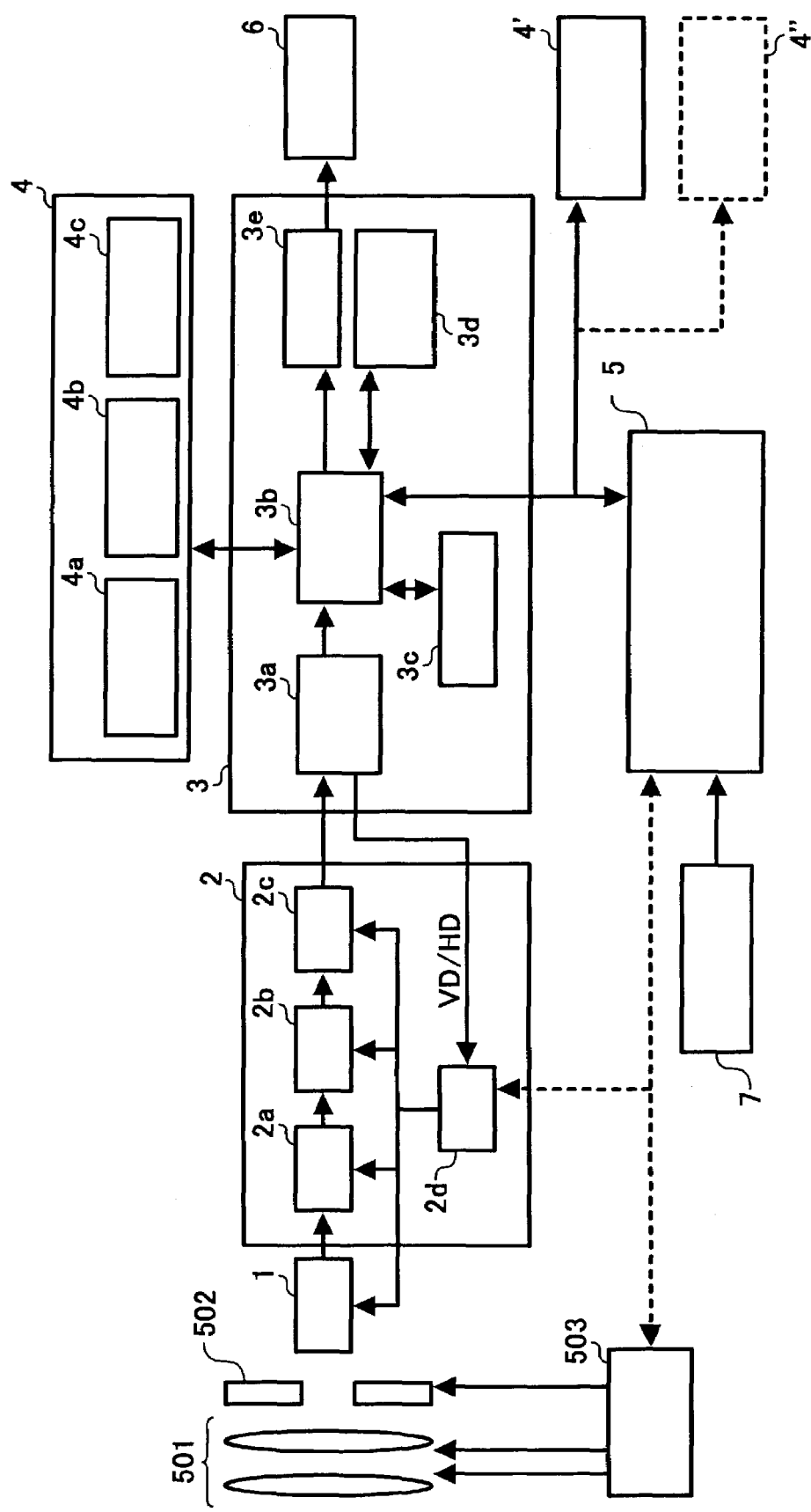
FIG. 31 is a view illustrating the system arranged of an electronic still camera being a preferred embodiment of a photographing apparatus or an image information processing apparatus.

FIG. 31 is a schematic block diagram showing an "electronic still camera (which is normally called a digital camera)" system as another example of the photographing apparatus according to the present invention.

A "photographing device" indicated at reference character 1 includes a color filter for color decomposition. For example, the photographing device is a CCD and the like that utilizes the color filter for the color decomposition A series of photographing lenses indicated at reference character 501, a shutter 502, and a driving section 503 constitute "imaging means" for forming an "image to be photographed" on the photographing device 1. The driving section 503 is controlled by the controller 5 not only to drivingly open and close the shutter 502, but also to drivingly displace attitude of lenses in the series of photographing lenses in response to an auto-focus (AF) control and a hand-shake correction control.

A "photographing processor" indicated at reference character 2 performs photographing processing for converting electrical charges which are stored in the photographing device 1 to be transferred, into digital signals. The photographing processor 2 includes a CDS (correlated double sampling circuit) 2a, an AGC (automatic gain control circuit) 2b, an A/D (analog/digital conversion circuit) 2c, a TG (timing generation circuit), and the like.

An "image processor" indicated at reference character 3 includes a CCD-IF (CCD interface) 3a, a memory controller 3b, a YUV converter 3c, a compression processor 3d, and a display I/F (display interface) 3e.

A "storage section" indicated at reference character 4 is used to store raw data needed for image processing and data subjected to the image processing, and includes a RAW-RGB 4a area for storing the raw data, a YUV area 4b, and a JPEG area 4c. The memory of the storage device 4 is volatile.

In this embodiment, an external storage section 4' (for example, a memory card) is attachable and detachable to and from a photographing device body from the outside. In the external storage section 4' is stored various images generated through the image processing. Instead of, or inclusive of providing this attachable and detachable external storage section 4', an image holding area 4" may be provided inside the image photographing apparatus in which the above-mentioned various images are stored. The memory in the external storage section and the image holding area is also volatile.

A "controller (CPU)" indicated at reference character 6 controls transmission and reception of data between each section of the image processor 3 and the storage section 4 through the memory controller 3b of the image processor 3. Also, the controller 5 controls the entire photographing apparatus. A "display section" indicated at reference character 6 is used to display a thumb-nail image, a photographing confirmation image, and the like. An "operating section" indicated at reference character 7 is used to set a photographing condition, a generated image condition, or the like.

Image processing means is provided for performing the image processing including at least "YUV conversion" using transmission data (comprising digital signals) that are transmitted via the photographing processor 2. This image processing means is composed of the image processor 3, the storage section 4, and the controller 5.

Figure 32A:
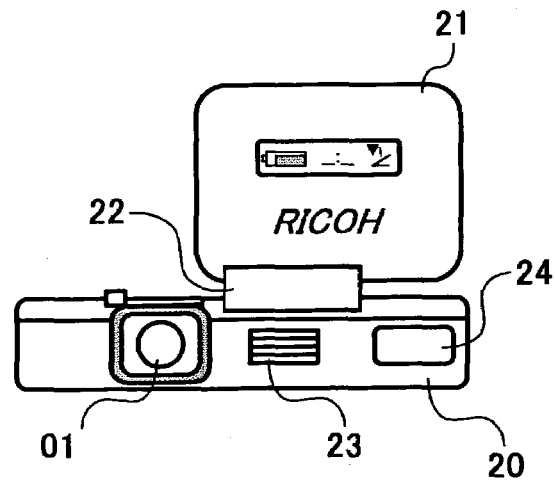
FIG. 32 is a view illustrating one embodiment of the electronic still camera illustrated in FIG. 31.
Figure 32B:
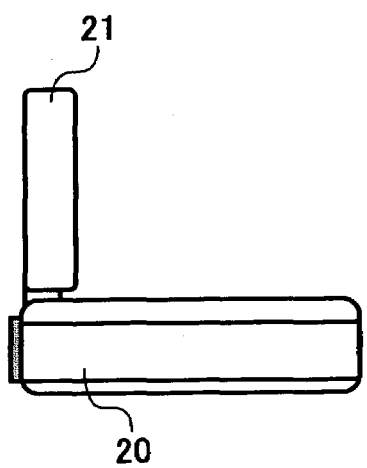
Figure 32C:
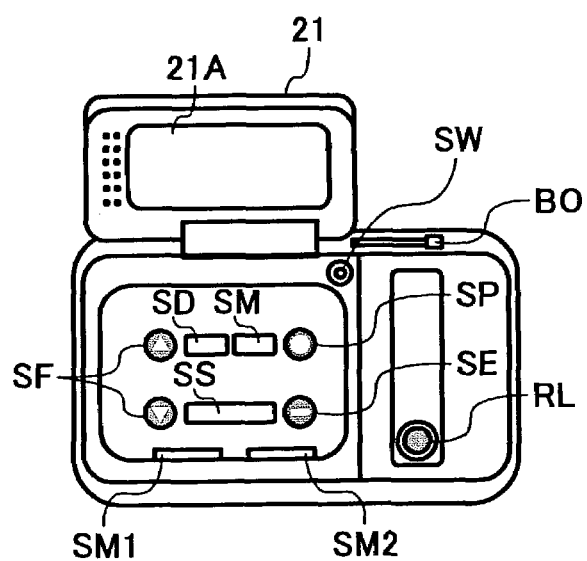

It should be noted that the "electronic still camera" as shown in the system of FIG. 31 includes the embodiment as shown in FIG. 32. FIG. 32(a) is a front view; FIG. 32(b) is a side view; and FIG. 32(c) is a top view. Reference character 20 denotes a "camera body", and reference character 21 an "upper lid" attached to freely open and close by a hinge 22 with respect to the camera body 20. FIG. 32 shows a state with the upper lid 21 opened. In the front view, reference character 501 corresponds to "a series of photographing lenses" as explained with reference to FIG. 31, reference character 23 to a "strobe", and reference character 24 to a "finder".

In FIG. 32(c), reference character 21A denotes a "liquid crystal monitor", and reference character Sw an "upper-lid opening and closing detection switch". That is, the upper-lid opening and closing detection switch Sw is a switch for detecting whether the upper lid 21 is open or closed. And reference character BO denotes a "barrier opening knob".

A "date switch" indicated at reference character SD is to perform settings of date and time to the electronic still camera. A "frame feeding switch" indicated at reference character SF is a switch for performing frame feeding of the thumb-nail image displayed on the liquid crystal monitor 21A, for example. A "storage mode transfer switch" indicated at reference character SM1 is a switch for switching among "recording modes" including a color photographing mode, a monochrome photographing mode, a single-shot mode, a consecutive shot mode, and the like.

An "image mode switch" indicated at reference character SM2 is a switch for performing settings of a photographed image size and the like. Reference character SP denotes a "display switch" for determining whether the display of the image should be performed on the liquid crystal monitor 21A or not, and reference character SE denotes an execution switch (enter switch). Reference character SM denotes a "menu switch".

Further, reference character RL denotes a "release switch" for performing a shutter operation upon photographing. These various switches constitute the operating section 7 of FIG. 1.

In FIG. 31, the photographing device 1 is a photographing device that employs an interlacing transfer system in which data transmission of electric charges is carried out by division thereof into M ($\geq 3$) fields when transferring the electric charges of all pixels stored. As described above, the photographing device 1 includes the "color filter for color decomposition." The color filter may belong to the above-mentioned primary color system, or a complementary color system.

FIG. 33(a) shows part of a color filter of the primary color system, and FIG. 33(b) shows part of a color filter of the complementary color system. In the filter of the primary color system, R designates a "red filter", G a "green filter", and B a "blue filter". These three filters R, G, and B are two-dimensionally arranged as shown in the figure. Looking at the arrangement of these filters in the lateral direction, the R filters and the G filters are alternatively arranged in one line, while the B filters and the G filters are alternatively arranged in the other line. Accordingly, in the entire color filter, the G filter occupies one half of the entire filter, while each of the R and B filters one fourth thereof.

In the filter of the complementary color system, Y designates a "yellow filter", G a "cyan filter", M a "magenta filter", and G a "green filter". These four filters Y, C, M, and G are two-dimensionally arranged as shown in the figure. Looking at the arrangement of these filters in the lateral direction, the M filters and the G filters are alternatively arranged in one line, while the Y filters and the C filters are alternatively arranged in the other line. Accordingly, in the entire color filter, each filter occupies one fourth of the entire filter.

As described above, as the color filter may be employed not only the primary color system but also the complementary color system. In order to explain the embodiment more concretely, the case of using the primary color system will be described hereinafter with reference to FIG. 33(a).

The photographing device 1 is a photographing device that employs the interlacing transfer system in which the data transmission of the electric charges is carried out by division thereof into M ($\geqq 3$) fields when transferring the electric charges of all pixels stored. Now, the case M=3 will be first explained below.

Figure 34A:
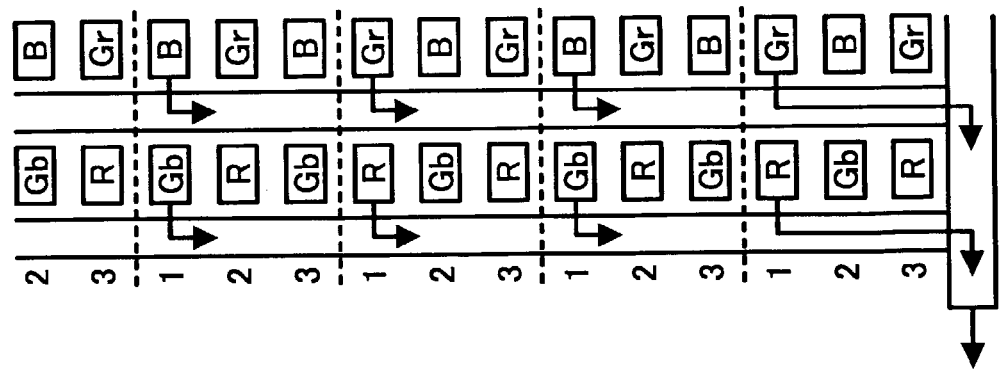
FIG. 34 is a view illustrating an interlacing transfer system in the case of M=3.

FIGS. 34(a), (b), and (c) shows the arrangement of pixels (photoreceptor) in two columns of the photographing device employing the interlacing transfer system at M=3 in the vertical direction thereof (namely, in the longitudinal direction of the figure). R, Gr, Gb, and B designate filters corresponding to the respective pixels. In the horizontal direction, namely lateral direction of the figure, pixels of the R filters and pixels of the Gr filters are alternatively arranged in one line, while pixels of the B filters and pixels of the Gb filters are alternatively arranged in the other line. The Gr filter is a green filter disposed on an arrangement line of the filter R, while the Gb filter is a green filter disposed on an arrangement line of the filter B.

For example, in FIG. 34(a), the pixels are arranged to be divided into three groups in the longitudinal direction of the figure (namely, in the vertical direction). That is, on the left side of the each pixel, numbers 1, 2, and 3 are repeatedly recorded in the vertical direction. Each number corresponds to one line of the pixel arrangement in the horizontal direction. Such a line of the pixel arrangement in the horizontal direction is a "field". Theses fields are classified by the numbers disposed on the respective left sides of the pixels, whereby "first field", "second field", and "third field" are assigned to the respective fields.

As shown in FIG. 34(a), the pixel arrangement of the photographing device in the vertical direction has the first, second and third fields alternatively arranged repeatedly. Then, the first, second and third fields that constitute one repeating cycle of the fields are combined into and hereinafter referred to as a "field group".

In FIG. 34, transmission of the electric charges stored in all the pixels of the photographing device will be carried out as follows. That is, when starting transmission, first an electric charge of the pixel belonging to the first field of each field group is transferred. FIG. 34(a) shows an explanatory diagram of this state. This transmission will be hereinafter referred to as "primary transmission (in which the electric charge of the pixel in the first field of the each field group is transferred)" for convenience.

Figure 34B:
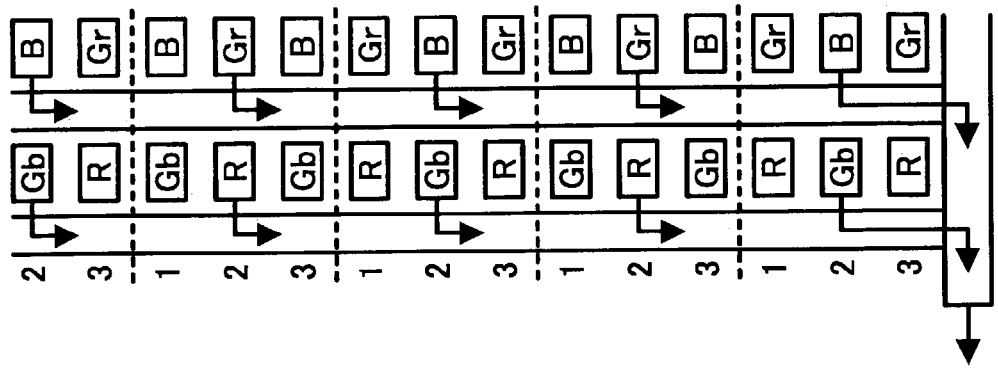
Figure 34C:
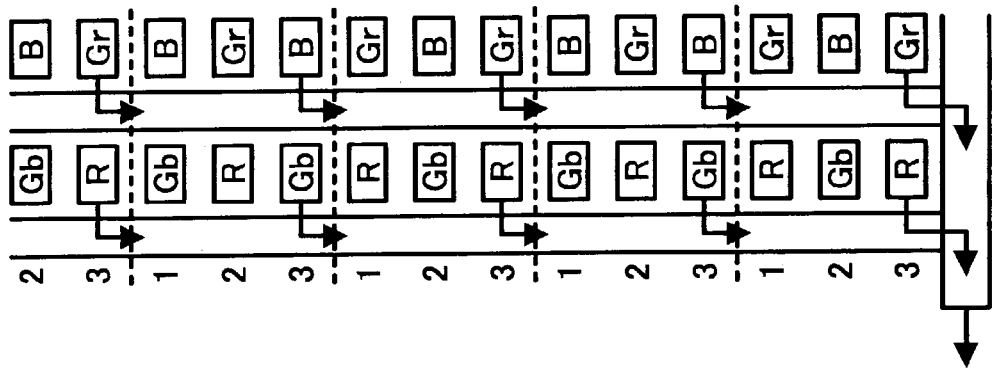

After the primary transmission, next an electric charge of the pixel belonging to the second field of each field group is transferred. FIG. 34(b) shows this state, and this transmission will be hereinafter referred to as "secondary transmission". After this secondary transmission, an electric charge of the pixel belonging to the third field of each field group is transferred. That is, "tertiary transmission" is conducted (see FIG. 34(c)).

Accordingly, when the tertiary transmission is completed, the transmission of all charges is finished. Upon the above-mentioned primary, secondary, and tertiary transmission, data transmitted with the same dimension will be hereinafter referred to as the "transmission data of the same dimension".

Now, in cases where the photographing device 1 is a photographing device that employs the interlacing transfer system in which the data transmission of the electric charges is carried out by division thereof into 3 fields (the first to third fields) when transferring the electric charges of all pixels stored, the image processing and image generation will be explained below with reference to a flowchart of FIG. 36.

In this embodiment, resolution of photographed images can be divided into three steps "low, medium, and high" as photographing conditions. Further, a thumb-nail image is generated without fail, and whether the photographing confirmation image should be generated or not is selectively set.

First, setting of the photographing condition is carried out by the operation of the operating section 7 of FIG. 31. Little more concretely, the upper lid 21A is opened with respect to the electronic still camera body 20 as shown in FIG. 32, and then the display switch SP is operated to set the liquid crystal monitor 21A to a displayable state.

Figure 35:
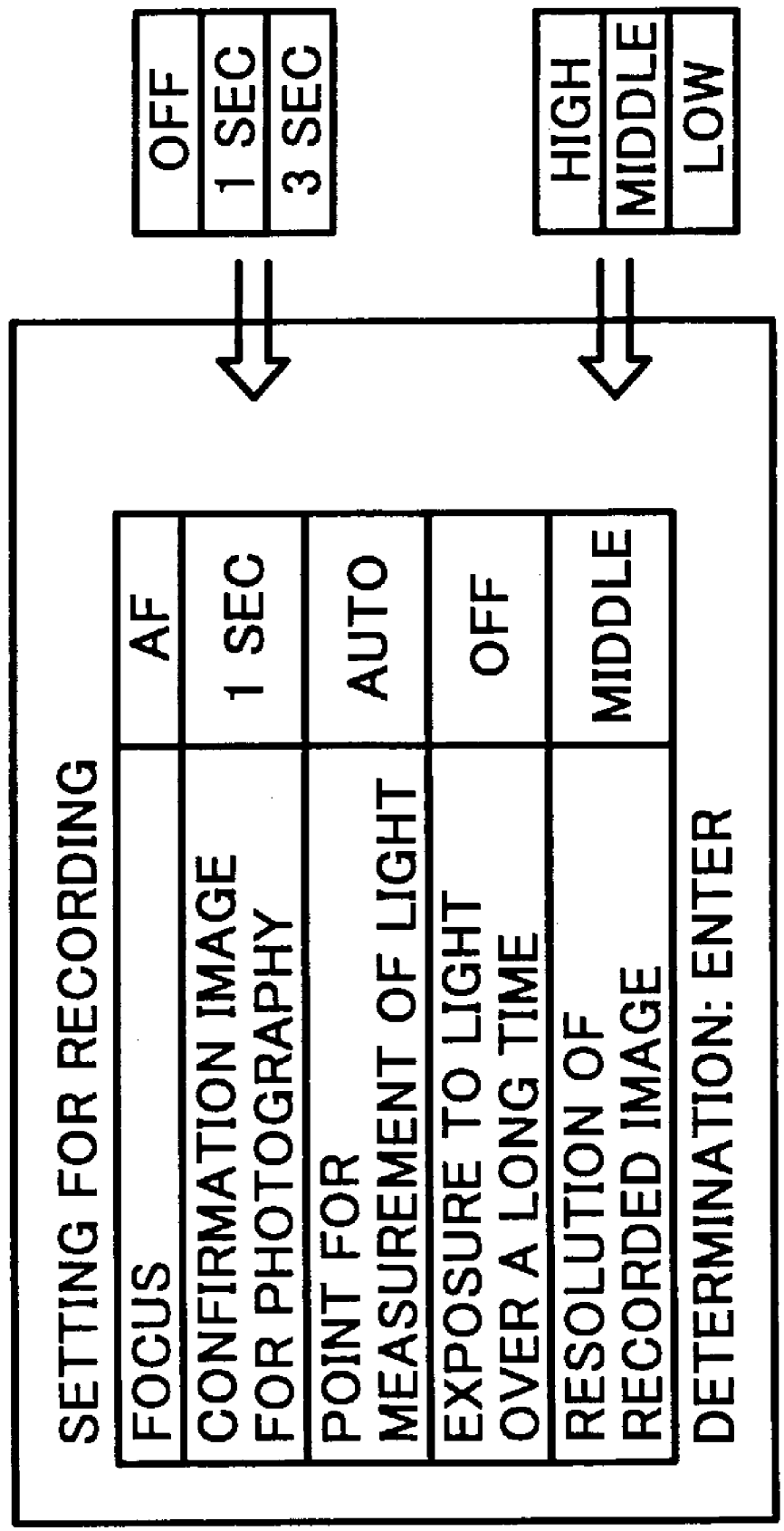
FIG. 35 is a view illustrating one example of setting photographing conditions.

The operation of the menu switch SM causes the liquid crystal monitor 21A to display a setting screen as shown in FIG. 35, so that the record setting is performed. In an example of FIG. 35, the AF (auto-focus) is set as the focus control, and for example "1 sec." is selected from among "Off" and display times "1 sec." and "3 sec." for display of the photographed confirmation image on the liquid crystal monitor 21A Further, for example "medium" is selected from among the resolution of recorded images "high", "Medium", and "low". After these settings, the setting contents are confirmed by the execution switch SE. Instead of setting the resolution, image compression rate may be set by user's selection using the same display system.

In this state, photographing is carried out. It should be noted that in a starting state of the flowchart shown in FIG. 36, the electric charges are stored in all the pixels of the photographing device by the photographing operation.

When transmission is started, electric charges data stored in the photographing device 1 are divided into the three fields according to the image of interest, so that the primary to tertiary transmission is performed in sequence. The transferred data are subjected to the "correlated double sampling" by the CDS2a of the photographing processor 2, and then subjected to the automatic gain control by the AGC2b. Thereafter the data are converted into digital signals (digital data) by the A/D2c to be stored in the storage section 4 via the CCD-I/F 3a and the memory controller 3b of the signal processor 3 (S1).

At this time, if the controller 5 confirms completion of the data transmission of the first field (S2), then ("Yes" in the S2) it further confirms whether the display of the photographing confirmation image should be set or not (S3). If the setting of the photographing condition is that as shown in FIG. 35, the photographing confirmation image will have been displayed for one second.

At this time, in the state of completing the primary transmission, each first field of the continued field groups includes R information (information on a red component), G information (information on a green component), and B information (information on a blue component), as color information. So, after completion of the primary transmission, the transmission data of the same dimension in the primary transmission include all information needed for generation of a color image and pixels needed for generation of the color image of low resolution.

Therefore, at this stage the image processing can be performed.

In the processing S3, when the display setting of the photographing confirmation image is confirmed (that is, "Yes" in the S3), image processing of generating the photographing confirmation image is carried out based on the transmission data of the first field transferred at the same dimension (S4). The photographing confirmation image thus generated is displayed on the display 6 via the display I/F 3e.

Subsequently, image processing of generating the thumb-nail image is performed (S5). It should be noted that if the display setting of the photographing confirmation image is not confirmed in the processing S3 (that is, "No" in the S3), the generation of the photographing confirmation image is omitted, and the thumb-nail image generating processing may be carried out.

Next, it is determined or checked whether the resolution of the image to be generated is set "low" or not (S6). If the "low resolution" is set (that is, "Yes" in the S6), the image processing in compliance with the transmission data of the first field (the transmission data of the same dimension in the primary transmission) is conducted (S7), and the image of the low resolution is generated.

If the resolution set is not "low" (that is, "No" in the S6), the completion of the data transmission of the second field (namely, the secondary transmission) is confirmed (S8). Further, it is determined or checked whether the resolution of the image to be generated is set "medium" (S9).

If the medium resolution is set (which corresponds to the case of FIG. 5) (that is, "Yes" in the S9), the image processing of generating the medium resolution image is performed utilizing the transmission data of the first and second fields (namely, the data in the primary and secondary transmission) (S10).

If the resolution set is not "medium" in the processing S9 (that is, "No" in the S9), the completion of the data transmission of the third field (namely, the tertiary transmission) is confirmed (S11). Thereafter, the image processing of generating the high resolution image is performed utilizing the transmission data of the first, second, and third fields (namely, all pixels data) (S12).

Referring to FIG. 31, the data from the photographing device 1 are stored through the photographing processing section or image processing part 2, CCD-I/F 3a of the signal processing part 3 and memory controller 3b in the RAW-RGB section (part) 4a of the memory section 4 as an actual data.

Data of information, R-G-B stored in the RAW-RGB section 4a of the memory 4 is sent through the memory controller 3b to the YUV converting part 3c corresponding to the setting of user such as presence or absence of display of the image for confirming photographing, resolution, "low", "middle" and "high" and so on after detecting completion of transfer of each field, and is then converted into data of YUV signal by means of the YUV conversion and is finally stored in the YUV section 4b of the memory 4.

As described above, the image for confirming photographing and the image of thumbnail made by the transfer data (at the same time as that of the first transfer) of the first field are displayed through the displaying part I/F 3e on the displaying part 6. If the set resolution is low, the data of YUV signal is again read out through the memory controller 3b from the YUV section 4b of the memory 4 and is sent to the compress processing part 3d. A compress processing is carried out to format of JPEG by the compress processing part 3d. The compressed data is then stored in the JPEG section 4c of the memory 4.

When the data is stored in the JPEG section 4c of the memory 4, header data and so on is added to the compressed data of the JPEG as JPEG image data which is stored in the exterior memory 4' by the controlling part 5.

If there is provided an image storing section 4", the aforementioned data may be stored in the section 4".

If the set resolution is middle, completion of data transfer (second transfer) of the second field is detected and image processing thereof is carried out by use of the transfer data of the first and second fields. Similarly, if the set resolution is high, completion of data transfer of the third field is detected and image processing thereof is carried out by use of the transfer data (data of all pixels) of the first and third fields.

As a concrete example, if an photographing device (CCD) having pixels of 300 ten thousand, horizon: 2048 pixels, perpendicular: 1536 pixels, in interlace transferring type of effecting separating transfer of three times (first through third transfers), data (transfer data at the same time) of horizon: 2048 pixels and perpendicular: 512 pixels can be transferred at one time.

Accordingly, if a size of horizon: 640 pixels, perpendicular: 480 pixels (VGA) is recorded, it is sufficient to make an image with number of pixels for transfer in the first field. Further, the number of pixels for transfer (sum of first and second transfers at the same time) the first and second fields become horizon: 2048 pixels and perpendicular: 1024 pixels and therefore it is possible to generate an image having sizes of horizon: 1024 pixels, perpendicular: 768 pixels and horizon: 1280 pixels, perpendicular: 1024 pixels.

If the transfer data of the first field or first and second fields is used, because aspect ratio between horizontal and perpendicular pixels is different, a horizontally lengthened image is formed.

However, when converting at the YUV converting part 3c adjustment of the aspect ratio may be accomplished with processing such as reading out thinned horizontally from the RAW-RGB section 4a of the memory 4.

If an image recording of VGA size similarly as the image of confirming photographing or of thumbnail is intended, processing of photographed image is sufficient with the transfer data of the first field (at the same time as first transfer).

Therefore, it is possible to accomplish rapidly processing by effecting the next photographing without effecting processing of data transfer of the second and third fields.

Namely, the transfer data of the number of field necessary to effect image processing corresponding to the set resolution (low, middle and high) is used and the next photographing is started without effecting data transfer of unnecessary field to accomplish image processing of high speed.

It is, also possible to effect image processing in which transfer data of the first to third fields transferred from the photographing device 1 are selected, in accordance with the setting of compressibility, as the aforementioned selection.

For example, when hoping to rapidly record and rapidly send, there are many cares of selecting high compressibility.

So, if the high compressibility is set, image processing is carried out by use of transfer data of the first field. It is selected that transfer data of the first and second fields in the middle compressibility and of the first to third fields in the low compressibility are used respectively.

Although the fact that the numbers M of division of element (number of fields composing of one field set) are 3 is explained as described above, hereafter, it is considered that transfer time of all the number of pixels is increased with increase of number of pixel of the photographing device.

In this case, if an image of VGA size is obtained from the transferred number (homogeneous transfer data of the first transfer) of pixel of one field which is divided, it is possible to effect the similar image processing as the above even in case of odd number in which M are more than 3 as in case of effecting data transfer by dividing into 5 (five) fields.

Hereinafter, an explanation about a case that divided numbers of fields in the photographing device 1 of interlace transferring type are 4 (four) will be made in connection with FIGS. 37(a)-37(a).

FIGS. 37(a), (b) and (c) illustrate an arrangement of pixels (light receiving element) of 2 rows in a perpendicular direction of the photographing device of interlace transferring type of M=4, in accordance with FIG. 34. In order to avoid complication, the same reference numerals as in FIG. 34 are attached to what about which it is considered that there is no fear of confusion. Accordingly, the members in which the same reference numerals as in FIG. 34 attached are the same as that in FIG. 34.

In certain row, pixels of filters R and Gr are alternately arranged, in the other row, pixels of the filters B and Gb are alternately arranged, horizontally (right and left direction) as viewed in FIG. 37.

For example, in FIG. 37(a), arrangement of pixels in up and down directions (perpendicular direction) is separated in 4 (four) groups respectively. Namely, numerals of 1, 2, 3 and 4 are repeatedly attached in the left side of arrangement of perpendicular pixels, each of these numerals shows field.

In FIG. 37, the first, second, third and fourth fields constitute one group of field.

In FIG. 34, the transfer of electrification accumulated in all the pixels in the photographing device will be carried out as follows.

As the transfer is stated, transfer of electrification of pixels belong to the first field in each field group is carried out (first transfer, see FIG. 37(a)), after completion of the first transfer, transfer of electrification of pixels belong to the second field in each field group is carried out (second transfer, see FIG. 37(b)).

When the second transfer is completed, transfer of electrification of pixels belong to the group is carried out (third transfer, see FIG. 37(c)), finally, transfer of electrification of pixels belong to the fourth field in each field group is carried out (fourth transfer, see FIG. 37(d)).

At the time of completion of the fourth transfer, the transfer for all the electrifications is completed.

Preparation of image and image processing using the photographing device will be explained in reference be explained in reference with a blow as shown in FIG. 42.

In the embodiment, it is possible setting resolution of the photographed image in three steps of low, middle and high as condition of photographing and setting selectively presence and absence of confirming photographing by making necessarily the thumbnail image.

Setting of condition of photographing is effected, lent the setting is similar as the case of M=3, a state of setting is as shown in FIG. 35, for example.

In this state, photographing is effected. In the state of "start" in the flow in FIG. 38, electrification is accumulated in all the pixels of the photographing device by photographing.

As the transfer is started, the data of electrification accumulated in the photographing device 1 corresponding element to an image of an object to be photographed are divided into four (4) fields to effect the first to fourth transfers in turn. The data to be transferred is adapted to make correlating double sampling by the CDS2a in the image processing part 2 shown in FIG. 35 and then is automatically controlled by the AGC2b and is converted into digital signal by the A/D 2c and the then is stored through the CCD-I/F 3a and memory controller 3b of the signal processing part 3 in the memory 4(S21).

At that time, the controlling part 5 confirms the completion of data transfer of the first and second fields (S21). At that time (Yes in S22), presence and absence of setting for display of the image for confirming photographing are confirmed (S23). If the setting of condition for photographing is as shown in FIG. 5, the image for confirming photographing is displayed for one second.

Here, gathering from the state that the first transfer is completed, the first field includes only information R (red component) and G (green component) and does not include information B (blue component) as color information.

Therefore, when the first transfer is completed, information necessary to make color image is not totally included in the homogeneously transferred data.

However, when the second transfer is completed, the data homogeneously transferred in the first transfer and the data homogeneously transferred in the second transfer include all the information R (red component), G (green component) and B (blue component) as color information. Accordingly, when the second transfer is completed, the transferred date include all the information necessary to make the color image and also include pixels necessary to make the color image having lour resolution.

Consequently, it is possible to effect image processing in this step.

In the processing S23, when the setting for displaying image of confirming photographing is confirmed (Yes in S2), the image processing of making the image of confirming photographing is carried out based on the transfer data of the first and second fields (S24). The formed image of confirming photographing is displayed through the display I/F3e on the displaying part 6.

Subsequently, the image processing of making the thumbnail image is carried out (S25). In the processing S23, if it is not the setting for displaying the image for confirming photographing (No in S23), the image processing of making the thumbnail image is carried out with omitting preparation of image for confirming photographing.

Next, confirmation about whether or not resolution of image formed is set in low is effected (S26), if the low resolution is set (No in S26), the image processing is carried out (S27) the transfer data of the first and second fields (sum of homogenous transfer data by the first and second transfers) to prepare an image having the low resolution is not low (Yes in S26), the completion of data transfer (third and fourth transfers) of the third and fourth fields is confirmed (S28), when the completion is confirmed (Yes in S28), image processing is carried out by use of the transfer data (data of third and fourth transfers) of the third and fourth fields.

If the set resolution is middle and high, image processing is carried out by use of transfer data after the fourth transfer. When in image of high resolution is prepared, image processing is carried out by use of all the data of pixels after the fourth transfer, if an image of middle resolution is prepared, third of data from all the data is effected to obtain data of necessary number of pixels, thus effecting image processing based on the obtained data (S29).

Referring to FIG. 31, the transfer data from the photographing device 1 are sent in the order of first, second, third image processing part 2, CCD-I/F3a of the signal processing part 3 and memory controller 3b to the RAW-RGB section 4a of the memory 4 as actual data and stored therein.

The data of information R-G-B stored in the RAW-RGB section 4a of the memory 4 are sent through the memory controller 3b to the YUV converting part 3c in accordance with the setting of a user which is referred to as presence and absence of display of the image for confirming photographing, resolution, low, middle and high after detection for completion of transfer of each field and are converted into data of YUV signal by means of the YUV conversion and there are stored in the YUV section 4b of the memory 4.

As described above, the image of confirming photographing and thumbnail image prepared by the transfer data (each homogeneous transfer data in the first and second transfers) of the first and second fields are displayed through the displaying part I/F 3e on the displaying part 6.

If the set resolution is also low, the data of YUV signal are again read out though the memory controller 3b from the YUV section 4b of the memory 4 and it is sent to the compress processing part 3d. Compress processing to the JPEG format is carried by means of the compress processing part 3d and then the compressed data are stored in the JPEG section 4c of the memory 4.

When the data are stored in the JPEG section 4c of the memory 4, header data and so on are attached to the compressed data of JPEG and as JPEG image data, the data are stored in the exterior memory 4' by means of control of the controlling part 5. If there is provided the section 4" for storing image, the data may be stored in the section 4".

If the set resolution is middle, high, completion of data transfer (third, fourth transfers) is detected and the image processing is carried out by use of the transfer data of the first to fourth fields.

As an embodied example, if an photographing device of pixels of 300 ten thousand having horizon: 2048 pixels, perpendicular: 1636 pixels is used, in an interface transferring type of effecting separated transfers of 4 (four) times (first to fourth transfers), data (homogeneous transfer data) horizon: 2048 pixels, perpendicular, 384 pixels are transferred at one time.

Accordingly, if the size of horizon: 640 pixels, perpendicular: 480 pixels (VGA) is recorded, it is sufficient to make an image with member of transferred pixels (horizon: 2048 pixels, perpendicular: 768 pixels) of the first and second fields and therefore an image of size of horizon: 1024 pixels, perpendicular: 768 pixels (XGA) can be generated.

If the transfer data of the first and second fields are used, because aspect ratio between horizontal pixels and perpendicular pixels is different, a horizontally lengthened image is formed.

However, when converting at the YUV converting part 3c, adjustment of the aspect ratio may be accomplished with processing such as reading out thinned horizontally from the RAW-RGB section 4a of the memory 4.

If image recording of VGA size similarly as the image of confirming photographing or of thumbnail is intended, processing of photographed image is sufficient with the transfer data of the first and second fields.

Therefore, it is possible to accomplish rapid processing by effecting the next photographing without effecting processing of data transfer of the third and fourth fields.

Namely, the transfer data of the number of field necessary to effect image processing corresponding to the set resolution (low, middle and high) is used and the next photographing is started without effecting data transfer of unnecessary field to accomplish image processing of high-speed.

It is, also possible to effect image processing in which transfer data of the first to fourth fields transferred from the photographing device 1 are selected, in accordance with the setting of compressibility, as the aforementioned selection.

For example, when hoping to rapidly record and rapidly send, there are many cares of selecting high compressibility.

So, it can be selected that if the high compressibility is set, image processing is carried out by use of transfer data of the first and second fields, transfer data of the first to fourth fields in the middle or low compressibility are used respectively.

In the above, the separated number M (number of fields consisting one field group) of the fields in the photographing device are 4, but hereafter it is considered that transfer time of all the number of pixels is increased with increase of number of pixel of the photographing device.

In this case, if M is even number more than 4, for example, M=6 and data are transferred by dividing into 6 fields and images of confirming photographing and of thumbnail and recorded image of low resolution and high compressibility are prepared, it is possible to make the image(s) by use of the transfer data obtained by transfer of the first and second fields.

If a recorded image of middle resolution and middle compressibility is prepared, it is possible to make the image by use of the transfer data obtained by transfer of the first to fourth fields. If a recorded image of high resolution and high compressibility is also prepared, it is possible to make the image by use of the transfer data obtained by transfer of the first to sixth field.

In the embodiment explained in connection with FIGS. 31 to 37, electrification of all the pixels accumulated corresponding to an image focused on the photographing device 1 having a color filter for dissolving colors by imaging means is transferred. In this case, the data transfer of electrification is carried out by dividing into M ($\geq$3) fields.

An photographing method for carrying out image processing including at least YUV conversion by use of the transfer data of m (<M) field in which all the color signals and necessary pixels are get is embodied.

Figure 36:
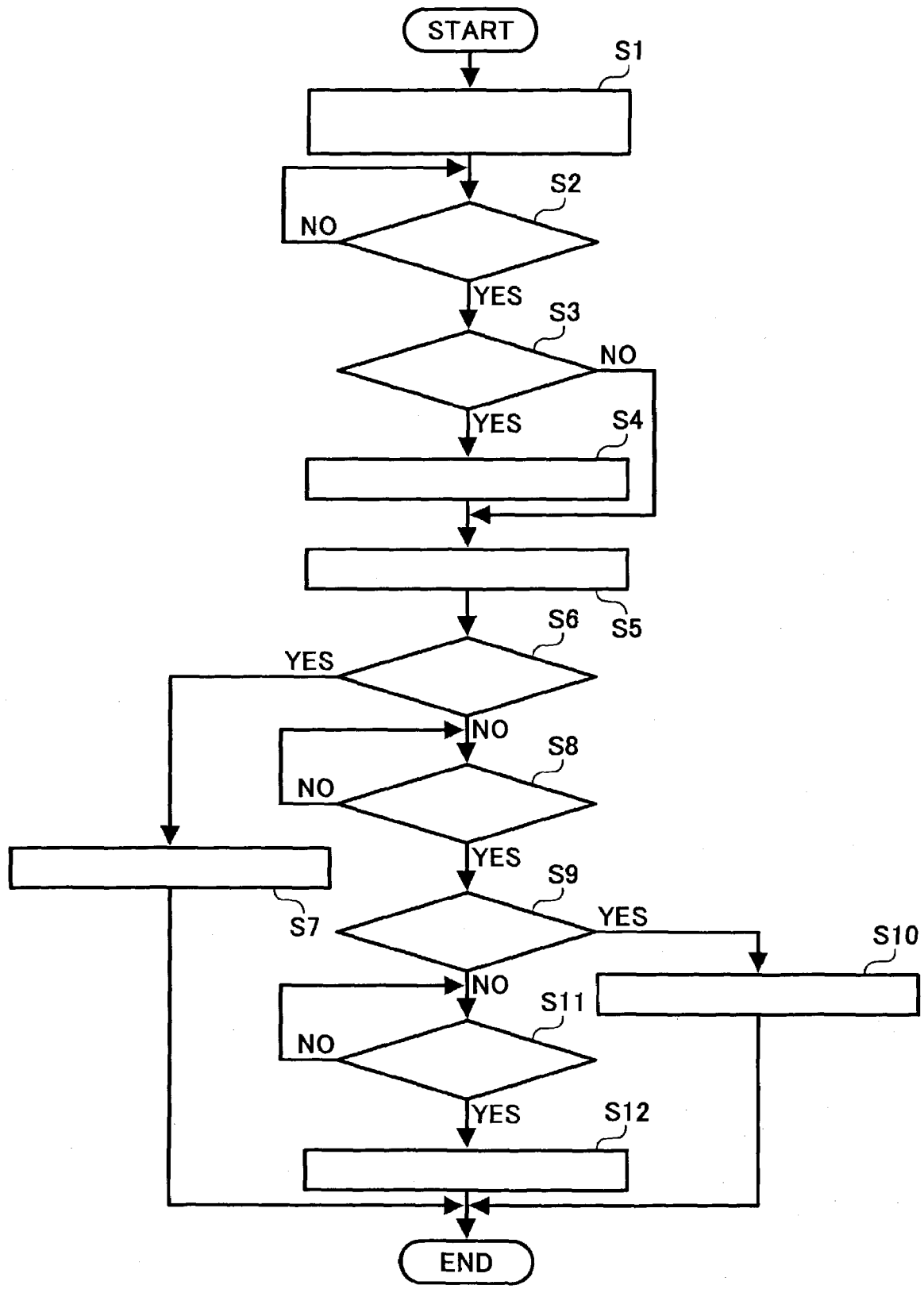
FIG. 36 is a flow chart illustrating one embodiment of the photographing method for use in the photographing device in the interlacing transfer system in FIG. 34.

In the embodiment shown in FIGS. 34 and 36, number of fields: M is odd number of 3 or more, m=1. In the embodiment shown in FIGS. 37 and 38, number of fields: M is even number of 4 or more, m=2.

Also, in the above embodiments, when the transfer data of m field is get, image processing including at least YUV conversion is immediately carried out.

An image for confirming photographing and a thumbnail image are made by image processing including YUV conversion.

In the above embodiments, condition of an image to be formed is set and image processing is carried out by use of transfer data of n (m$\leq$n$\leq$M) field to make said image to be formed.

Condition of an image to be formed is resolution of image and n is number of field in which number of pixel necessary to make an image of the set resolution is get.

In the embodiment shown in FIGS. 34, 35 and 36, M=3, an image of low resolution is prepared with respect to number of field: n=1, an image of middle resolution is prepared with respect to number of field: n=2, and an image of high resolution is prepared with respect to number of field: n=M.

Figure 38:
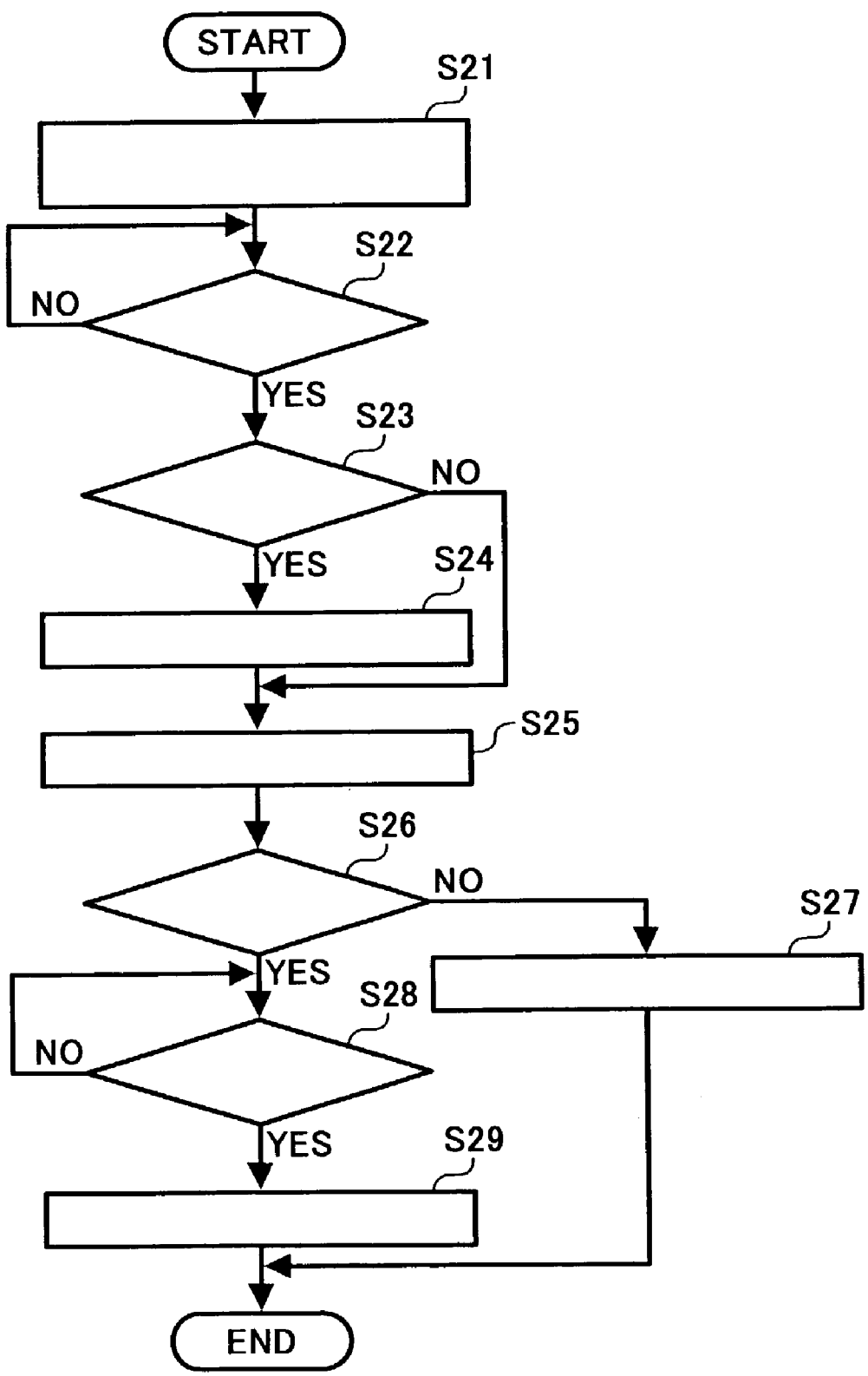
FIG. 38 is a flow chart illustrating one embodiment of a photographing method for use in the photographing device in the interlacing transfer system in FIG. 37.

In the embodiment shown in FIGS. 35, 37 and 38, M=4, an image of low resolution is prepared with respect to n=2, images of middle and/or high resolutions are prepared with respect to number of field: n=M.

As described above, in each embodiment, as condition of an image to be made, compressibility of image is used, n is number of fields in which number of pixels necessary to make an image of the set compressibility are get, in the embodiment shown in FIGS. 35, 37 and 38, processing of compressing the image is carried out on format of JPEG with respect to M=3, number of field: n=1.

In the embodiment shown in FIGS. 35, 37 and 38, M=4 or 6, processing of compressing the image is carried out on format of JPEG with respect to number of field: n=2.

An photographing apparatus as shown in FIG. 31 comprises: an photographing device 1 having a color filter for resolving color: imaging means 501, 502 and 503 for focusing an image to be photographed on said photographing device; an imaging processing part 2 for converting to digital signal electrification stored in said photographing device and transferred; and means 3, 4 and 5 for carrying out image processing including at least YUV conversion by use of transfer data transferred through said imaging processing part. The photographing device is interlace transferring type and divides data transfer of electrification of stored all pixels into M($\geq$3) fields.

The color filter of the photographing device is composed of original colors of red (R), green (G) and blue (B).

The color filter of the photographing device is composed of complementary color of yellow (Y), cyan (C), magenta (M) and green (G).

In the photographing apparatus shown in FIGS. 31 to 34, 35 and 36, M is 3 in the photographing device of interlace transferring type and M is 4 or 6 in the photographing device of interlace transferring type.

The photographing apparatus has a displaying part 6 for displaying an image for confirming pick up and/or an image of thumbnail and a removable exterior memory 4' for storing the formed image.

The apparatus has an image holding section 4" for storing the formed image.

The aforementioned electronic still camera is one example of the image information processing apparatus having at least one portion of the photographing apparatus.

For example, when displaying the image of confirming photographing, if the image processing is carried out after the data of all the pixels in the photographing device are transferred, it take time of 0.3 seconds in conventional pixels of 300 ten thousand until the image is displayed.

If M=3, m=1, with time of 0.1 seconds, if M=4, m=2, with time of 0.15 seconds, it is possible to display the image to be easy to use the apparatus.

As described above, according to the present invention, when the electrification accumulated in the photographing device is transferred, since image data can be prepared without awaiting transfer of data of all pixels, it is possible to eliminate time for confirming the photographed image or until the next photographing.

What is claimed is:

1. A photographing method comprising the steps of:
   setting resolution as a condition of an image to be formed;
   dividing data of electric charges stored in all pixels corresponding to an image focused on an photographing device having a color filter for resolving color by means of a focused device into M($\geqq$3) fields;
   transferring at least a part of said divided data in sequence;
   carrying out, immediately after data of m(<M) fields of said M fields are transferred, an image processing by use of the transferred data of the m fields to make a confirmation image for confirming photographing, said transferred data of said m fields including all types of color signals and pixels necessary to prepare the confirmation image; and
   carrying out, after data of n (m$\leqq$n$\leqq$M) fields of the M fields are transferred, a second image processing by use of the transferred data of the n fields to make the image to be formed, n being number of fields in which pixels necessary to make an image having the set resolution are included.

2. A photographing method according to claim 1, wherein number of fields: M is odd number of 3 or more, m=1.

3. A photographing method according to claim 2, wherein when the data of m fields are transferred, the image processing including at least YUV conversion is immediately carried out.

4. A photographing method according to claim 2, wherein the confirmation image for confirming photographing is made by the image processing including the at least YUV conversion.

5. A photographing method according to claim 2, wherein thumbnail image is made by the image processing including at least YUV conversion.

6. A photographing method according to claim 2, wherein condition of an image to be formed is set and the second image processing is carried out by use of the transferred data of n (m$\leqq$n$\leqq$M) fields to make said image to be formed.

7. A photographing method according to claim 1, wherein number of fields: M is even number of 4 or more, m=2.

8. A photographing method according to claim 7, wherein when the data of m fields are transferred, the image processing including at least YUV conversion is immediately carried out.

9. A photographing method according to claim 7, wherein the confirmation image for confirming photographing is made by the image processing including the at least YUV conversion.

10. A photographing method according to claim 7, wherein thumbnail image is made by the image processing including at least YUV conversion.

11. A photographing method according to claim 7, wherein condition of an image to be formed is set and the second image processing is carried out by use of the transferred data of n (m$\leqq$n$\leqq$M) fields to make said image to be formed.

12. A photographing method according to claim 1, wherein the image processing including at least YUV conversion.

13. A photographing method according to claim 12, wherein thumbnail image is made by the image processing including at least YUV conversion.

14. A photographing method according to claim 12, wherein condition of an image to be formed is set and the second image processing is carried out by use of the transferred data of n (m$\leqq$n$\leqq$M) fields to make said image to be formed.

15. A photographing method according to claim 1, wherein the confirmation image for confirming photographing is a thumbnail image.

16. A photographing method according to claim 15, wherein condition of an image to be formed is set and the second image processing is carried out by use of the transferred data of n (m$\leqq$n$\leqq$M) fields to make said image to be formed.

17. A photographing method according to claim 1, wherein M=3, an image of low resolution is prepared with respect to number of fields: n=1, an image of middle resolution is prepared with respect to number of fields: n=2, and an image of high resolution is prepared with respect to number of fields: n=M.

18. A photographing method according to claim 1, wherein M=4, an image of low resolution is prepared with respect to n=2, images of middle and/or high resolutions are prepared with respect to number of fields: n=M.

19. A photographing method according to claim 1, wherein M=6, an image of high resolution is prepared with respect to n=M, an image of low resolution is prepared with respect to number of fields: n=2 or an image of middle resolution or low resolution is prepared with respect to number of fields; n=4.

20. A photographing method comprising steps of:
    setting compressibility as a condition of an image to be formed;
    dividing data of electronic charges stored in all pixels corresponding to an image focused on an photographing device having a color filter for resolving color by means of a focused device into M($\geqq$3) fields;
    transferring said divided data in sequence;
    carrying out, immediately after data of m(<M) fields of said M fields are transferred, an image processing by use of the transferred data of the m fields to make a confirmation image for confirming photographing, the transferred data of the m fields including all types of color signals and pixels necessary to prepare the confirmation image; and
    carrying out, after data of n (m$\leqq$n$\leqq$M) fields are transferred, a second image processing by use of the transferred data of the n fields to make the image to be formed, n being number of fields in which pixels necessary to make the image having the set compressibility are included.

21. A photographing method according to claim 20, wherein M=3, processing of compressing the image is carried out on format of JPEG with respect to number of fields: n=1.

22. A photographing method according to claim 20, wherein M=4 or 6, processing of compressing the image is carried out on format of JPEG with respect to number of fields: n=2.

* * * * *

UNITED STATES PATENT AND TRADEMARK OFFICE
CERTIFICATE OF CORRECTION

PATENT NO.         : 7,471,321 B2
APPLICATION NO.    : 10/354086
DATED              : December 30, 2008
INVENTOR(S)        : Ojima et al.

It is certified that error appears in the above-identified patent and that said Letters Patent is hereby corrected as shown below:

On the title page, Item (75), the third Inventor should be removed. Item (75) should read:

--(75) Inventors: Noriaki Ojima, Tokyo (JP); Kenji Shiraishi, Tokyo (JP)--

Signed and Sealed this

Twenty-fourth Day of February, 2009

JOHN DOLL
*Acting Director of the United States Patent and Trademark Office*